(12) United States Patent
Koza et al.

(10) Patent No.: US 6,360,191 B1
(45) Date of Patent: *Mar. 19, 2002

(54) METHOD AND APPARATUS FOR AUTOMATED DESIGN OF COMPLEX STRUCTURES USING GENETIC PROGRAMMING

(75) Inventors: John R. Koza, 25372 La Rena La., Los Altos Hills, CA (US) 94022; Forrest H Bennett, III, Palo Alto; David Andre, Menlo Park, both of CA (US); Martin A. Keane, Chicago, IL (US)

(73) Assignee: John R. Koza, Los Altos Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/225,643

(22) Filed: Jan. 5, 1999

Related U.S. Application Data

(63) Continuation of application No. 08/603,648, filed on Feb. 20, 1996, now Pat. No. 5,867,397.

(51) Int. Cl.[7] .......................... G06G 7/48; G06F 17/50; G06F 9/45; G06F 7/60; G06F 17/10
(52) U.S. Cl. .................. 703/6; 703/2; 703/7; 703/14; 703/22; 716/1; 716/2
(58) Field of Search ................................ 703/22, 14, 6, 703/7, 2; 716/1, 2

(56) References Cited

U.S. PATENT DOCUMENTS

| | | | |
|---|---|---|---|
| 5,222,030 A | 6/1993 | Dangelo et al. ............ 364/489 |
| 5,343,554 A | * 8/1994 | Koza et al. .................. 706/13 |
| 5,465,218 A | 11/1995 | Handa ........................ 364/489 |
| 5,719,794 A | * 2/1998 | Altshuler et al. ............. 703/1 |
| 5,867,397 A | * 2/1999 | Koza et al. ................. 703/14 |

OTHER PUBLICATIONS

Arslan et al.: "The design of analogue and digital filters using genetic algorithms": IEE 15th SARAGA Coll. Digital & Analogue Filters and Filtering Sys.; pp. 2/1–2/5, 1995.*

Bohnenberger O, et al.; "Automatic design of truss structures using evolutionary algorithms"; Nov. 29–Dec. 1, 1995, pp. 143–147.

Hemmi H, et al.; "Development and evolution of hardware behaviors"; Jul. 1994; pp. 371–376.

* cited by examiner

Primary Examiner—Kevin J. Teska
Assistant Examiner—Hugh Jones
(74) Attorney, Agent, or Firm—Blakely, Sokoloff, Taylor & Zafman LLP

(57) ABSTRACT

An automated design process and apparatus for use in designing complex structures, such as circuits, to satisfy prespecified design goals, using genetic operations. The present invention uses a population of entities which may be evolved to generate structures that may potentially satisfy the design goals. The behavior of such generated structures is evaluated in view of the design goals, and those structures more closely meeting the design goals are evolved further until a structure is generated that either meets the prespecified design goal or some other process completion criteria. In this manner, a design complex structure may be obtained.

74 Claims, 46 Drawing Sheets

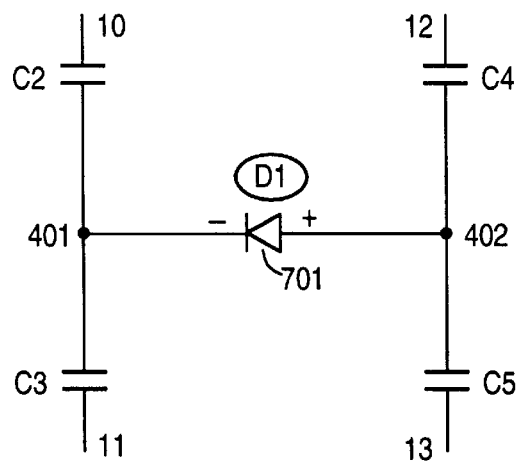
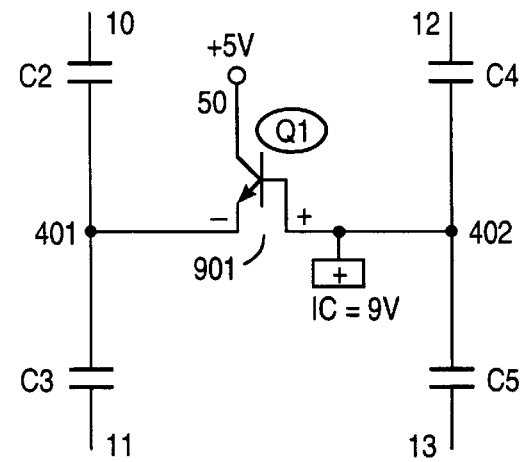
FIG. 7          FIG. 9
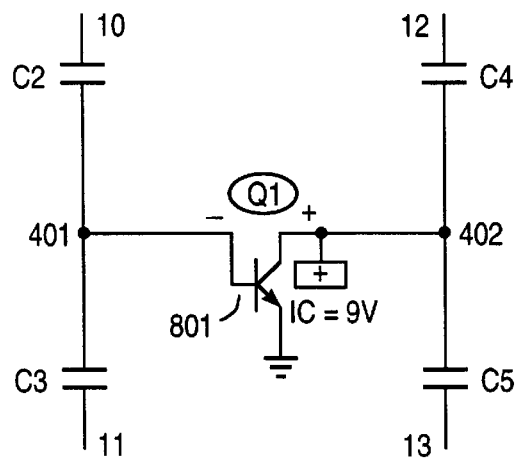
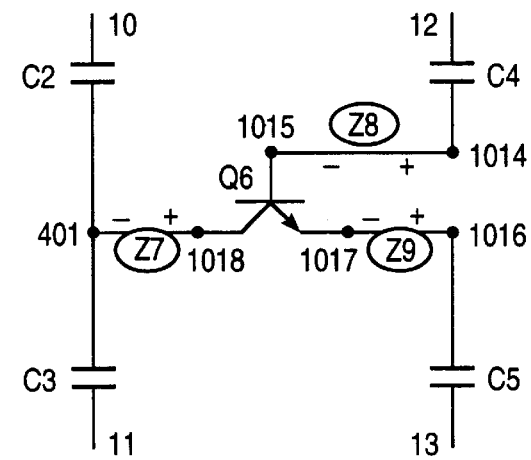
FIG. 8          FIG. 10

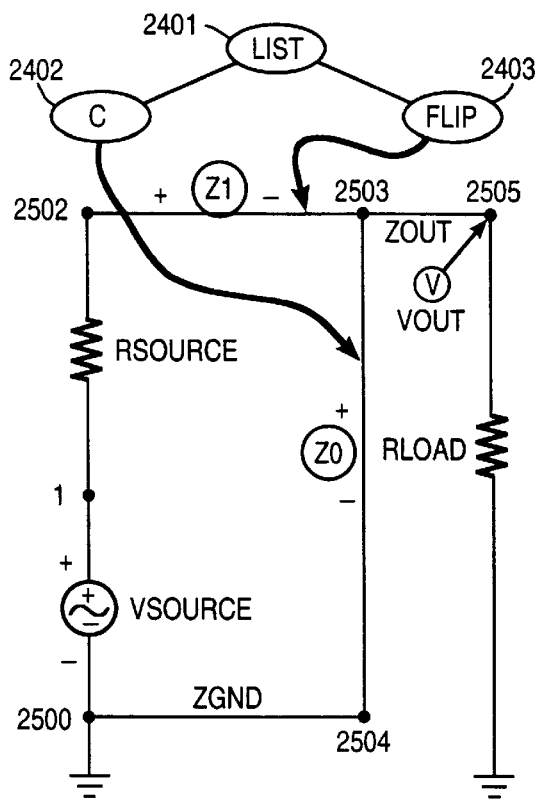
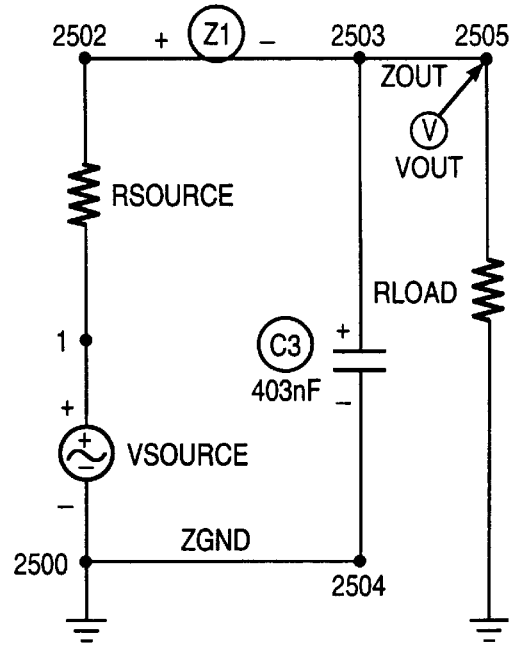
FIG. 25
FIG. 27
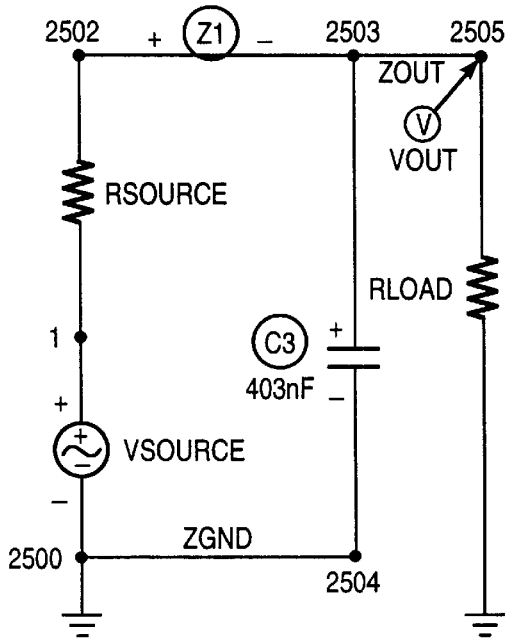
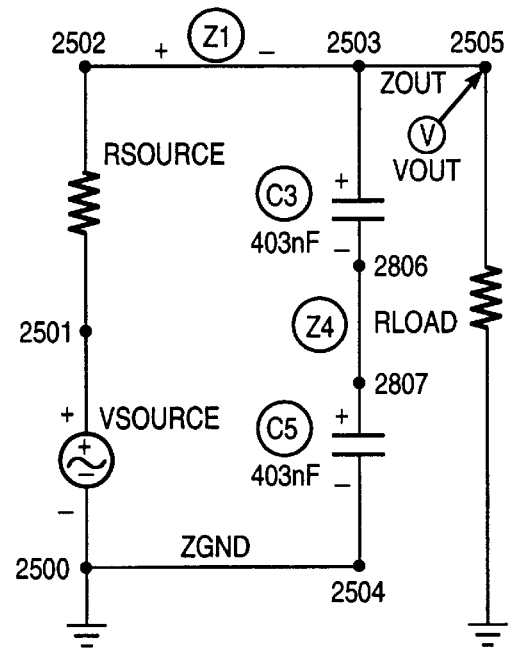
FIG. 26
FIG. 28

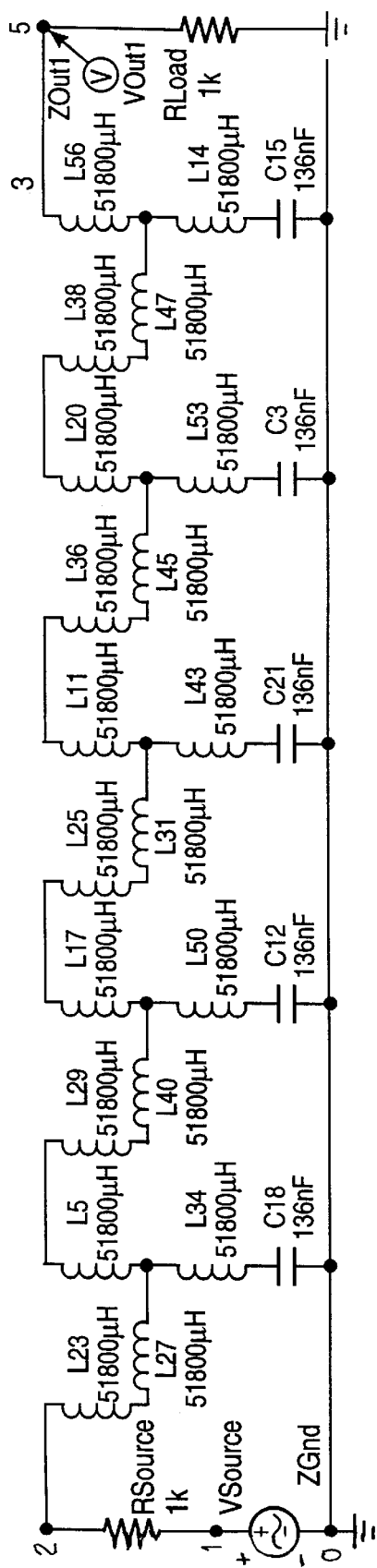
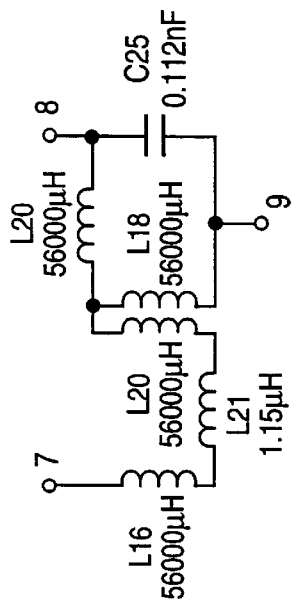
FIG. 49
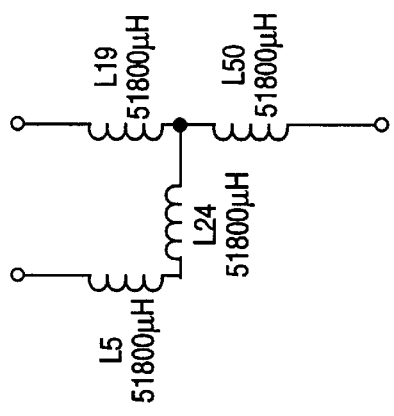
FIG. 47
FIG. 48

METHOD AND APPARATUS FOR AUTOMATED DESIGN OF COMPLEX STRUCTURES USING GENETIC PROGRAMMING

This application is a continuation of U.S. patent application Ser. No. 08/603,648, filed Feb. 20, 1996 now U.S. Pat. No. 5,867,397.

FIELD OF THE INVENTION

The field of the invention is the automated design of complex structures, such as electrical circuits; more particularly, the present invention relates to designing complex structures, such as electrical circuits, using computer-implemented genetic algorithms.

BACKGROUND OF THE INVENTION

The automated design of complex structures that satisfy a designer's requirements is a challenging task that is ordinarily thought to require human intelligence.

Electrical engineers are often called upon to design circuits that satisfy certain design goals or requirements. Electrical circuits consist of a wide variety of different types of components, including resistors, capacitors, inductors, diodes, transistors, transformers, and energy sources. The individual components of an electrical circuit are arranged in a particular "topology" to form a circuit.

Various types of components may be inserted at each location within the circuit's topological arrangement. In addition, each component is further specified ("sized") by a set of component values (typically numerical). A complete specification of an electrical circuit includes its topology, the choice of component types to be inserted at each location within the topology, and the sizing of all of its components.

In designing a circuit, the goal is to attain certain desired values of one or more observable quantities (e.g., an observed pattern of voltages at certain times or at certain frequencies at a certain probe point in the circuit). Often there are one or more additional considerations (e.g., number of components in the circuit, cost of the components, etc.).

This application is a continuation of U.S. patent application Ser. No. 08/603,648, entitled "Method and Apparatus for Automated Design of Complex Structures using Genetic Programming," filed Feb. 20, 1996.

Similarly, mechanical and civil engineers are often called upon to design physical structures that satisfy certain design goals or requirements. Physical structures, like electrical circuits, consist of a variety of different types of components. These individual components may be arranged in a particular topology to form the overall complex physical structure. Various types of components may be inserted at each location within the topological arrangement. Each component in the overall structure may be further specified by a set of component values (typically numerical). For example, a mechanical engineer may want to design as truss consisting of components such as rigid load-supporting metallic beams and load-supporting flexible cables. The design goals may be to support a particular load or loads and of satisfying a requirement that the stress on each bar or cable is not so great as to cause the rigid bar or flexible cable to break. Finally, there may be an additional design goal that the entire physical structure meets some cost requirement, such as minimizing the total weight of the material contained in the truss. In order to design the desired truss, the designer must create an appropriate topological arrangement of components (i.e., the number of components and how they are joined), choose component types (i.e., rigid beams or flexible cables) to insert into the topological arrangement, and choose appropriate numerical values (i.e., their thickness) for each of the components.

Both the above electrical and mechanical design problems and many other design problems from many other fields share the common feature of requiring the designer to create an appropriate topological arrangement of components, to choose component types to insert into the topological arrangement, and to choose appropriate numerical values for each of the components in the overall complex structure.

The Natural Selection Process In Nature

In nature, biological entities exhibit a wide variety of structures that survive and prosper in various environments. Nature's methods for designing biological entities to meet the requirements of their natural environment provides a useful model for designing complex structures.

Most structures and behaviors in living things are the consequence of the actions and interactions of proteins. In fact, proteins are responsible for such a wide variety of biological structures and behaviors that it can be said that the structure and functions of living organisms are primarily determined by proteins. Proteins are polypeptide molecules composed of sequences of amino acids. There are 20 amino acid residues (denoted by the letters A, C, D, E, F, G, H, I, K, L, M, N, P, Q, R, S, T, V, W, and Y) from which protein molecules are constructed. Protein molecules are, in turn, made up of an average of about 300 such amino acid residues (with large proteins containing thousands of amino acid residues). Simple bacteria sustain life with as few as 1,800 different proteins while humans have an estimated 100,000 proteins.

Proteins are manufactured in accordance with instructions and information contained in the chromosomal DNA of the organism. DNA (deoxyribonucleic acid) is a long thread-like biological molecule that has the ability to carry hereditary information and the ability to serve as a model for the production of replicas of itself. All known life forms on this planet (including bacteria, fungi, plants, animals, and humans) are based on the DNA molecule. In nature, a gene is the basic functional unit by which hereditary information is passed from parents to offspring. Genes appear at particular places along molecules of deoxyribonucleic acid (DNA).

The so-called "genetic code" involving the DNA molecule consists of long strings (sequences) of 4 possible values that can appear at the various loci along the DNA molecule. For DNA, the 4 possible values refer to 4 "bases" named adenine, guanine, cytosine, and thymine (usually abbreviated as A, G, C, and T, respectively). Thus, the "genetic code" in DNA consists of long strings such as CTCGACGGT. When living cells reproduce, the genetic code in DNA is read. Sub-sequences (called "codons") consisting of 3 DNA bases specify one of 20 amino acids. Thus, the genetic code is used to specify and control the building of proteins from the information and instructions contained in the DNA molecule.

Organisms consist of living cells, each containing thousands of interacting proteins, spend their lives attempting to deal with their environment. Some organisms do better than others in dealing with their environment. In particular, some organisms survive to the age of reproduction and can then thereby pass on their genetic make-up (i.e., their genes) to their offspring. Natural selection is the process by which organisms whose traits facilitate survival to the age of reproduction pass on all or part of their genetic make-up to offspring (Darwin 1859). Over a period of time and many generations, the population as a whole evolves so that the chromosome strings in the individuals in the surviving population perpetuate traits that contribute to the survival of the organism in its environment. That is, the natural selection process tends to evolve, over a period of time, structures that are designed so as to deal effectively with their environment.

Genetic Algorithms

A genetic algorithm provides a method of improving a given set of objects. The processes of natural selection and survival of the fittest provide a theoretical base for the genetic algorithm. *Adaptation in Artificial and Natural Systems*, by Professor John H. Holland (1975), summarizes and presents an overall mathematical theory of adaptation for both natural and artificial systems. A key part of Holland's book described a "genetic algorithm" patterned after nature's methods for biological adaptation. In later work, Holland (1986) described a classifier system that employed a genetic algorithm and a bucket brigade algorithm to solve problems. U.S. Pat. No. 4,697,242 (Holland et al.) and U.S. Pat. No. 4,881,178 (Holland et al.) describe classifier systems that use fixed length binary strings in conjunction with a genetic algorithm.

Genetic Programming

"Genetic programming" (also called the "non-linear genetic algorithm" or the "hierarchical genetic algorithm" in previous years) is described in the book entitled *Genetic Programming: On the Programming of Computers by Means of Natural Selection* (Koza 1992), the book entitled *Genetic Programming II: Automatic Discovery of Reusable Programs* (Koza 1992) and in U.S. Pat. Nos. 4,935,877, 5,136,686, 5,148,513, and 5,343,554.

Genetic programming is referred to as "non-linear" or "hierarchical" because the original genetic algorithm described by Holland in 1975 operated on linear strings of characters (resembling chromosomes in nature), whereas genetic programming operates on hierarchical program trees of various sizes and shapes. Genetic programming is capable of evolving computer programs that solve, or approximately solve, a variety of problems from a variety of fields. Genetic programming starts with a primordial ooze of randomly generated programs composed of the available programmatic ingredients and then applies the principles of animal husbandry to breed a new (and often improved) population of programs. The breeding is done in a domain-independent way using the Darwinian principle of survival of the fittest, an analog of the naturally-occurring genetic operation of crossover (sexual recombination), and occasional mutation. The crossover operation is designed to create syntactically valid offspring programs (given closure amongst the set of ingredients). Genetic programming combines the expressive high-level symbolic representations of computer programs with the near-optimal efficiency of learning associated with Holland's genetic algorithm. A program that solves (or approximately solves) a given problem often emerges from this process.

As demonstrated in the book, *Genetic Programming II: Automatic Discovery of Reusable Programs* (Koza 1994) genetic programming can evolve multi-part programs consisting of a main program and one or more reusable, parameterized, hierarchically-called subprograms (called automatically defined functions or ADFs).

Genetic programming breeds computer programs to solve problems by executing the following three steps:

(1) Generate an initial population of random compositions of the functions and terminals of the problem (i.e., computer programs).
(2) Iteratively perform the following substeps until the termination criterion has been satisfied:
  (A) Execute each program in the population and assign it a fitness value using the fitness measure.
  (B) Create a new population of computer programs by applying the following operations. The operations are applied to computer program(s) chosen from the population with a probability based on fitness.
    (i) Reproduction: Copy an existing program to the new population.
    (ii) Crossover: Create new offspring program(s) for the new population by recombining randomly chosen parts of two existing programs.
    (iii) Mutation: Create one new offspring program for the new population by randomly mutating a randomly chosen part of one existing program.
(3) The program that is identified by the method of result designation (e.g., the best-so-far individual) is designated as the result of the genetic algorithm for the run. This result may be a solution (or an approximate solution) to the problem.

Other genetic programming processes may utilize additional operations such as "permutation," "define building block" (also called "encapsulation"), or the architecture-altering operations mentioned later.

Cellular Encoding of Neural Networks

A neural network is a structure consisting of one or more neural processing units (neurons). A neural network can be represented by a line-labeled, point-labeled, directed graph. The points of the graph are either neural processing units within the neural network, input points, or output points. The lines are labeled with numerical weights to represent the weighted connections between two points. The neural processing units are labeled with two numbers indicating the threshold and the bias of the processing unit.

The only type of component in a neural network is a neural processing unit. Neural networks are dynamical systems in the sense that the state of the network at a future time depends on the state of the network at the current time and the inputs to the network at the current time. There is a directional flow of information in neural networks. In feed-forward neural networks, information flows from the inputs to the network, through the neurons, to the outputs of the network without any cycles within the directed graph representing the network. In recurrent neural networks, the output at a particular instant in time of one or more individual neurons in the network may be sent back to become the input at a future time of another neural processing unit so as to create a cycle within the directed graph representing the network.

The conventional genetic algorithm operating on fixed-length character strings provides a way to search the highly nonlinear multidimensional search space of weight vectors to discover the numerical weights for the connections as well as the thresholds and biases of a neural network; however, the architecture of the neural network must be specified in advance (Schaffer and Whitley 1992). The difficulty in automating the discovery of the architecture using genetic methods has centered on finding a malleable representation for the line-labeled, point-labeled, graph representing the neural network that is receptive to the kinds of operations performed by the genetic algoritam.

Some early work applied genetic programming to the problem of discovering both the architecture and weights of a neural network using the "define building block" (also called "encapsulation") operation of genetic programming (Koza and Rice 1991). The book *The Algorithmic Beauty of Plants* describes Lindenmayer systems (L-systems) and grammar rewrite rules. These systems provide a way to develop a complex pattern by applying rewriting rules to an initial (or embryonic) pattern.

In his *Cellular Encoding of Genetic Neural Networks*, Frederic Gruau (1992a) described a technique, called cellular encoding, in which genetic programming is used to concurrently evolve the architecture of a neural network, along with the weights, thresholds, and biases of the individual neurons in the neural network. In this technique, each individual program tree in the population is a specification for developing a complete neural network from a very simple neural network consisting of a single neuron. Genetic programming is applied to populations of these network-constructing program trees in order to evolve a neural network capable of solving the problem at hand. See also Gruau 1992b, 1993, 1994a, 1994b.

In cellular encoding, each program tree is a composition of constructing functions. The program tree is the genotype and the neural network constructed in accordance with the tree's instructions is the phenotype. The fitness of an individual program tree in the population is measured by how well the neural network that is constructed in accordance with the instructions contained in the program tree performs the desired task. This is typically accomplished by exposing the neural network to all (or a large sampling) of possible combinations of inputs and testing whether the output(s) of the neural network matches the correct output(s) for the particular combination of inputs. For many problems, fitness is computed from the number of correct and incorrect output(s) from the neural network. Genetic programming then breeds the population of program trees using the usual genetic operations of Darwinian reproduction, crossover, and mutation.

In cellular encoding, the construction process for a neural network starts from a neural network consisting of a single neuron. This neuron has a threshold of 0; its bias is 0; its input is connected to all of the network's input nodes with connections with weights of +1; its output is connected to all of the network's output nodes. The functions in the program tree then specify how to grow this neuron into the full neural network. Certain context-free functions permit a particular neuron to be subdivided in a parallel or sequential manner. Other functions can change the threshold of a neuron, the weight of a connection, or the bias on a neuron.

The SPICE Simulator for Electrical Circuits

In many fields of engineering, complex physical phenomena can be simulated using computer-based simulators. In the field of electrical engineering, SPICE (an acronym for Simulation Program with Integrated Circuit Emphasis) is a massive family of programs written over several decades at the University of California at Berkeley for the simulation of analog, digital, and mixed analog/digital electrical circuits.

SPICE3 (Quarles et al. 1994) is the most recent version of SPICE. SPICE3 performs various types of analysis on circuits containing various circuit elements. The circuit elements include resistors, capacitors, inductors, switches, diodes, transistors, voltage and current sources, transmission lines, and many other devices. SPICE can perform DC analysis, transient analysis, pole-zero analysis, small-signal distortion analysis, sensitivity analysis, noise analysis, AC small-signal analysis, and other types of analysis. The SPICE3 program consists of about 6.1 megabytes of source code spread over 878 separate files that contain approximately 217,000 lines of C source code.

The input to a SPICE simulation consists of a netlist describing the circuit to be analyzed and certain commands that instruct SPICE as to the type of analysis to be performed and the nature of the output to be produced.

Similar simulators exist in many fields of engineering. For example, in the field of mechanical engineering, there are numerous simulators that enable the topological arrangement of various types of physical components (each further specified by different numerical and non-numerical parameters) to be provided to a simulator so that the physical structure can then be simulated.

Automated Circuit Design

Considerable progress has been made in automating certain design problems for purely digital circuits; however, the design of analog circuits and mixed analog-digital circuits has not proved to be as amenable to automation (Rutenbar 1993). In discussing "the analog dilemma," Aaserud and Nielsen (1995) observe, "Analog designers are few and far between. In contrast to digital design, most of the analog circuits are still handcrafted by the experts or so-called 'zahs' of analog design. The design process is characterized by a combination of experience and intuition and requires a thorough knowledge of the process characteristics and the detailed specifications of the actual product."

"Analog circuit design is known to be a knowledge-intensive, multiphase, iterative task, which usually stretches over a significant period of time and is performed by designers with a large portfolio of skills. It is therefore considered by many to be a form of art rather than a science."

Numerous efforts have been made to automate the design process for analog and mixed analog-digital circuits. Some of these efforts are now described below.

In an interactive design tool for analog integrated circuits called IDAC (Degrauwe 1987), the user begins by selecting various possible topologies for the circuit; IDAC then determines the values of the components in each circuit (in relation to the desired behavioral characteristics); and, the user chooses the best circuit.

In OASYS (Harjani, Rutenbar, and Carley 1989) and OPASYN (Koh, Sequin, and Gray 1990), a topology is chosen beforehand based on heuristic rules and the synthesis tool attempts to size the circuit. If the synthesis tool cannot size the chosen topology correctly, the tool creates a new topology using other heuristic rules and the process continues. The success of these systems depends on the effectiveness of the knowledge base of heuristic rules.

In SEAS (Ning, Kole, Mouthaan, and Wallings 1992), evolution is used to modify the topology and simulated annealing is used to size the circuit.

Maulik, Carley, and Rutenbar (1992) attempt to handle topology selection and circuit sizing simultaneously using expert design knowledge.

Nielsen (1995) has developed a continuous-time filter design tool (his "C-T compiler") that can be used to design analog filter circuits. Nielsen's process starts with the design, by hand, of a prototype filter. The values of the components and the topology are then adjusted to achieve compliance with the design requirements of the problem at hand.

Genetic Algorithms and Automated Circuit Design

In DARWIN (Kruiskamp and Leenaerts 1995), operational amplifier (opamp) circuits are designed using the genetic algorithm operating on binary character strings. In creating the initial population in DARWIN, the topology of each opamp in the population is picked randomly from a preestablished hand-designed set of 24 topologies in order to ensure that each circuit in the initial population behaves as an opamp. In addition, a set of problem-specific constraints are solved to ensure that all transistors operate in their proper range and that all transistor sizes lie between maximal and minimal values. The behavior of each opamp is evaluated using a small signal equivalent circuit and analytical calculations specialized to opamp circuits. The fitness of each opamp is computed using a combination of factors, including the deviation between the actual behavior of the circuit and the desired behavior and the power dissipation of the circuit. A crossover operation and mutation operation for the binary chromosome strings describing the opamps are used to create offspring binary chromosome strings.

Hemmi, Mizoguchi, and Shimohara (1994); Higuchi et al. (1993); and Mizoguchi, Hemmi, and Shimohara (1994) have employed genetic methods to the design of digital circuits using a hardware description language (HDL). In these approaches, a grammar is used to drive the development of the design of a digital circuit.

References Cited

U.S. Patents

U.S. Pat. No. 4,697,242, "Adaptive Computing System Capable of Learning and Discovery", issued Sep. 29, 1987, Holland et al.

U.S. Pat. No. 4,881,178, "Method of Controlling a Classifier System," issued Nov. 14, 1989, Holland et al.

U.S. Pat. No. 4,935,877, "Non-Linear Genetic Algorithms for Solving Problems," issued Jun. 19, 1990, Koza.

U.S. Pat. No. 5,136,686, "Non-Linear Genetic Algorithms for Solving Problems by Finding a Fit Composition of Functions," issued Aug. 4, 1992, Koza.

U.S. Pat. No. 5,148,513, "A Non-Linear Genetic Process for Use with Plural Co-Evolving Populations," issued Sep. 15, 1992, Koza, John R., and Rice, James P.

U.S. Pat. No. 5,343,554, "A Non-Linear Genetic Process for Data Encoding and for Solving Problems Using Automatically Defined Functions," issued Aug. 30, 1994, Koza, John R., and Rice, James P.

Other Publications

Aaserud, O. and Nielsen, I. Ring. 1995. Trends in current analog design: A panel debate. *Analog Integrated Circuits and Signal Processing*. 7(1) 5–9.

Andre, David and Koza, John R. 1996. Parallel genetic programming: A scalable implementation using the transputer architecture. In Angeline, Peter J. and Kinnear, Kenneth E. Jr. (editors). 1996. *Advances in Genetic Programming* 2. Cambridge, Mass.: The MIT Press.

Darwin, Charles, 1859, *On the Origin of Species by Means of Natural Selection*, John Murray.

de Garis, Hugo. 1993. Evolvable hardware: Genetic programming of Darwin machines. In International Conference on Neural Networks and Genetic Algorithms. Lecture Notes in Computer Science. Springer-Verlag.

Degrauwe, M. 1987. IDAC: An interactive design tool for analog integrated circuits. *IEEE journal of Solid State Circuits*. 22:1106–1116.

Gruau, Frederic. 1992a. *Cellular Encoding of Genetic Neural Networks*. Technical report 92–21. Laboratoire de l'Informatique du Parallélisme. Ecole Normale Supérieure de Lyon. May 1992.

Gruau, Frederic. 1992b. Genetic synthesis of Boolean neural networks with a cell rewriting developmental process. In Schaffer, J. D. and Whitley, Darrell (editors). *Proceedings of the Workshop on Combinations of Genetic Algorithms and Neural Networks* 1992. Los Alamitos, Calif.: The IEEE Computer Society Press.

Gruau, Frederic. 1993. Genetic synthesis of modular neural networks. In Forrest, Stephanie (editor). *Proceedings of the Fifth International Conference on Genetic Algorithms*. San Mateo, Calif.: Morgan Kaufinann Publishers Inc. Pages 318–325.

Gruau, Frederic. 1994a. *Neural Network Synthesis using Cellular Encoding and the Genetic Algorithm*. PhD Thesis. Ecole Normale Supérieure de Lyon.

Gruau, Frederic. 1994b. Genetic micro programming of neural networks. In Kinnear, Kenneth E. Jr. (editor). *Advances in Genetic Programming*. Cambridge, Mass.: The MIT Press. Pages 495–518.

Harjani, R., Rutenbar, R. A., and Carley, L. R. 1989. OASYS: A framework for analog circuit synthesis. *IEEE Transactions on Computer Aided Design*. 8:1247–1266.

Hemmi, Hitoshi, Mizoguchi, Jun'ichi, and Shimohara, Katsunori. 1994. Development and evolution of hardware behaviors. In Brooks, Rodney and Maes, Pattie (editors). *Artificial Life IV: Proceedings of the Fourth International Workshop on the Synthesis and Simulation of Living Systems*. Cambridge, Mass.: The MIT Press. Pages 371–376.

Higuchi, T., Niwa, T., Tanaka, H., Iba, H., de Garis, H. and Furuya, T. 1993. *Evolvable hardware—Genetic-based generation of electric circuitry at gate and hardware description language (HDL) levels*. Electrotechnical Laboratory technical report 93–4, Tsukuba, Ibaraki, Japan.

Holland, John H. 1975. *Adaptation in Natural and Artificial Systems: An Introductory Analysis with Applications to Biology, Control, and Artificial Intelligence*. Ann Arbor, Mich.: University of Michigan Press. Second edition. Cambridge, Mass.: The MIT Press 1992.

Holland, John H. 1986. Escaping brittleness: The possibilities of general-purpose learning algorithms applied to parallel rule-based systems. In Michalski, Ryszard S., Carbonell, Jaime G. and Mitchell, Tom M. *Machine Learning: An Artificial Intelligence Approach. Volume II.* P. 593–623. Los altos, Calif.: Morgan Kaufmann.

Koh, H. Y., Sequin, C. H. and Gray, P. R. 1990. OPASYN: A compiler for MOS operational amplifiers. *IEEE Transactions on Computer Aided Design*. 9:113–125.

Koza, John R., 1989. Hierarchical genetic algorithms operating on populations of computer programs, *Proceedings of the 11th International Joint Conference on Artificial Intelligence (IJCAI)*, San Mateo, Calif.: Morgan Kaufmann.

Koza, John R., 1990. *Genetic Programming: A Paradigm for Genetically Breeding Populations of Computer Programs to Solve Problems*, Stanford University, Dept. of Computer Science, Report No. STAN-CS-90-1314, June 1990.

Koza, John R. 1992. *Genetic Programming: On the Programming of Computers by Means of Natural Selection*. Cambridge, Mass.: The MIT Press.

Koza, John R. 1994. *Genetic Programming II: Automatic Discovery of Reusable Programs*. Cambridge, Mass.: The MIT Press.

Koza, John R. 1994b. *Architecture-Altering Operations for Evolving the Architecture of a Multi-Part Program in Genetic Programming*. Stanford University Computer Science Department technical report STAN-CS-TR-94-1528. Oct. 21, 1994.

Koza, John R., and Rice, James P. 1991. Genetic generation of both the weights and architecture for a neural network. In *Proceedings of International Joint Conference on Neural Networks, Seattle, July* 1991. Los Alamitos, Calif.: IEEE Press. Volume II. Pages 397–404.

Kruiskamp, Wim and Leenaerts, Domine. 1995. DARWIN: CMOS opamp synthesis by means of a genetic algorithm. *Proceedings of the 32nd Design Automation Conference.* New York, N.Y.: Association for Computing Machinery. Pages 433–438.

Maulik, P. C. Carley, L. R., and Rutenbar, R. A. 1992. A mixed-integer nonlinear programming approach to analog circuit synthesis. *Proceedings of the 29th Design Automation Conference.* Los Alamitos, Calif.: IEEE Press, Pages 698–703.

Mizoguchi, Junichi, Hemmi, Hitoshi, and Shimohara, Katsunori. 1994. Production genetic algorithms for automated hardware design through an evolutionary process. *Proceedings of the First IEEE Conference on Evolutionary Computation.* IEEE Press. Volume I. Pages 661–664.

Nielsen, Ivan Riis. 1995. A C-T filter compiler—From specification to layout. *Analog Integrated Circuits and Signal Processing.* 7(1):21–33.

Ning, Z., Kole, M., Mouthaan, T., and Wallings, H. 1992. Analog circuit design automation for performance. *Proceedings of the 14th IEEE CICC.* New York: IEEE Press. Pages 8.2.1–8.2.4.

Prusinkiewicz, Przemyslaw, and Lindenmayer, Aristid. 1990. *The Algorithmic Beauty of Plants.* New York: Springer-Verlag.

Quarles, Thomas, Newton, A. R., Pederson, D. O., and Sangiovanni-Vincentelli, A. 1994. *SPICE 3 Version 3F5 User's Manual.* Department of Electrical Engineering and Computer Science, University of California, Berkeley, Calif. March 1994.

Rutenbar, R. A. 1993. Analog design automation: Where are we? Where are we going? *Proceedings of the 15th IEEE CICC.* New York: IEEE Press. Pages 13.1.1–13.1.8.

Schaffer, J. D. and Whitley, Darrell (editors). 1992. *Proceedings of the Workshop on Combinations of Genetic Algorithms and Neural Networks 1992.* Los Alamitos, Calif.: The IEEE Computer Society Press.

SUMMARY OF THE INVENTION

A method and apparatus for automated design of complex structures, such as, but not limited to, analog and digital circuits. The present invention operates with a system having a population of entities of various sizes and shapes. Entities in the population comprise constructing actions. The present invention includes a method and apparatus for running an iterative process that creates a design of a structure that satisfies prespecified design goals, in which a series of steps is iterated. In one embodiment, the present invention includes a method and apparatus that iteratively executes constructing actions in entities in the population to develop a structure that has multiple types of components arranged in a topology, where each component is associated with a component value. The present invention also includes a method and apparatus for determining behavior of said developed structure.

DESCRIPTION OF THE DRAWINGS

The present invention will be understood more fully from the detailed description given below and from the accompanying drawings of the preferred embodiments of the invention, which, however, should not be taken to limit the invention to the specific embodiments but are for explanation and understanding only.

FIG. 7 shows the result of applying the Diode function to a modifiable wire.

FIG. 8 illustrates the results of applying the grounded-transistor function to a modifiable wire.

FIG. 9 illustrates the result of applying the QP function to a modifiable wire.

FIG. 10 illustrates the result of applying the QT0 function to a modifiable wire.

FIG. 25 is a one-input, one-output embryonic circuit with the initial two writing heads.

FIG. 26 illustrates a result of executing the C function acting on modifiable wire Z0 to create capacitor C3.

FIG. 27 illustrates a result of executing the FLIP function.

FIG. 28 illustrates a result of executing the SERIES function.

FIG. 47 illustrates an automatically defined function ADF0 from generation 31 used five times.

FIG. 48 is the best circuit of generation 31.

FIG. 49 illustrates the generic three-port substructure created by ADF0.

DETAILED DESCRIPTION OF THE INVENTION

Figure 1A:
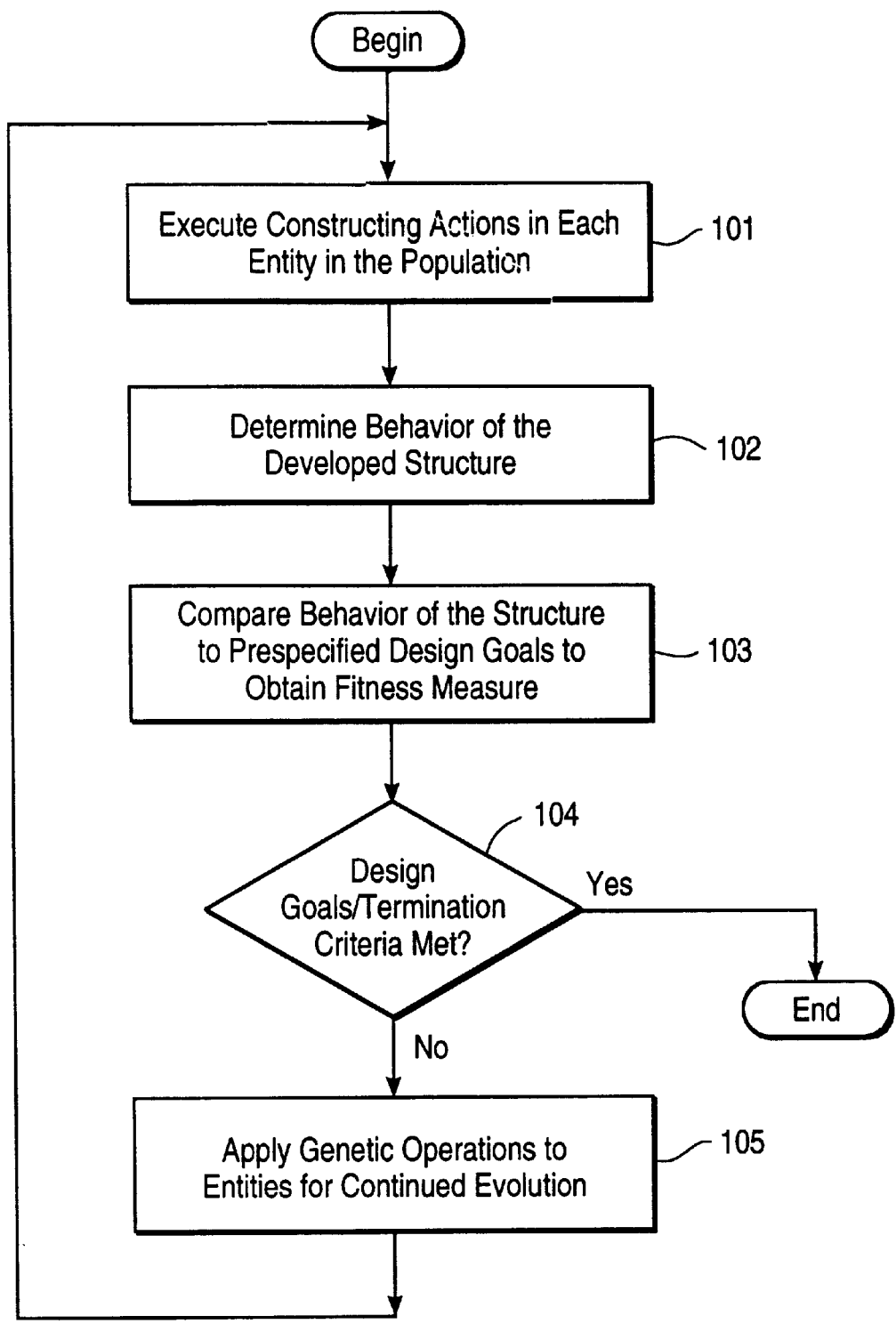
FIG. 1A is a flow chart diagram of the present invention.

A method and apparatus for designing complex structures is described. The complex structures that are to be designed may be electrical circuits, physical structures, mechanical structures, or other complex structures consisting of a plurality of types of components that are interfaced in accordance with a particular topological arrangement and that are sized in terms of numerical parameters or other types of parameters.

In the following detailed description of the present invention numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the Present Invention

The present invention provides for designing complex structures such as electrical circuits (e.g., analog circuits, mechanical structures, or other physical structures that satisfy certain design restrictions.

The electrical circuits of the present invention may comprise a wide variety of different types of components, including, but not limited to, resistors, capacitors, inductors, diodes, transistors, and energy sources. The individual components are arranged in a particular "topology" to form a circuit. In addition, each component may be further specified ("sized") by a set of component values (typically numerical). Circuits typically receive input signals from one or more input sources and produce output signals at one or more output ports. In one embodiment, circuits have at least one energy source (e.g., an incoming signal, a power supply, etc.). Thus, the present invention may completely specify an electrical circuit as to both its topology and the sizing of all of its components.

In one embodiment, a "component" is an object that has a type, some number of component values that further specify the component, and some number of interface points. Consider, for example, a resistor. A resistor is a component because it is an object of the type "resistor;" it has a single numerical component value of 1,000 Ohms and it has two interface points (leads, ends).

The interface points of a component may be operationally indistinguishable (as, for example, the two leads of a resistor) or they may be operationally different (as, for example, the collector, base, and emitter of a transistor).

A "circuit" includes (1) a set of components and (2) a set of undirected lines (arcs) between the interface points of the components. Each undirected line indicates the existence of a connection between the interface point of one component and another interface point (typically of another component).

When physical structures (such as a truss) are involved, the different types of components may include, but are not limited to, rigid load-supporting beams and flexible load-supporting cables.

When mechanical structures are involved, the types of components may include, but are not limited to, springs, masses, and dash pots.

Once the user specifies the design goals for a complex structure that is to be designed, the automated design process of the present invention generates a complete design. That is, the present invention is a goal-driven method for creating both the topology and the sizing of the complex structure. The present invention provides a method for accomplishing goal-driven design.

FIG. 1A illustrates the process of the present invention using genetic programming. The process is applied to a population of entities (e.g., program trees) that represent comlex structures (e.g., a truss, circuit, etc.). The population may be created in a variety of ways (e.g., randomly) or may be supplied to begin a process. Using the population of entities, the process begins by executing constructing actions in each entity in the population to develop the structure (processing block 101). In the present invention, the structures include a plurality of types of components arranged in a topology. Component values, if any, are associated with the components in the topology. In one embodiment, the constructing actions are applied to an embryonic structure during execution, which may be common to all entities or may differ initially between the different entities.

After execution of the constructing actions, the behavior of each developed structure in the population is determined (processing block 102). This determination may be, for instance, but not limited to, by simulation or observation. Once the behavior is determined, it is compared to prespecified design goals to obtain a fitness measure (processing block 103).

A test then determines if the design goals or termination criteria, as will be discussed further below, have been met (processing block 104). If they have, the process ends. On the other hand, if the design goals or termination criteria have not been met, genetic operations are applied to entities in the population to continue the evolutionary process of the present invention (processing block 105). After applying the genetic operations, a process returns to processing block 101 and the process continues to repeat.

The process of the present invention can be applied to many problems including the problem of designing analog electrical filter circuits. One such filter is a one-input, one-output electronic circuit that receives a signal as its input and passes the frequency components of the incoming signal that lie in a certain specified frequency range (the passband) while stopping the frequency components of the signal that lie in other frequency ranges (the stopband).

Genetic programming breeds a population of rooted, point-labeled trees (i.e., graphs without cycles) with ordered branches. There is a considerable difference between the kind of trees bred by currently known forms of genetic programming and the special kind of labeled cyclic graphs employed in the world of electrical circuits.

Electrical circuits are not trees, but, instead, are cyclic graphs. In fact, electrical circuits are cyclic graphs in which lines belong to a cycle (e.g., there are no loose wires or dangling components). Moreover, the lines of a graph that represents an electrical circuit are each labeled. Usually there are multiple labels on each line. The primary label on each line gives the type of an electrical component (e.g., a wire, resistor, capacitor, in some cases a portion of a component). The secondary label on each line gives the value of the component (with the exception of the components that do not carry any component value, such as diodes). A single numerical value is sufficient to specify many components (e.g., resistors, capacitors, and inductors). Multiple values are required to specify other components (e.g., the frequency and peak voltage of a sinusoidal wave source). Many components in electrical circuits have a polarity (e.g., diodes) or orientation or distinction of their leads (e.g., the collector, base, and emitter of a transistor). Electrical circuits may have at least one energy source (e.g., an incoming signal or an internal power source). Some component values are non-numerical, such as whether an energy source is "AC" or "DC." In addition, a group of component values may be conveniently specified by referring to a "model" that provides numerous values that are applicable to a component. For example, complicated components, such as transistors and diodes, are described by extensive models.

The present invention applies genetic programming to electrical circuits by establishing a mapping between the kind of point-labeled trees found in the world of genetic programming and the line-labeled cyclic graphs that represent electrical circuits.

Figure 1B:
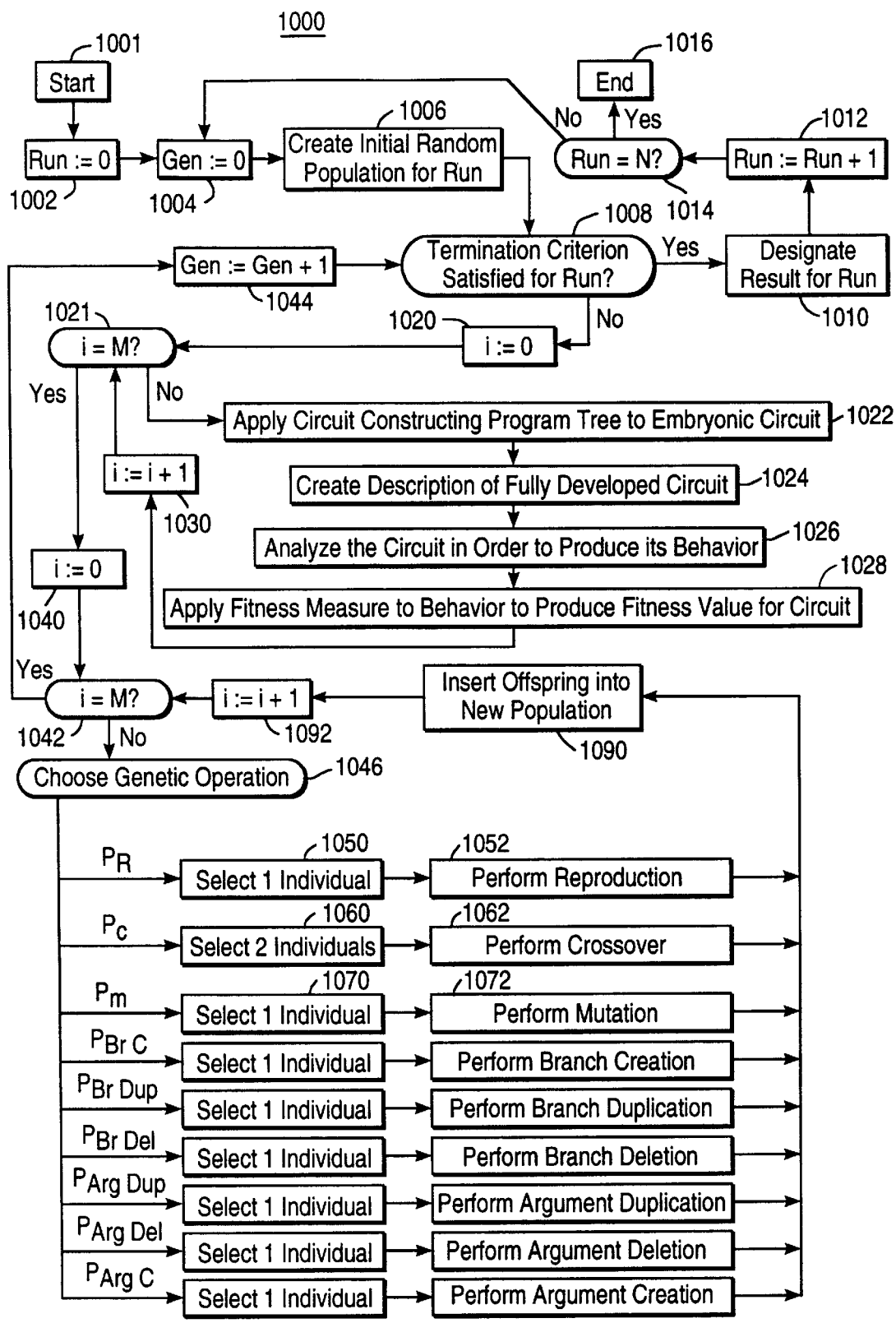
FIG. 1B is a flowchart for genetic programming for designing electrical circuits.

The developmental growth process used herein begins with a very simple, essentially useless, embryonic electrical circuit. In addition to this embryonic circuit, there is a program tree of the type ordinarily used in genetic programming. The electrical circuit is then developed as the functions in the program tree are executed and progressively applied to the embryonic circuit (and its successors). The functions in the program tree manipulate the embryonic circuit (and its successors) in a way that preserves the essential features of an electrical circuit. The final result of this developmental process is both the topology of the circuit and the sizing of all of its components. FIG. 1B illustrates one embodiment of the process of the present invention for automated design of electrical circuits. (FIG. 1B will be described in more detail below).

The process of the present invention that is described for electrical circuits can be applied to the automated design of other complex structures, such as mechanical structures. Mechanical structures are not trees, but, instead, are graphs. The lines of a graph that represents a mechanical structure are each labeled. The primary label on each line gives the name of a component (e.g., a mass). The secondary label on each line gives the value of the component.

The design that results from the process of the present invention may be fed, directly or indirectly, into a machine or apparatus that implements or constructs the actual structure. Such machines and their construction are well-known in the art. For example, electrical circuits may be made using well-known semiconductor processing techniques based on a design, and/or place and route tools. Programmable devices, such as FPGA, may be programmed using tools responsive to netlists, etc. Other structures, such as mechanical structures, may be physically constructed through the use of computer controlled processing and hardware (e.g., assembly line technology) that performs handling, movement, and attachment of components.

Constrained Syntactic Structure of the Program Trees in the Population

In the present invention, the program trees may contain any or all of the following five categories of functions:
(1) connection-creating functions that modify the topology of circuit from the embryonic circuit,
(2) component-creating functions that insert particular components into locations within the topology of the circuit in lieu of wires (and other components) and whose arithmetic-performing subtrees specify the numerical value (sizing) for each component that has been inserted into the circuit,
(3) automatically defined functions (subroutines) whose number and arity are specified in advance by the user, and
(4) automatically defined functions whose number and arity are not specified in advance by the user, but, instead, come into existence dynamically during the run of genetic programming as a consequence of the architecture-altering operations.

Figure 2:
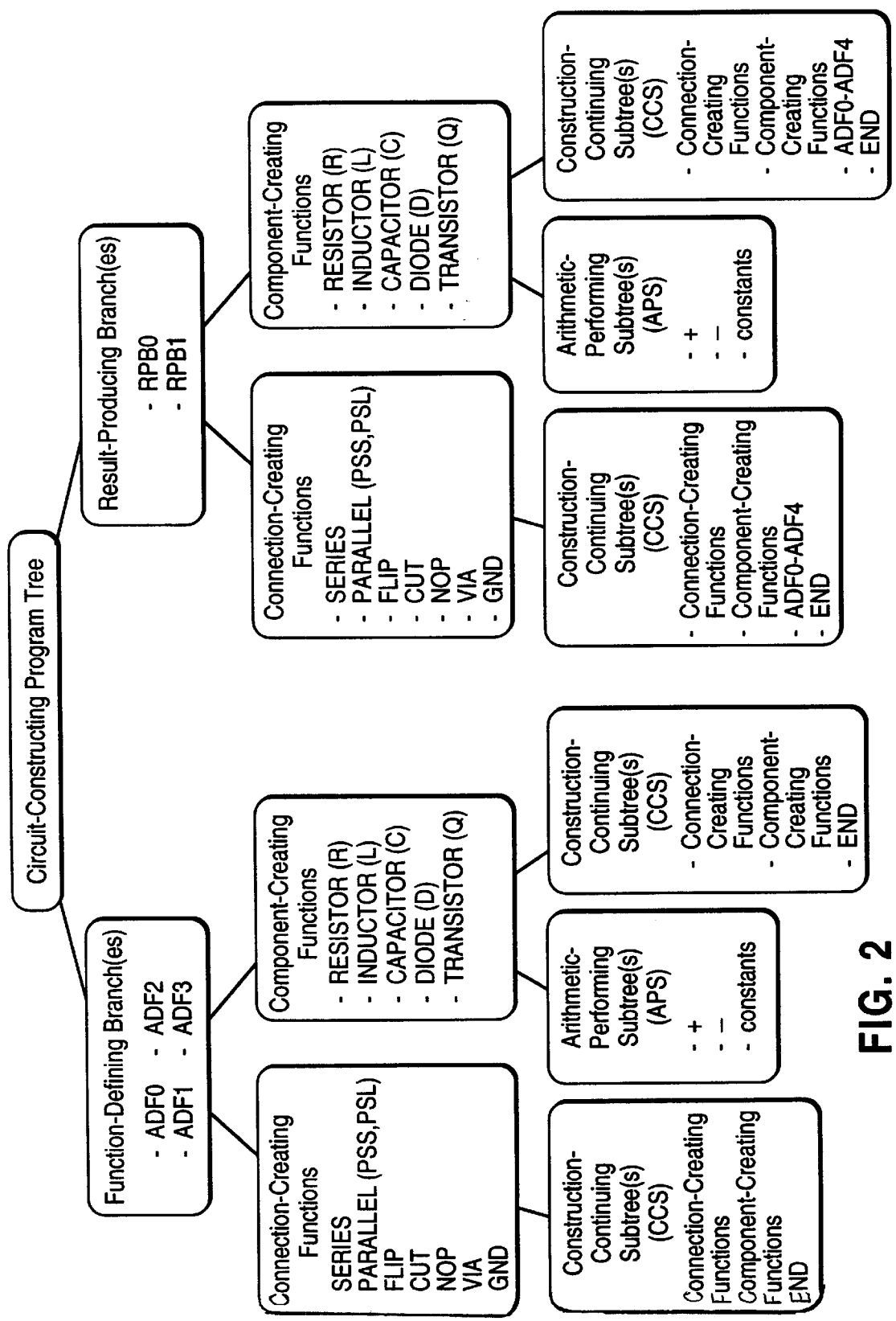
FIG. 2 illustrates one embodiment of a constrained syntactic structure.

In one embodiment, program trees conform to a constrained syntactic structure. Each component-creating function in a program tree has zero, one or more arithmetic-performing subtrees and one or more construction-continuing subtrees, while each connection-creating function has one or more construction-continuing subtrees. The arithmetic-performing subtree(s), if any, of each component-creating function comprises a composition of arithmetic functions and numerical constant terminals that together yield the numerical value for the component. The construction-continuing subtree specifies how the construction of the circuit is to be continued. FIG. 2 illustrates one constrained syntactic structure for the program trees. This particular figure assumes the existence of two result-producing branches and four automatically defined functions. Note that in other embodiments, program trees may not conform to this particular constrained syntactic structure or any constrained syntactic structure.

By convention, the arithmetic-performing subtree(s) are placed on the left and the construction-continuing subtree(s) are placed on the right.

Both the random program trees in the initial population (generation 0) and any random subtrees created by the mutation operation in later generations are created so as to conform to this constrained syntactic structure. This constrained syntactic structure is preserved by the crossover operation using structure-preserving crossover with "point typing" (as described in Koza 1994).

The One-Input, One-Output Embryonic Circuit

In the present invention, an electrical circuit is created by executing the program tree. Each program tree in the population creates one electrical circuit from an embryonic electrical circuit. The embryonic circuit used on a particular problem depends on the number of input signals and the number of output signals (probe points). It may also incorporate certain fixed components that are required or desired for the circuit being designed.

In one embodiment, the embryonic circuit contains one input signal, one probe point, two modifiable wires, a fixed source resistor, and a fixed load resistor. In the embryonic circuit, the two modifiable wires each initially possess a writing head represented in the figures herein by the circled highlight. A circuit is developed by modifying the component to which a writing head is pointing in accordance with the functions in the circuit-constructing program tree. Each connection-creating and component-creating function in the program tree modifies its associated highlighted component in the developing circuit in a particular way and specifies the future disposition of successor writing head(s), if any.

Figure 3:
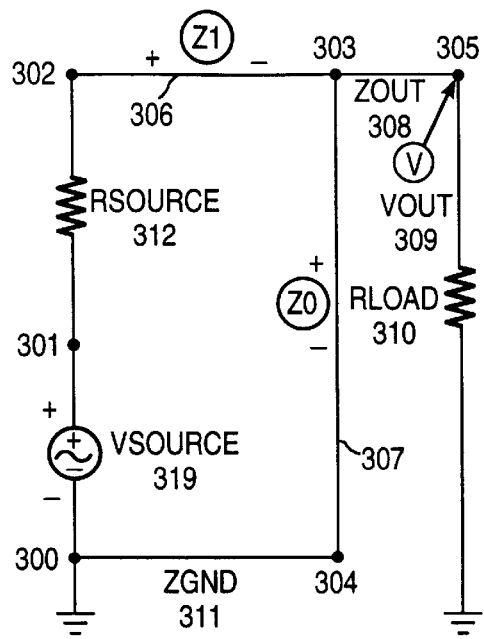
FIG. 3 illustrates one embodiment of a one-input, one-output embryonic electrical circuit.

FIG. 3 illustrates one embodiment of a one-input, one-output embryonic circuit. Referring to FIG. 3, the energy source is a 2 volt voltage source VSOURCE labeled 319 whose negative (−) end is connected to node 300 (ground) and whose positive (+) end is connected to node 301.

Note that the term "end" or "lead" or "interface" is used to describe the places at which a component becomes connected to other components in the overall circuit structure.

There is a fixed 1000-Ohm source resistor RSOURCE labeled 312 between nodes 301 and 302. There is a modifiable wire Z1 (i.e., a wire with a writing head) labeled 306 between nodes 302 and 303 and another modifiable wire Z0 labeled 307 between nodes 303 and 304. There are circles around modifiable wires Z0 and Z1 to indicate that the two writing heads point to them. There is a fixed isolating wire ZOUT labeled 308 between nodes 303 and 305, a voltage probe labeled VOUT labeled 309 at node 305, and a fixed 1000-Ohm load resistor RLOAD labeled 310 between nodes 305 and 300 (ground). There is an isolating wire ZGND labeled 311 between nodes 304 and 300 (ground). At the beginning of the developmental process, there is a writing head pointing to each of the two modifiable wires Z0 and Z1. All subsequent development of the circuit originates from writing heads. A circuit is developed by modifying the component to which a writing head is pointing (and sometimes the component and one of its nodes) in accordance with the associated function in the circuit-constructing program tree.

This particular embryonic circuit is designed so that the number of lines impinging at any one node in the circuit is either two or three. This condition is maintained by all of the functions in the circuit-constructing program tree.

The isolating wire ZOUT 308 protects the probe point VOUT 309 and the load resistor RLOAD 310 from modification during the developmental process and the isolating wire ZGND 311 similarly protects the negative terminal 300 of VSOURCE 319 and the ground.

Note that little domain knowledge went into this embryonic circuit. Specifically, (1) the embryonic circuit is a circuit, (2) the embryonic circuit has one input and one output, and (3) there are modifiable connections between the output and the source and between the output and ground. Note that this embryonic circuit is applicable to any one-input, one-output circuit. It is the fitness measure that directs the evolutionary search process to the desired circuit. This is not to say that there is any guarantee of a successful outcome of any particular run of genetic programming on any particular previously unseen problem. But it does say that the user introduces very little information into the design process other than to specify the nature of the inputs and outputs by means of the embryonic circuit and to describe what is desired by means of the fitness measure.

A human designer may find it advantageous to apply his domain knowledge of a particular field to create the embryonic circuit for a particular problem. Such knowledge would bias the search for a satisfactory design in the direction of particular known or desirable characteristics. Also, some design problems call for the inclusion of particular components (possibly arranged in particular ways) as a part of the overall design.

In one embodiment, the same embryonic circuit is used as a starting point for development for all individual program trees in the population. That is, there is a common embryonic circuit that is the starting point for the developmental process for each individual program tree in the population. The individual entity in the population consists of the program tree. When an individual entity in the population is executed, the execution includes applying the constructing actions of the program tree contained in the particular individual entity to the common embryonic circuit. Note that in alternate embodiments, the program trees may begin with a different embryonic circuits.

For some problems, it may be advantageous to co-evolve concurrently a pair of entities that includes the embryonic circuit and the program tree. That is, each entity in the population has a pair consisting of an embryonic circuit and a program tree. When an individual entity in the population is executed, the execution includes applying the constructing actions of the program tree contained in the particular individual entity to the particular embryonic circuit contained in the particular individual entity. The evolutionary process will favor those entities in the population whose embryonic circuit and program trees that, when acting in conjunction with one another, better satisfy the design goals of the problem.

Although an embyonic circuit is used in one embodiment of the present invention, it should be noted that it is not necessary to have an embryonic circuit at all. Instead, the set of circuit-constructing functions can contain functions that build the entire circuit. It is, however, highly advantageous to separately provide an embryonic circuit since this approach guarantees that the circuit has certain minimum essential features (e.g., access to the incoming signal, inclusion of a ground, inclusion of a probe point, etc.). In the absence of an embryonic circuit, many individuals would lack, for example, any incoming signal source (and hence achieve poor scores in terms of satisfying the design goals of a problem). Evolving such fundamental features would require the expenditure of additional effort. Thus, in one embodiment, these minimal features are provided, in advance, in the form of the embryonic circuit.

Component-Creating Functions

Each individual circuit-constructing program tree in the population generally contains component-creating functions and connection-creating functions.

Components are inserted into the topology of a circuit by the component-creating functions. Components also acquire their sizing from the component-creating functions. Each component-creating function in a program tree points to a highlighted component (i.e., a component with a writing head) in the developing circuit and modifies the highlighted component in some way. Each component-creating function spawns one or more writing heads (through its construction-continuing subtrees).

Each component-creating function leaves the number of lines impinging at any one node in the circuit at either two or three. Note that this is not a requirement.

Some of the component-creating functions are context-free and some are context-sensitive. When a component-creating function is context-free, the outcome depends only on the single highlighted component (i.e., the component with the writing head). When a component-creating function is context-sensitive, the outcome depends not just upon the single highlighted component, but also upon other nearby elements of the circuit structure. The present invention supports the creation of complex structures resulting from the execution of context-sensitive functions as well as context-free functions.

Table 1 lists some illustrative component-creating functions for electrical circuits. The table shows the short name of the function, a longer and more descriptive name for the function, and its arity (i.e., number of arguments that it takes). This table is not an exhaustive list of possible useful component-creating functions for electrical circuits, but is intended to illustrate the nature of possible component-creating functions.

TABLE 1

Component-creating functions.

| Name | Short Description | Arity |
|---|---|---|
| C | Component-creating function for a capacitor | 2 |
| R | Component-creating function for a resistor | 2 |
| L | Component-creating function for an inductor | 2 |
| D | Component-creating function for a diode | 1 |
| QG | Component-creating function for a transistor whose emitter lead is connected to ground | 2 |
| QP | Component-creating function for a transistor whose collector lead is connected to a positive voltage source | 2 |
| QT0, . . . , QT11 | Component-creating functions for a transistor | 3 |
| NE | Neon bulb | 2 |
| DC | DC power supply | 2 |
| AC | AC power supply | 2 |
| QVIAC | Component-creating function for a transistor with via from its collector | 0 |
| QVIAB | Component-creating function for a transistor with via from its base | 0 |
| QVIAE | Component-creating function for a transistor with via from its emitter | 0 |
| TRANFORMER0, . . . , TRANFORMER5 | Component-creating function for a transformer | 4 |
| TWO_LEAD_OPAMP0 and TWO_LEAD_OPAMP1 | Two-argument component-creating function for an opamp | 2 |
| THREE_LEAD_OPAMP0, . . ., THREE_LEAD_OPAMP11 | Three-argument component-creating function for an opamp | 3 |
| FIVE_LEAD_OPAMP0, . . . FIVE_LEAD_OPAMP3 | Five-argument component-creating function for an opamp | 4 |
| INVERTER | Component-creating function for a digital INVERTER | 2 |
| AND0, . . . , AND11 | Component-creating function for a digital AND | 3 |
| OR0,. . . , OR11 | Component-creating function for a digital OR | 3 |

The construction-continuing subtree(s) of each component-creating function points to a successor function (s) or terminal(s) in the circuit-constructing program tree.

The arithmetic-performing subtree(s) of the component-creating functions contains a composition of arithmetic functions (addition and subtraction) and random constants (in the range $-1.000$ to $+1.000$). The arithmetic-performing subtree specifies the numerical value(s) of the component by returning a floating-point value.

Typical values of components in electrical circuits span a range of many orders of magnitude. Therefore, it is useful to view component values on a logarithmic scale. Therefore, in one embodiment of this design system, it has been found to be useful to interpret the floating-point value returned by an arithmetic-performing subtree as the value for the component in a range of 11 orders of magnitude using a unit of measure that is appropriate for the particular type of component involved. The arithmetic-performing subtree returns a floating-point value which is, in turn, interpreted as the value of the component in the following way: If the return value is between $-5.0$ and $+5.0$, U is equated to the value returned by the subtree. If the return value is less than $-100.0$ or greater than $+100$, U is set to zero. If the return value is between $-100$ and $-5.0$, U is found from the straight line connecting the points (−100, 0) and (−5, −5). If the return value is between +5.0 and +100, U is found from the straight line connecting (5, 5) and (100, 0). The value of the component is $10^U$ in a unit that is appropriate for the type of component. This mapping gives the component a value that is centered on an appropriate or predetermined value that was settled upon after examining a large number of practical circuits in contemporary electrical engineering books. A somewhat different method of interpretation would be appropriate for certain specialized categories of applications (e.g., where more extreme values are commonly needed).

If a component (e.g., a diode) has no numerical values, there is no left subtree (argument). If more than the usual one numerical value is required to describe the component, there are multiple arithmetic-performing subtrees (arguments). For example, the complete specification of an independent alternating current sinusoidal voltage source may require five numerical components, namely the amplitude of the voltage sourse, its frequency, its offset voltage, its time delay, and its damping factor. A component may require additional numerical component values in situations where it is necessary to specify the initial condition of the component (e.g., the initial voltage on a capacitor, the initial current on an inductor, or the initial voltage on a transistor in certain oscillator circuits).

The Resistor Function

In the present invention, the two-argument R ("resistor") function causes the highlighted component to be changed into a resistor.

Figure 4:
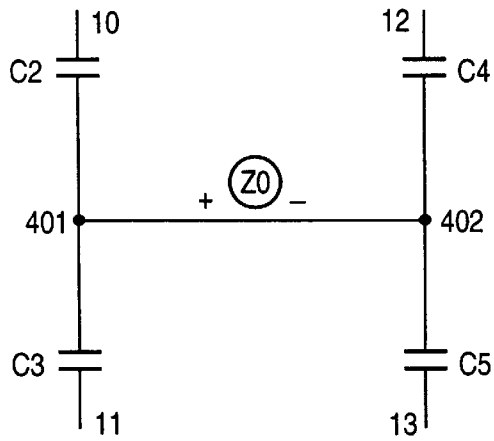
FIG. 4 illustrates a circuit containing a modifiable wire Z0.

FIG. 4 shows a modifiable wire Z0 labeled 403 connecting nodes 401 and 402 of a partial circuit containing four capacitors. Modifiable wire Z0 labeled 403 possesses a writing head (i.e., is highlighted with a circle).

Figure 5:
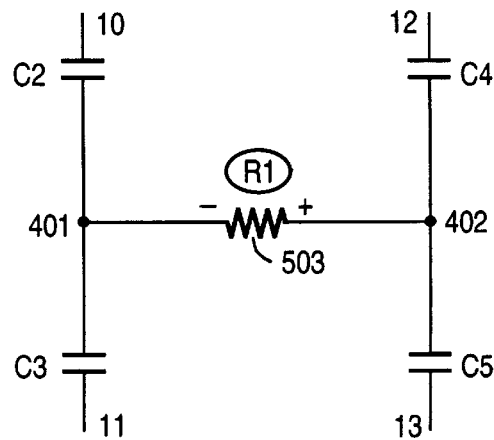
FIG. 5 illustrates the result of applying the Resistor (R) function to a modifiable wire.

FIG. 5 shows the result of applying the R function to the modifiable wire Z0 of FIG. 4, thereby creating a resistor R1 labeled 503 connecting nodes 401 and 402 in place of the modifiable wire Z0 labeled 403 in FIG. 4. Note that the polarity of the resistor matches that of the modifiable wire Z0 that it replaces.

The value of this component (5 ohms) is specified by the arithmetic performing subtree. In one embodiment, the value of the resistor is the antilogarithm (base 10) of the intermediate value (U) in kilo-Ohms (K Ohms).

The netlist for a circuit is a list that identifies each component of the circuit, the nodes to which that component is connected, and the value of that component. The netlist for the circuit is not created until the circuit is fully developed. Moreover, the netlist that is passed to the SPICE simulator for electrical circuits does not contain wires. However, if, for the sake of discussion, the netlist were created for FIG. 4, the following single line would relate to modifiable wire Z0:

Z0 402 401

The interpretation of this line of the netlist is that there is a component called Z0 that is connected between node 402 and node 401 of the circuit. The positive end of the component is connected to node 402, while the negative end is connected to node 401.

The effect of the R function creating a 5-Ohm resistor R1 is to change this single line into following line:

R1 402 401 5 ohms

The interpretation of this line of the netlist is that there is a resistor called R1 that is connected between node 402 and node 401 of the circuit and that this component has a value of 5 Ohms. Recall that the first-listed node in a netlist is the node connected to the positive end of a component.

Note that the component-creating functions (e.g., the R function described above) might have been defined so that that component thereafter always remains in the circuit once a wire is converted into a component. This alternative approach can be easily implemented by not giving the newly created component a writing head (i.e., not having a construction-continuing subtree for the component-creating function). The disadvantage of this alternative approach can be illustrated by considering how to create a parallel (or series) composition of resistors. If the alternative approach is used, this composition can only be creating by first applying the parallel (or series) division function to a wire and then converting the just-created wires into resistors. The approach described above is more flexible for many situations in that it permits a second way of achieving the composition, namely first converting one wire into a resistor and then applying the parallel (or series) division function to just-created resistor. Thus, in one embodiment, a newly created component carries a writing head.

The Capacitor Function

The two-argument C ("capacitor") function causes the highlighted component to be changed into a capacitor. In one embodiment, the value of the capacitor is the antilogarithm (base 10) of the intermediate value U computed in the manner described above in nano-Farads (nF). This mapping gives the capacitor a value within a range of plus or minus 5 orders of magnitude centered on 1 nF.

Figure 6:
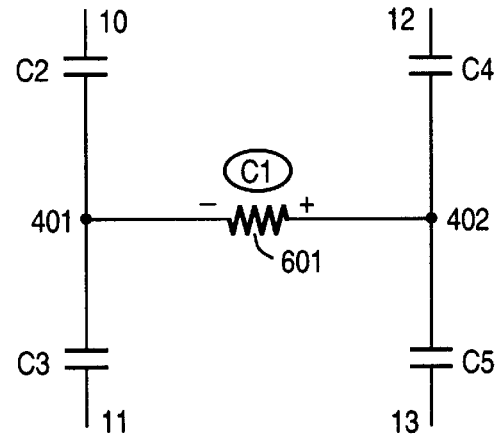
FIG. 6 illustrates the result of applying the Capacitor (C) function to a modifiable wire.

FIG. 6 shows the result of applying the C function to the modifiable wire Z0 of FIG. 4, thereby creating a capacitor C1 labeled 601 connecting nodes 401 and 402.

The Inductor Function

The two-argument L ("inductor") function causes the highlighted component to be changed into an inductor. In one embodiment, the value of the inductor is the antilogarithm (base 10) of the intermediate value U in micro-Henrys. This mapping gives the inductor a value within a range of plus or minus 5 orders of magnitude centered on 1 micro-Henrys.

The Diode Function

The one-argument D ("diode") function causes the highlighted component to be changed into a diode. Diodes have no explicit component value and hence there is no arithmetic-performing subtree. Thus, this function has only a construction-continuing subtree and is a one-argument function.

FIG. 7 shows the result of applying the D function to the modifiable wire Z0 of FIG. 4, thereby creating a diode D1 labeled 701 connecting nodes 401 and 402.

An example of the one line in the netlist created by the D function follows:

D1 402 401 D1N4148

The interpretation of the line is that the anode (+end) of diode D1 is connected to node 402, the cathode (− end) is connected to node 401, and the diode is the D1N4148 model of the diode. Note that although a diode has no explicit numerical component value, the specification of the model implicitly specifies the values of a large number of parameters to the SPICE simulator. In practice, it would be common for only one model of diode to be available for a particular design problem. However, in the extreme case, every one of the values of the numerous separate parameters contained in the model for the diode might be viewed as a potential component value (and assigned a separate arithmetic-performing subtree).

Also, note that for some problems, it may be desirable to make the model itself a component value for the component. The model would be an example of a non-numerical component value. The possible alternative values of the model would range over the different available models for the component. Models similarly appear herein in connection with several other types of components (e.g. model Q2N3904 for transistors).

The QG Function

The two-argument QG ("grounded transistor") function causes the highlighted component to be changed into a transistor whose emitter is connected to ground. The component value of a transistor is the initial condition (e.g., 9 volts) at the collector of the transistor. Initial conditions are not ordinarily used with transistors; however, they are required by the SPICE simulator for certain circuits (e.g., certain oscillators). If no initial condition is required, then this function would be similar to the D function in that it would have only one argument (i.e., the argument for its construction-continuing subtree).

FIG. 8 shows the result of applying the QG function to the modifiable wire Z0 of FIG. 4, thereby creating a transistor Q1 labeled 801 connecting nodes 401 and 402. The collector of the transistor is connected to the +end of Z0 (node 402 of FIG. 4) and the base is connected to the − end of Z0 (node 401 of FIG. 4).

An example of the two lines in the netlist created by the QG function follows:

Q1 402 401 0 Q2N3904
.IC V(402)=9 volts

The interpretation of the first line is that the collector of transistor Q1 is connected to node 402 of FIG. 8, the base is connected to node 401 of FIG. 8, the emitter is connected to node 0 (ground), and the model of the transistor is the Q2N3904 model. Examples of other transister models are Q2N3055, Q2N2222 and DH3725C. The interpretation of the optional second line is that the optional initial condition for the collector node 402 of FIG. 8 is 9 volts.

The QP Function

The two-argument QP ("positive-voltage-sourced transistor") function causes the highlighted component to be changed into a transistor whose collector is connected to a positive voltage source (e.g., 5 volts DC at node 50 of FIG. 9). The component value of a transistor is the initial condition (e.g., 9 volts) at the base of the transistor. Initial conditions are not ordinarily used with transistors; however, they are required by the SPICE simulator for certain circuits (e.g., certain oscillators). If no initial condition is required, then this function would be similar to the D function in that it would have only one argument (i.e., the argument for its construction-continuing subtree).

FIG. 9 shows the result of applying the QP function to the modifiable wire Z0 of FIG. 4, thereby creating a transistor Q1 labeled 901 connecting nodes 401 and 402. The base of the transistor is connected to the + end of Z0 (node 402 of FIG. 4) and the emitter is connected to the − end of Z0 (node 401 of FIG. 4). The collector is connected to a +5 volts DC positive voltage source at node 50 of FIG. 9. An example of the two lines in the netlist created by the QG function follows:

Q1 50 402 401 Q2N3904
.IC V(402)=9 volts

The interpretation of the first line is that the collector of transistor Q1 901 is connected to node 50 which is a +5 volt DC power source, the base of the transistor is connected to node 402 of FIG. 9, the emitter of the transistor is connected to node 401, and the model of the transistor is the Q2N3904 model. The interpretation of the second line is that the initial condition for the base node 402 (of FIG. 9) is 9 volts.

The QVIAC Function

The eight functions in the QVIAC ("transistor with via from collector") group of zero-argument functions (called QVIAC0, . . . , QVIAC7) cause the highlighted component to be changed into a transistor whose collector is connected to a numbered port (called a via). The writing head is lost by the execution of a QVIAC function. Since there is no writing head on the new transistor itself, a transistor remains in the developing circuit once it is inserted by an QVIAC function (or the closely related QVIAB or QVIAE functions described in the next section).

The QVIAC function replaces the highlighted component with a transistor whose base is connected to the negative end of the highlighted component; whose emitter is connected to the positive end of the highlighted component; and whose collector is connected to a particular numbered port. The port is connected to a designated one of eight imaginary layers (numbered from 0 to 7) in the imaginary wafer on which the circuit resides.

If no other part of the fully developed circuit connects to a particular numbered layer designated by a QVIAC (or QVIAB or QVIAE) function, then the port connecting to that layer is useless. In that event, the port is deleted and the now-unattached lead of the transistor is reattached to the node to which the positive end of the highlighted component was connected. This deletion and reattachment is done just prior to the creation of the netlist for the circuit.

Figure 83:
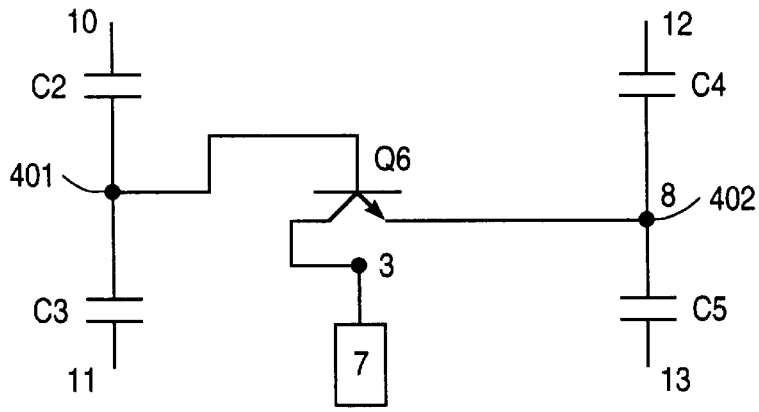
FIG. 83 illustrates the result of applying the QVIAC7 function.

FIG. 83 shows the result of applying the QVIAC7 function to the modifiable wire Z0 of FIG. 4, thereby creating a transistor Q6 positioned between node 401, node 402, and the port numbered 7. The base of the transistor is connected to the negative end of the highlighted component (node 401) and the emitter is connected to its positive end (node 402). The collector is connected to the port numbered 7.

The QVIAB Function

The eight functions in the QVIAB ("transistor with via from base") group of zero-argument functions (called QVIAC0, . . . , QVIAB7) cause the highlighted component to be changed into a transistor whose base is connected to a numbered port (via). The writing head is lost by the execution of a QVIAB function.

The QVIAB function replaces the highlighted component with a transistor whose emitter is connected to the negative end of the highlighted component; whose collector is connected to the positive end of the highlighted component; and whose base is connected to a particular numbered port.

Figure 84:
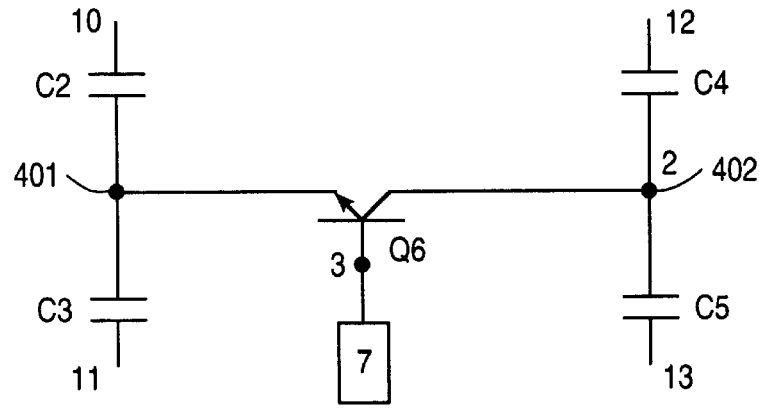
FIG. 84 illustrates the result of applying the QVIAB7 function.

FIG. 84 shows the result of applying the QVIAB7 function to the modifiable wire Z0 of FIG. 4, thereby creating a transistor Q6 positioned between node 401, node 402, and the port numbered 7.

The QVIAE Function

The eight functions in the QVIAE ("transistor with via from emitter") group of zero-argument functions (called QVIAE0, . . . , QVIAE7) cause the highlighted component to be changed into a transistor whose emitter is connected to a numbered port (via). The writing head is lost by the execution of a QVIAE function.

The QVIAE function replaces the highlighted component with a transistor whose collector is connected to the negative end of the highlighted component; whose base is connected to the positive end of the highlighted component; and whose emitter is connected to a particular numbered port.

Figure 85:
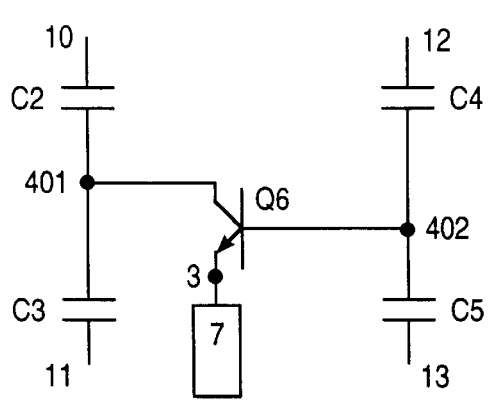
FIG. 85 illustrates the result of applying the QVIAE7 function.

FIG. 85 shows the result of applying the QVIAE7 function to the modifiable wire Z0 of FIG. 4, thereby creating a transistor Q6 between node 401, node 402, and the port numbered 7.

The QT Functions

Each of the 12 functions in the group of four-argument QT ("transistor") functions (called QT0, . . . , QT11) causes a transistor to be inserted in place of one of the nodes to which the highlighted component is currently connected (while also deleting the highlighted component). Each QT function also creates five new nodes and three new modifiable wires. After execution of a QT function, there are three writing heads that point to three new modifiable wires. The component value resulting from the application of a QT function is the initial condition (e.g., 9 volts) at the collector of the transistor. Since there is no writing head on the new transistor itself, a transistor remains in the developing circuit once it is inserted by a QT function (unless a CUT function, described below, subsequently causes its deletion).

The 12 QT functions operate in slightly different ways depending on the polarity of the original highlighted component, the numbering of existing components in the circuit, and the degree of the nodes to which the highlighted component is connected.

First consider the case where both nodes of the highlighted component (i.e., nodes 401 and 402 of FIG. 4) are of degree 3. As will be seen, the 12 QT functions produce 12 distinct results in this situation.

The first six functions (QT0, . . . , QT5) insert the transistor at the node to which the positive end of the highlighted component is connected, while the second six functions (QT6, . . . , QT11) insert the transistor at the negative end. That is, QT0, . . . , QT5 cause the node to which the positive end of the highlighted component is connected to become the "active" node, while QT6, . . . , QT11 cause the node to which the negative end of the highlighted component is connected to become the "active" node.

The operation of the six functions in these two subsets depends on the numbering of three existing components in the circuit that are connected to the "active" node (i.e., the node that is to be converted into a transistor). Since there are six possible permutations of three objects, there are six possible ways of connecting the collector, base, and emitter of the new transistor.

Table 2 shows which lead of the new transistor (collector, base, and emitter) is to become connected to the lowest-numbered, middle-numbered, and highest-numbered existing component at an active node of degree 3.

TABLE 2

Operation of the QT functions when the active node is of degree 3.

| Functions | Lowest | Middle | Highest |
| --- | --- | --- | --- |
| QT0 and QT6 | Collector | Base | Emitter |
| QT1 and QT7 | Collector | Emitter | Base |
| QT2 and QT8 | Base | Collector | Emitter |
| QT3 and QT9 | Base | Emitter | Collector |
| QT4 and QT10 | Emitter | Collector | Base |
| QT5 and QT11 | Emitter | Base | Collector |

For example, suppose that the QT0 function is applied to the modifiable wire Z0 of FIG. 4. Since QT0 is in the first subset (i.e., QT0, . . . , QT5), QT0 operates on the positive end of the highlighted component, Z0 of FIG. 4. That is, node 402 is the "active" node that will be converted into a transistor (and node 401 is the "passive" node). The three existing components at active node 402 of FIG. 4 are Z0, C4, and C5. Table 2 specifies that the collector of the new transistor is to be connected to the lowest-numbered component, that the base is to be connected to the middle-numbered component (i.e., C4 of FIG. 4), and that the emitter is to be connected to be highest-numbered component (i.e., C5 of FIG. 4).

FIG. 10 shows the result of applying the QT0 function to the modifiable wire Z0 of FIG. 4, thereby creating a transistor Q6.

First, the QT0 function creates three new modifiable wires Z7, Z8, and Z9 and five new nodes (1014, 1015, 1016, 1017, and 1018).

Second, the first new wire (Z7) connects the passive node (i.e., node 401) and one lead of the new transistor at new node 1018. The polarity of this new wire is established by the end of the original component that is connected to the passive node (i.e., by the fact that the negative end of the original component Z0 was at node 401). Thus, node 401 is connected to the negative end of Z7 and node 1018 is connected to the positive end of Z7.

Third, the active node (i.e., node 402) is divided into two new nodes 1014 and 1016.

Fourth, the second new wire (Z8) connects new node 1014 to one lead of the new transistor at new node 1015. This new wire acquires its polarity based on whether the positive or negative end of the original highlighted component was positive or negative at the active node (i.e., node 402).

Fifth, the third new wire (Z9) connects new node 1016 to one lead of the new transistor at new node 1017. This new wire acquires its polarity in the same manner 215 as new wire Z8.

Sixth, the collector, base, and emitter leads of the new transistor are connected to new nodes 1018, 1015, and 1017, respectively, in the manner specified by the entries in Table 2 for the particular QT function being executed.

The following is an example of the two lines in the netlist created by this QT0 function:

Q6 1018 1015 1017 Q2N3904

.IC V(1018)=9 volts

The interpretation of the first line is that the collector of transistor Q6 is connected to node 1018, the base of the transistor is connected to node 1015, the emitter of the transistor is connected to node 1017, and the model of the transistor is the Q2N3904 model. The interpretation of the optional second line is that the optional initial condition for the collector (node 1018) is 9 volts.

As a second example, suppose that the QT8 function is applied to the modifiable wire Z0 of FIG. 4. Since QT8 is in the second subset (i.e., QT6, . . . , QT11), QT8 operates on the negative end of the highlighted component, Z0. That is, node 401 is the "active" node that will be converted into a transistor and node 402 is the "passive" node. The three existing components at node 402 are Z0, C2, and C3.

Figure 11:
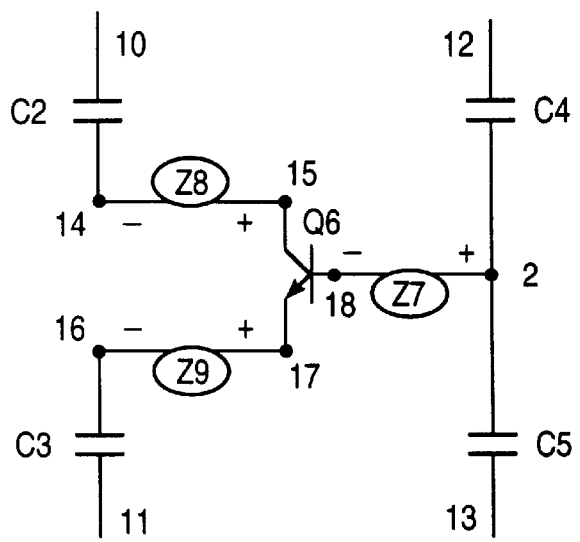
FIG. 11 illustrates the result of applying the QT8 function to a modifiable wire.

Table 2 shows that the base of the new transistor is to be connected to the lowest-numbered component (i.e., Z0), the collector is to be connected to the middle-numbered component (i.e., C2), and the emitter is to be connected to be highest-numbered component (i.e., C3). FIG. 11 shows the result of applying the QT8 function to the modifiable wire Z0 of FIG. 4, thereby creating a transistor Q6.

Now consider the case where only one node of the highlighted component is of degree 3 and the other node is of degree 2. In this case, the one node of degree 3 is the active node and the other node is the inactive node. Table 2 applies in the same manner as before.

Figure 12:
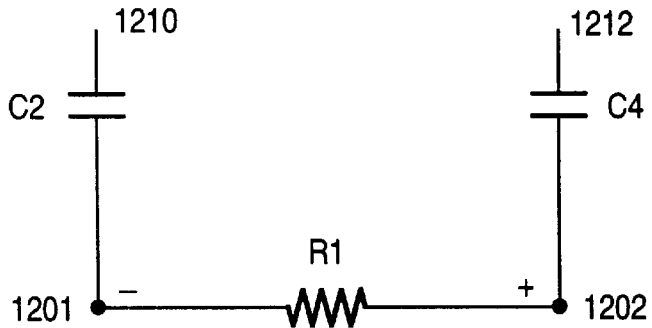
FIG. 12 illustrates a resistor R1 connected to two nodes of degree 2.

Finally, consider the case where both nodes of the highlighted component are of degree 2. FIG. 12 shows a highlighted component that is connected to two nodes of degree 2.

As before, the first six functions (QT0, . . . , QT5) insert the transistor at the node to which the positive end of the highlighted component is connected, while the second six functions (QT6, . . . , QT11) insert the transistor at the negative end.

Table 3 shows which lead (collector, base, and emitter) of the new transistor is connected to the highlighted component and which two leads are to be connected to the other component at the active node (i.e., other than the highlighted component).

TABLE 3

Operation of the QT functions when both the active and inactive nodes are of degree 2.

| Functions | Highlighted Original Component | The other component at the active node |
|---|---|---|
| QT0, QT2, QT6 and QT8 | Emitter | Collector and Base |
| QT1, QT4, QT7 and QT10 | Base | Collector and Emitter |
| QT3, QT5, QT9, and Q11 | Collector | Base and Emitter |

Figure 13:
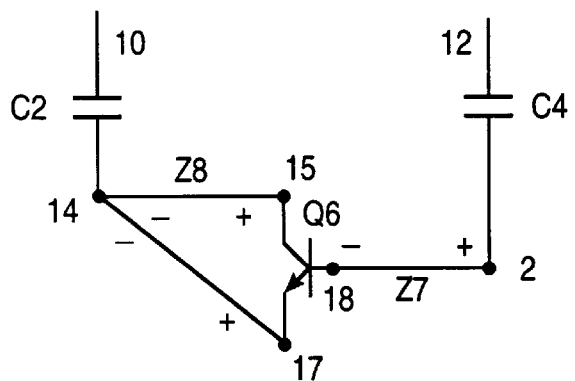
FIG. 13 illustrates a result of applying the QT7 function when both the active and inactive nodes are of degree 2.

For example, suppose that the QT7 (or QT10) function is applied to the highlighted component of FIG. 12. Since QT7 is in the second subset (i.e., QT6, . . . , QT11), QT7 operates on the negative end of the highlighted component, Z0. That is, node 1201 is the "active" node that will be converted into a transistor and node 1202 is the "passive" node. The two existing components at active node 1201 are R1 and C2. Table 3 shows that the base of the new transistor is to be connected to the highlighted component (i.e., R1) and that the collector and emitter are both to be connected to the other component that is connected to the active node (i.e., C2). FIG. 13 shows the result of applying the QT7 function to the resistor R1 of FIG. 12, thereby creating a transistor Q6.

In one embodiment, for purposes of creating the initial random population at generation 0, all the functions that belong to a group of functions are weighted so that the cumulative probability of choosing one of the functions of the group equals the probability of selecting any other non-grouped function from the function set. Thus, for example, each of the 12 QT functions has a probability of being chosen equal to $\frac{1}{12}$ of the probability of choosing, say, the L function or the C function. In one embodiment, this approach to weighting is also generally used for all other similar groups of functions.

As shown, the general principles used in defining the QT group of component-creating functions can be applied to any three-lead component (for example, an opamp, as described later).

The Digital Inverter Function

The two-argument digital INVERTER (negation) function causes the highlighted component to be changed into a digital inverter component.

Figure 106:
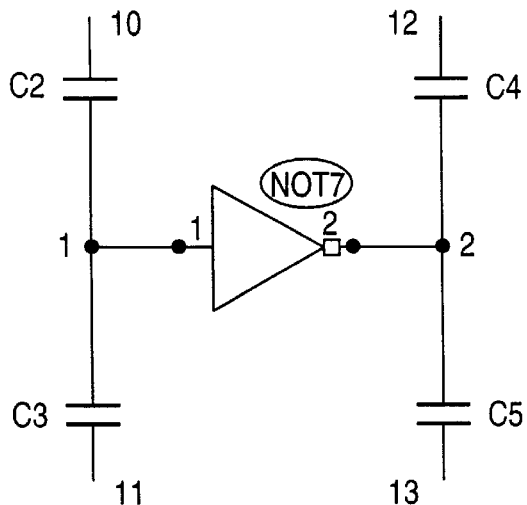
FIG. 106 illustrates the result of applying the digital INVERTER function to modifiable wire Z0.

FIG. 106 shows the result of applying the digital INVERTER function to the modifiable wire Z0 of FIG. 4, thereby creating a digital inverter NOT1 connecting nodes 1 and 2 in place of the modifiable wire Z0 of FIG. 4.

The Digital AND Functions

The twelve functions in the group of three-argument digital AND functions AND0, . . . , AND11) convert the highlighted component into a digital AND gate in the same manner as the QT functions convert a highlighted component into a three-lead transistor. After execution of a digital AND function, there are three writing heads that point to three new modifiable wires.

Figure 107:
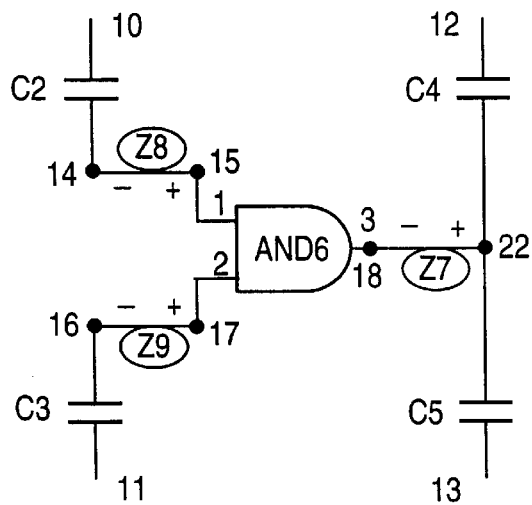
FIG. 107 illustrates the result of applying the digital AND6 function to modifiable wire Z0.

FIG. 107 shows the result of applying the digital AND6 function to the modifiable wire Z0 of FIG. 4, thereby creating an AND gate AND6.

The Digital OR Functions

The twelve functions in the group of three-argument digital OR functions (OR0, . . . , O11) convert the highlighted component into a digital OR gate in the same manner as the QT functions convert a highlighted component into a three-lead transistor. After execution of a digital O function, there are three writing heads that point to three new modifiable wires.

Figure 108:
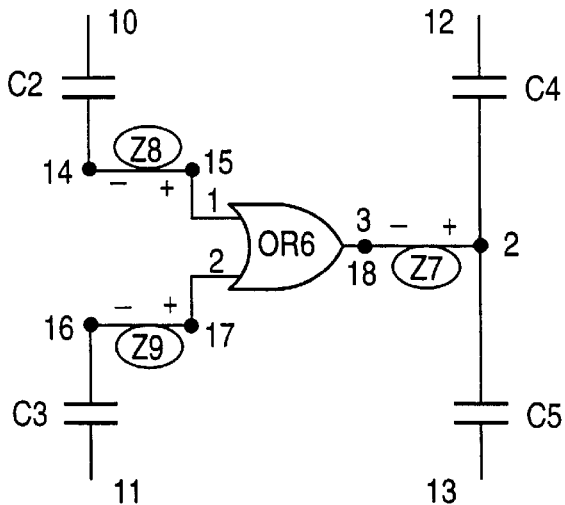
FIG. 108 illustrates the result of applying the digital OR6 function to modifiable wire Z0.

FIG. 108 shows the result of applying the digital OR6 function to the modifiable wire Z0 of FIG. 4, thereby creating an OR gate OR6.

Other Digital Functions

Other purely digital functions (e.g., the NAND function, the NOR function, the exclusive-or XOR function, the not-exclusive-or NXOR function) can be similarly defined. In addition, digital functions such as a flip-flop can also be defined.

A circuit is said to be digital if all its components are digital components; a circuit is said to be analog if all its components are analog, and a circuit is said to be mixed analog/digital if it contains both analog and digital components. Electrical simulators, such as SPICE, accommodate digital, analog, and mixed analog/digital circuits.

The Neon Bulb Function

The one-argument NE ("neon bulb") function causes the highlighted component to be changed into a neon bulb. A neon bulb fires when there is a voltage of 67 or more volts across its leads. Because this voltage is fixed and a neon bulb has no other component value, there is no arithmetic-performing subtree. Thus, this function has only a construction-continuing subtree and is a one-argument function.

The DC Power Supply (DC) Function

The two-argument DC ("DC power supply") function causes the highlighted component to be changed into a DC power supply. The component value is the value of its DC voltage. The arithmetic-performing subtree specifies the numerical value of the component by returning a floating-point value which is, in turn, interpreted as the value for the component. For power supplies, the method of interpretation is different than for components such as resistors, capacitors, and inductors. The arithmetic-performing subtree returns a floating-point value which is, in turn, interpreted as the value of the component in the following way: if the return value is between −100.0 and +100.0, then U is equated to the value returned by the subtree; if the return value is less than −100.0, then U is set to −100.0 volts DC; if the return value is greater that +100.0, then U is set to +100.0. This approach produces voltage levels for power supplies within a narrower range than is appropriate for components.

The AC Power Supply (AC) Function

The six-argument AC ("AC power supply") function causes the highlighted component to be changed into a AC sinusoidal power supply. The five component values associated with an AC power supply are its offset voltage, its amplitude voltage, its frequency, its time delay (in seconds) and its damping factor. The five arithmetic-performing subtrees specify these five numerical values by returning five floating-point values which are interpreted in an appropriate way. For power supplies, the method of interpretation is different than for components such as resistors, capacitors, and inductors. Moreover, the method of interpretation differs for the five values for this particular component-creating function.

For amplitude and frequency, the floating-point value returned by each arithmetic-performing subtrees is interpreted in the following way: if the return value is between −100.0 and +100.0, then U is equated to the absolute value returned by the subtree; if the return value is less than −100.0 or greater than +100, then U is set to +100.0.

For the offset voltage, time delay, and damping factor, the floating-point value returned by each arithmetic-performing subtrees is interpreted in the following way: if the return value is between −100.0 and +100.0, U is equated to the value returned by the subtree; if the return value is less than −100.0, U is set to −100.0. If the return value is greater than +100, U is set to +100.0.

The TRANFORMER Functions

A transformer changes the voltage of an alternating current signal on its two coils in accordance with its "turns ratio." For example, a transformer might step up the voltage of the signal on its primary coil by a factor of 10 and make the new higher voltage signal available on its secondary coil. The "turns ratio" is typically fixed for a transformer and would part of the specifications for the transformer in its model.

The six functions in the TRANFORMER group of four-argument functions (called TRANFORMER0, . . . , TRANFORMER5) create eight new nodes, four new modifiable wires, and cause the highlighted component to be changed into a transformer. After execution of a TRANFORMER function, there are four writing heads. They point to four new modifiable wires that are connected to the four leads of the new transformer. Since there is no writing head on the new transformer itself, a transformer remains in the developing circuit once it is inserted by a TRANFORMER function.

Two of the four leads of a transformer relate to the primary coil of the transformer and the other two leads relate to the secondary coil. That is, the two coils of a transformer are distinct and not interchangeable. In applications where the phase of the alternating current signals in the two transformers are important, each lead of each coil is also distinct and not interchangeable. However, for some applications, the phase may not matter and consequently the two leads of any particular coil may be considered interchangeable. (Note that in the case where the phase matters, there are 12 different TRANFORMER functions). The latter case is assumed for purposes of this discussion here. Given this assumption, the six potentially different results produced by the TRANFORMER function arise from the three different ways of partitioning four objects into two subsets of two objects and the two different ways of assigning the lower and higher voltages to the two coils.

When both nodes of the highlighted component (i.e., nodes 401 and 402 of FIG. 4) are of degree 3, the six TRANFORMER functions produce six distinct results. The results of applying any of the TRANFORMER functions to nodes 401 and 402 of FIG. 4 are as follows:

First, the TRANFORMER function creates four new modifiable wires Z6, Z7, Z8 and Z9 and eight new nodes, 3, 4, 5, 6, 14, 15, 16, and 17.

Second, the two leads of the primary coil of the transformer are connected to new nodes 3 and 4.

Third, the two leads of the secondary coil of the transformer are connected to new nodes 5 and 6.

Fourth, node 1 splits into nodes 14 and 15 and node 2 splits into 16 and 17.

Table 4 applies when both nodes of the highlighted component are of degree 3. Table 4 shows which of the four new nodes, 3, 4, 5, and 6 are to become connected to the lower-numbered component at the positive end of the highlighted component, the higher-numbered component at the positive end of the highlighted component, the lower-numbered component at the negative end of the highlighted component, and the higher-numbered component at the negative end of the highlighted component.

TABLE 4

Operation of the TRANFORMER functions when both nodes of the highlighted component are of degree 3.

| Functions | Lower-numbered component at positive end | Higher-numbered component at positive end | Lower-numbered component at negative end | Higher-numbered component at negative end |
|---|---|---|---|---|
| TRANFORMER0 | 3 | 4 | 5 | 6 |
| TRANFORMER1 | 3 | 5 | 4 | 6 |
| TRANFORMER2 | 3 | 6 | 5 | 4 |
| TRANFORMER3 | 6 | 5 | 4 | 3 |
| TRANFORMER4 | 6 | 4 | 5 | 3 |
| TRANFORMER5 | 6 | 3 | 4 | 5 |

Figure 86:
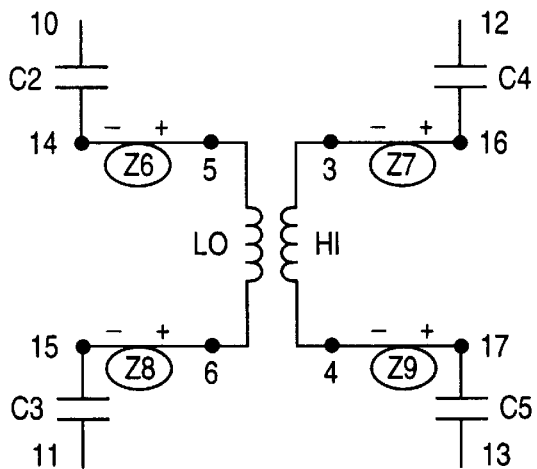
FIG. 86 illustrates the result of applying the TRANFORMER 0 function.

FIG. 86 illustrates the result of applying the TRANFORMER0 function to modifiable wire Z0 of FIG. 4.

Figure 87:
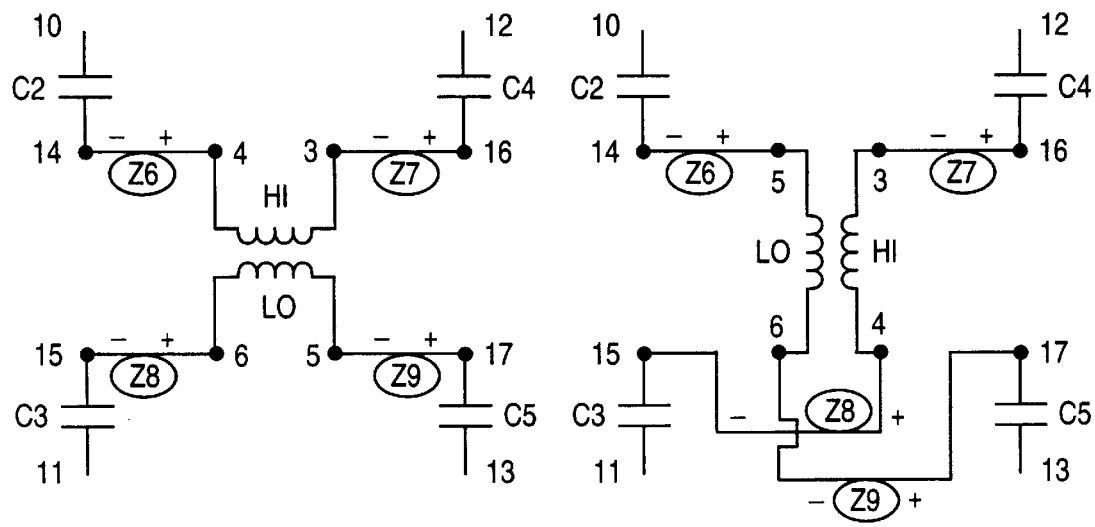
FIG. 87 illustrates the result of applying the TRANFORMER 1 function.

FIG. 87 illustrates the result of applying the TRANFORMER1 function to modifiable wire Z0 of FIG. 4.

Figure 88:
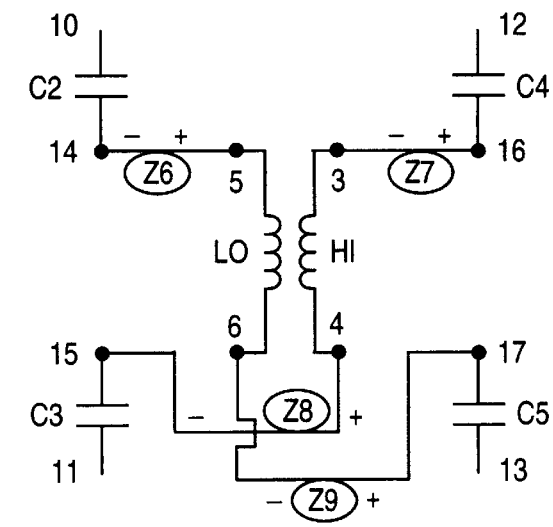
FIG. 88 illustrates the result of applying the TRANFORMER 2 function.

FIG. 88 illustrates the result of applying the TRANFORME2 function to modifiable wire Z0 of FIG. 4.

Figures 89, 90:
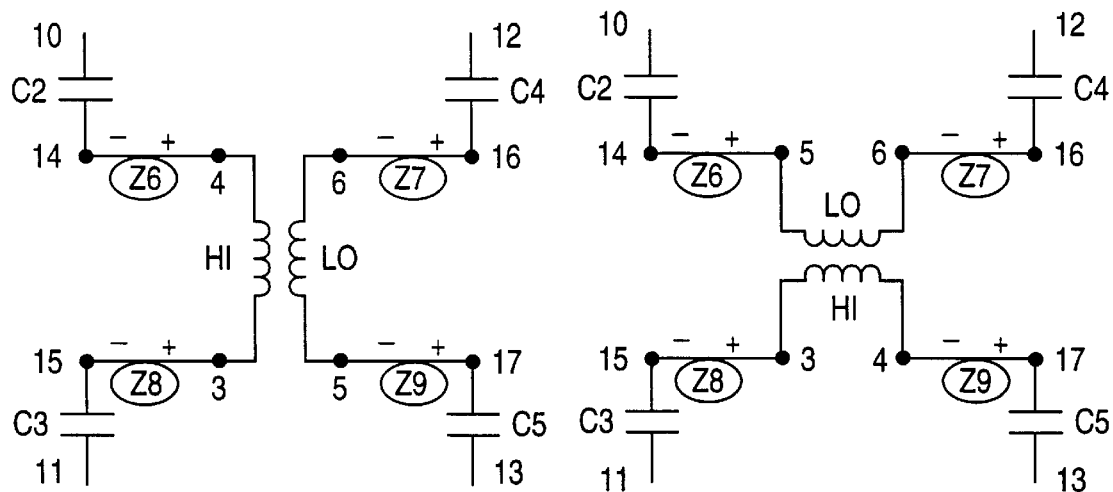
FIG. 89 illustrates the result of applying the TRANFORMER 3 function.
FIG. 90 illustrates the result of applying the TRANFORMER 4 function.

FIG. 89 illustrates the result of applying the TRANFORMER3 function to modifiable wire Z0 of FIG. 4.

FIG. 90 illustrates the result of applying the TRANFORMER4 function to modifiable wire Z0 of FIG. 4.

Figure 91:
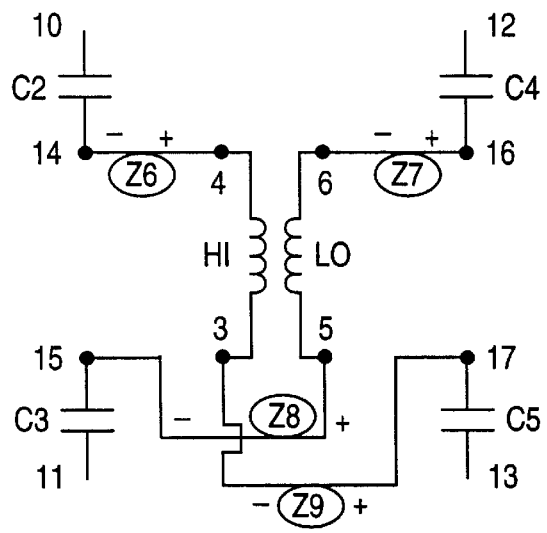
FIG. 91 illustrates the result of applying the TRANFORMER 5 function.

FIG. 91 illustrates the result of applying the TRANFORMER5 function to modifiable wire Z0 of FIG. 4.

If node 401 is of degree 2, then wires Z6 and Z8 terminate at the same point. Similarly, if node 402 is of degree 2, then wires Z7 and Z9 terminate at the same node.

There are 24 versions of a component-creating function for a four-lead component with four behaviorally different leads. With that understanding, it can be shown that the general principles used in defining the TRANSFORMER group of component-creating functions can be applied to any four-lead component.

The TWO_LEAD_OPAMP Functions

An opamp is a component with five leads (that are commonly used). Its first two leads are the inputs to the opamp. In addition, a third lead is typically connected to a fixed positive voltage source and a fourth lead is typically connected to a fixed negative voltage source. An opamp takes the difference between its two input voltages and produces the product of that difference and a constant A (the amplification factor) as its output at the fifth lead.

The connection of the third and fourth leads of an opamp to these two fixed voltage sources is so common that it is useful to consider a special version of the opamp in which these two leads are not free at all, but, instead, are hard-wired to these two fixed voltage sources. Moreover, in some circuits, the goal is merely to amplify one input, instead of taking the difference between two input voltages and then amplifying the difference by the amplification factor, A. Thus, it is useful to have a TWO_LEAD_OPAMP function.

The two functions in the group of two-argument TWO_LEAD_OPAMP division functions (TWO_LEAD_OPAMP0 and TWO_LEAD_OPAMP1) convert the highlighted component into an opamp. After execution of a TWO_LEAD_OPAMP function, there is one writing head, which points to the original component and the two copies.

The amplification factor, A, of the opamp is specified by its model.

Figure 92:
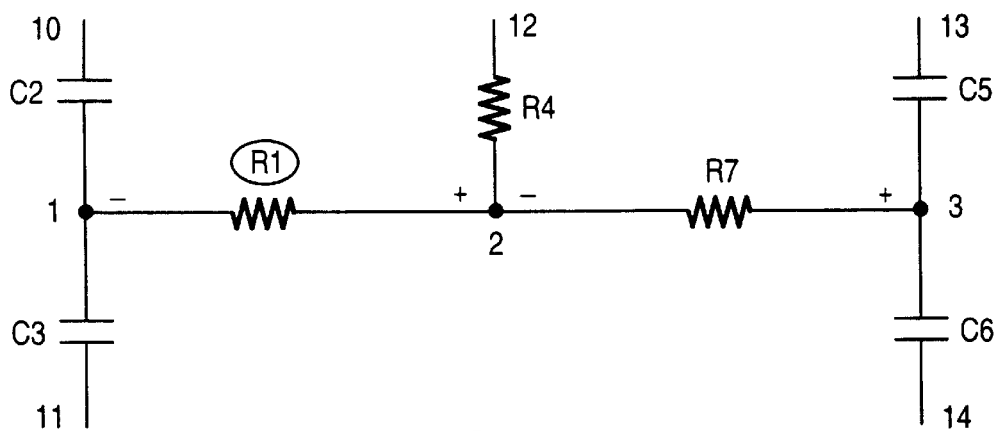
FIG. 92 is a circuit with resistor R1.

The TWO_LEAD_OPAMP0 function converts the highlighted component into an opamp whose positive input lead is connected to the positive end of the highlighted component (node 2 in FIG. 92) and whose output lead is connected to the negative end of the highlighted component (node 1 in FIG. 92). The TWO_LEAD_OPAMP1 function inserts the opamp in the opposite orientation.

Figure 110:
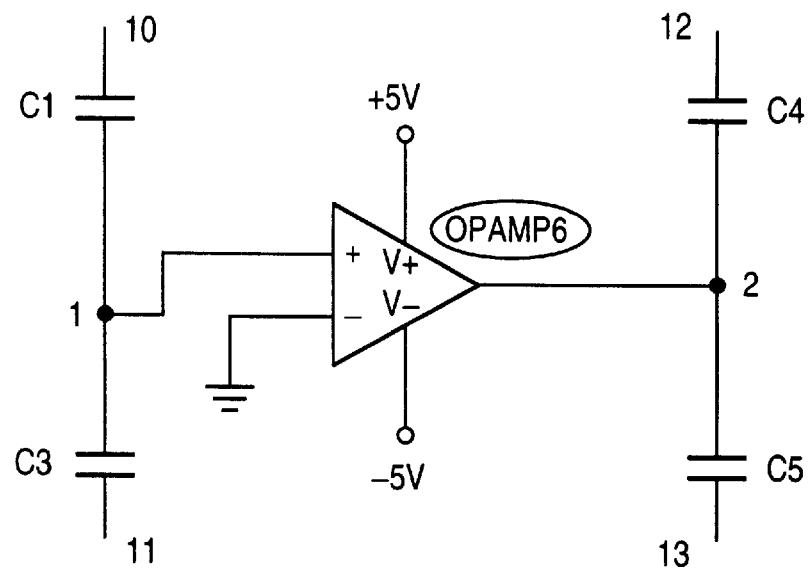
FIG. 110 illustrates the result of applying the TWO_LEAD_OPAMP1 function.

FIG. 110 shows the result of applying the TWO_LEAD_OPAMP1 function. Its positive input lead is connected to the negative end of the highlighted component (node 1 in FIG. 92) and its output lead is connected to the positive end of the highlighted component (node 2 in FIG. 92).

The THREE_LEAD_OPAMP Functions

The TWO_LEAD_OPAMP functions are not sufficient when it is necessary to take the difference between two input voltages and then amplify the difference by the amplification factor, A. Thus, it is useful to have THREE_LEAD_OPAMP functions.

The twelve functions in the group of three-argument THREE_LEAD_OPAMP division functions (THREE_LEAD_OPAMP0, . . . , THREE_LEAD_OPAMP1) convert the highlighted component into an opamp in the same manner that the QT functions convert a highlighted component into a three-lead transistor. After execution of a THREE_LEAD_OPAMP function, there are three writing heads that point to three new modifiable wires.

The amplification factor, A, of the opamp is specified by its model.

The THREE_LEAD_OPAMP functions are sufficient for a wide range of practical circuits.

Figure 109:
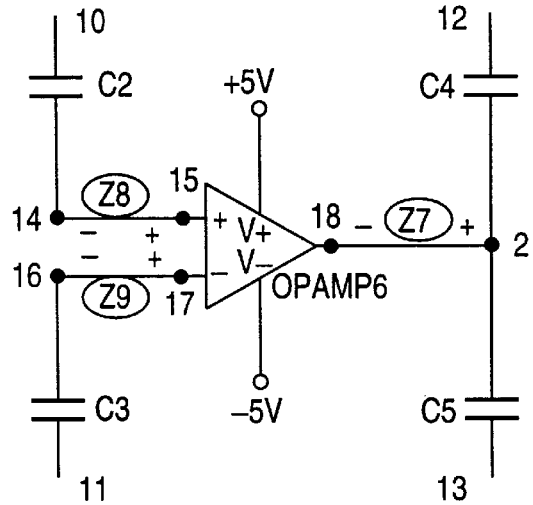
FIG. 109 illustrates the result of applying the THREE_LEAD_OPAMP1 function to modifiable wire Z0.

FIG. 109 shows the result of applying the THREE_LEAD_OPAMP1 function.

The FIVE_LEAD_OPAMP Functions

The five-argument FIVE_LEAD_OPAMP functions provide more flexibility in assigning the leads of an opamp. Moreover, the method for inserting an opamp with five leads illustrates principles that can be extended to any other component with five leads as well as to components with larger numbers of leads.

There are 120 possible ways of permuting the five unique inputs to an opamp. In addition, there are four distinct ways of inserting an opamp into a developing circuit when each node of the highlighted component is of degree 3. Thus, there are 480 FIVE_LEAD_OPAMP functions. Only one of the 120 permutations is used in one embodiment and will be described here (namely, the four of the 480 distinct FIVE_LEAD_OPAMP functions that apply to the case where the five leads of the opamp are not permuted at all).

It can be seen that the principles used in defining the FIVE_LEAD_OPAMP group of component-creating functions can be applied to any component with five unique leads.

The four functions in the FIVE_LEAD_OPAMP group of six-argument functions (called FIVE_LEAD_OPAMP0, . . . , FIVE_LEAD_OPAMP3) create seven new nodes, five new modifiable wires, and cause the highlighted component along with another existing component to be changed into an opamp. After execution of a FIVE_LEAD_OPAMP function, there are five writing heads. They point to five new modifiable wires that are connected to the five leads of the new opamp. Since there is no writing head on the new opamp itself, an opamp remains in the developing circuit once it is inserted by an FIVE_LEAD_OPAMP function (unless a CUT function, described below, subsequently causes its deletion).

The amplification factor, A, of the opamp is specified by its model.

FIG. 92 shows a portion of a circuit in which a resistor R1 has a writing head and both of its ends are connected to nodes of degree 3 and the end of the second to-be-deleted component (R7) at node 3 is of degree 3. Note that resistor R7 is the higher numbered component that is connected to the same node as the positive end of the highlighted component (R1).

When both nodes of the highlighted component (i.e., nodes 1 and 2 for resistor R1 in FIG. 92) are of degree 3, the four FIVE_LEAD_OPAMP functions (associated with one of the 120 permutations) produce four distinct results.

The FIVE_LEAD_OPAMP function will delete the highlighted component R1 as well as one additional component that is connected to one of the nodes of R1. The difference among FIVE_LEAD_OPAMP0, . . . , FIVE_LEAD_OPAMP3 is the identity of the second to-be-deleted component. For example, FIVE_LEAD_OPAMP1 deletes the higher-numbered component at the node to which the positive end of R1 is connected, namely R7.

The results of applying the FIVE_LEAD_OPAMP functions to nodes 1 and 2 of the figure are as follows:

First, the FIVE_LEAD_OPAMP function creates five new modifiable wires Z8, Z9, Z10, Z11, and Z12 and new nodes, 15, 16, 17, 18, 19, 20, and 21.

Second, the positive input of the opamp is connected to new node 18 and the negative input of the opamp is connected to new node 17.

Third, the lead that is typically connected to the positive voltage source (conventionally designated V+ in the literature) is connected to new node 19 and the lead that is typically connected to the negative voltage source (conventionally designated V– in the literature) is connected to new node 16.

Fourth, the output of the opamp is connected to new node 15.

Fifth, the node to which the negative end of R1 was originally connected is divided so as to produce new node 20. The lower-numbered component (excluding R1) to which the negative end of R1 was originally connected remains connected to node 1 while the higher-numbered component becomes connected to new node 20.

Sixth, the node connected to the second-to-be-deleted component (and that was not connected to R1) (e.g., node 3) is divided so as to produce new node 21. The lower-numbered component (excluding the second to-be-deleted component) to which node 3 was originally connected remains connected to node 3 while the higher-numbered component becomes connected to new node 21.

Seventh, node 2 is disconnected from both R1 and the second to-be-deleted component.

Eighth, new modifiable wire Z8 is connected between nodes 15 and 3; Z9 is connected between nodes 16 and 21; Z10 is connected between nodes 17 and 20; Z11 is connected between nodes 1 and 18; Z12 is connected between nodes 19 and 2.

Figure 93:
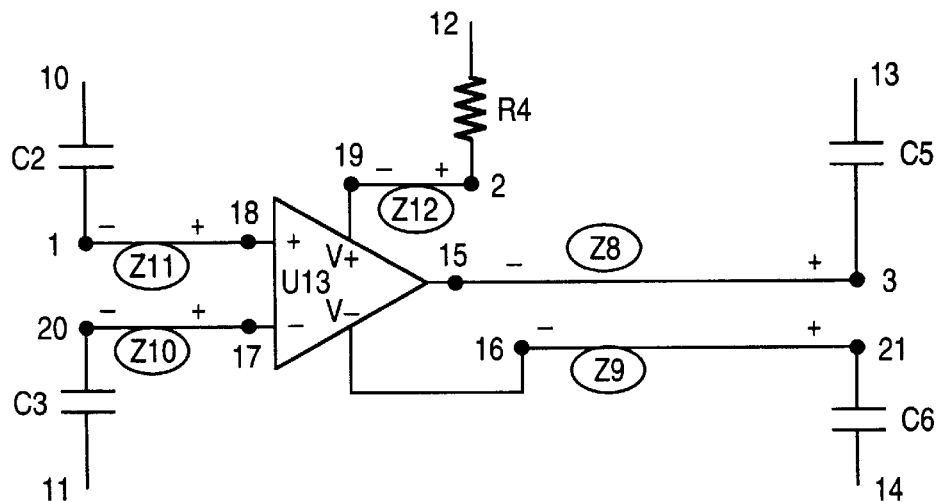
FIG. 93 illustrates the result of applying the FIVE_LEAD_OPAMP1 function to resistor R1.

FIG. 93 illustrates the result of applying the FIVE_LEAD_OPAM1 function to resistor R1 of FIG. 92.

Note that this function is an example (of several herein) of a context-sensitive component-creating function.

Subcircuit Definitions in SPICE

Subcircuit definitions may be included among the component-creating functions. Subcircuits permit combinations of components to be defined once and then included in the netlist of a circuit.

SPICE supports subcircuit definition using the "subckt" command. The subcircuit definitions may or may not have numerical parameters.

Subcircuit definitions are not to be confused with automatically defined functions. Subcircuit definitions define components that will be treated as if they were primitive components for the circuit to be designed. They are defined prior to the run of genetic programming. They are treated just like all other components (e.g., resistors, capacitors) once they are defined. In contrast, automatically defined functions are function-defining branches whose work-performing body is dynamically evolved during the run of genetic programming. Automatically defined functions typically contain compositions of connection-creating functions and component-creating functions. However, automatically defined functions may or may not have numerical parameters (dummy arguments).

Other Component-Creating Functions

The above component-creating functions are illustrative of the generality and flexibility of the automated design system of the present invention. Many other component-creating functions can be created to accommodate the requirements of designing particular classes of circuits or particular topological arrangements of circuit elements. As already illustrated by the QT function, components may be inserted to replace a node (point) as well as to replace an edge (line) in the circuit diagram. As already illustrated by the context-sensitive FIVE_LEAD_OPAMP function, components with five (or more) leads may be inserted to replace a node (point), an edge (line), and an additional adjacent component. Many other functions used in the present invention operate on more than one node (point) or edge (line) in the circuit diagram or operate in a context-sensitive way.

Although the degree of nodes is two or three in the foregoing description, other component-creating functions, in conjunction with other connection-creating functions, can be defined to accommodate nodes with greater degrees.

Connection-Creating Functions

In the present invention, the connection-creating functions modify the topology of the circuit. Each connection-creating function in a program tree points to an associated highlighted component (which is often a modifiable wire) and modifies the topology of the developing circuit in some way. Each connection-creating function spawns zero, one, or more writing heads. In addition, in one embodiment, each connection-creating function leaves the number of lines impinging at any one node in the circuit at either two or three. In other embodiments, the number of lines impinging at any one node left as a result of each connection-creating function may be greater than three (e.g., 4, 5, etc.).

Some connection-creating functions are context-free and some are context-sensitive. When a connection-creating function is context-free, the outcome depends only on the single highlighted component (i.e., the component with the writing head). When a connection-creating function is context-sensitive, the outcome depends not just upon the single highlighted component, but also upon other nearby elements of the circuit structure. The present invention supports the creation of complex structures resulting from the execution of context-sensitive functions as well as context-free functions.

Table 4 lists some illustrative connection-creating functions for electrical circuits, and contains the short name of the function, a longer and more descriptive name for the function, and its arity.

TABLE 5

Connection-creating functions.

| Name | Short Description | Arity |
| --- | --- | --- |
| FLIP | Flip | 1 |
| SERIES | Series division | 3 |
| PSS | Parallel division (smaller-smaller) | 4 |
| PSL | Parallel division (smaller-larger) | 4 |
| CUT | Cuts a component out of a circuit | 0 |
| VIA0, . . . , VIA7 | Two-argument via functions | 2 |
| GND | Ground | 2 |
| THVIA0, . . . , THVIA7 | Three-argument via functions | 3 |
| THGND | Three-argument ground function | 3 |
| POS | Positive voltage source | 2 |
| NOP | No Operation | 1 |
| END | End | 0 |
| THGND | Three-argument ground | 3 |
| THPOS | Three-argument positive voltage source | 3 |
| STAR0 and STAR1 | STAR division functions | 3 |
| TRIANGLE0 and TRIANGLE1 | TRIANGLE functions | 6 |

The set of functions in Table 5 is illustrative of the many possible different variations of connection-creating functions that may be employed in the automated design methodology of the present invention. Many additional different connection-creating functions could be created for particular problems or situations.

The FLIP Function

All electrical components with two leads (ends, interfaces) have a polarity in SPICE in the sense that they each have a designated positive (+) end and a designated negative (−) end. The polarity is reflected by the fact that the first-listed node in each line of the netlist for a circuit is the node connected to the positive end of a component and the second-listed node is the node connected with the component's negative end. Polarity clearly matters for components such as diodes. Polarity also matters for components whose electrical behavior is independent of its polarity (e.g., wires, resistors) because it affects the sequential course of the process of developing the embryonic circuit into the fully developed circuit.

Figure 14:
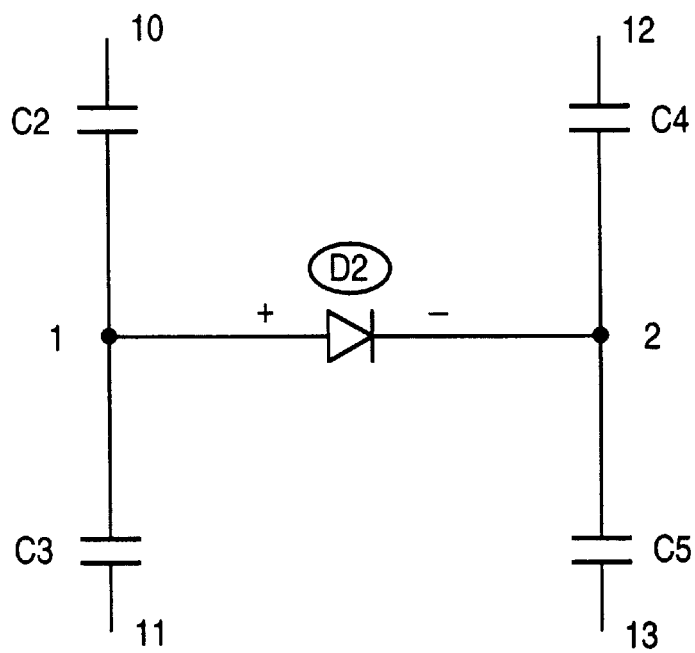
FIG. 14 illustrates the result of applying the FLIP function to diode D1.

In the present invention, the FLIP function provides a method for reversing the polarity of any component with exactly two ends. FIG. 14 shows the result of applying the FLIP function to the diode D1 of FIG. 7, thereby creating a diode D2 with its polarity reversed.

The one-argument FLIP function attaches the positive end of the highlighted component to the node to which its negative end is currently attached and vice versa. After execution of the FLIP function, one writing head points to the now-flipped original component.

The portion of the netlist for FIG. 4 describing the single 5-Ohm resistor R1 consists of the following one-line netlist:

R1 402 401 5 ohms

Recall that the first-listed node in a netlist is the node connected to the positive end of a component, so resistor R1 is shown as being connected with its positive end at node 402 and its negative end at node 401.

The FLIP function changes the above one-line netlist into the following:

R1 401 402 5 ohms

The SERIES Division Function

The three-argument SERIES ("series division") function operates on one highlighted component and creates a series composition consisting of the highlighted component, a copy of the highlighted component, one new modifiable wire, and two new nodes. After execution of the SERIES function, there are three writing heads pointing to the original component, the new modifiable wire, and the copy of the original component.

Figure 15:
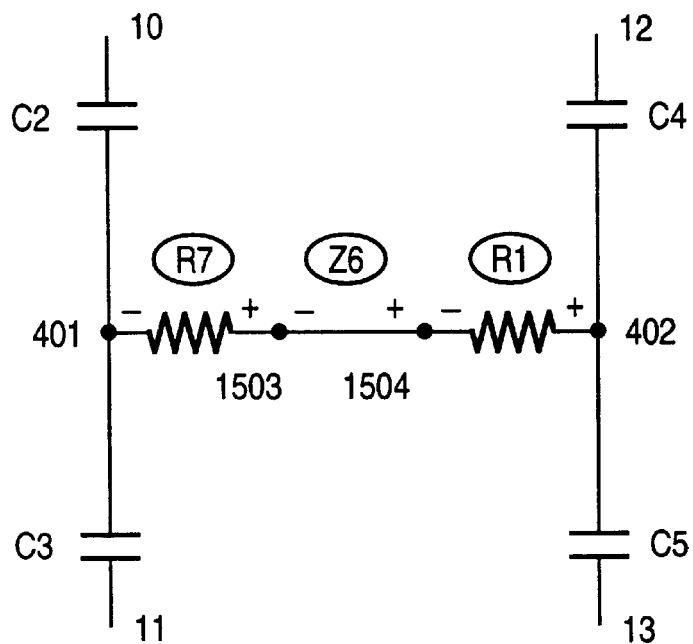
FIG. 15 illustrates the result of applying the series division dunction SERIES to a resistor.

FIG. 15 illustrates the result of applying the SERIES division function to resistor R1 from FIG. 4. First, the SERIES function creates two new nodes, 1503 and 1504. Second, SERIES renames the negative end (currently labeled 401) of the original component (R1 in the example in the figure) as the first new node, 1504, while leaving its positive end at original node 402. Third, SERIES creates a new wire (called Z6 in the figure) between new nodes 1503 and 1504. The negative end of new wire is connected to the first new node 1503 and the positive end is connected to the second new node 1504. Fourth, SERIES inserts a duplicate (called R7 in the figure) of the original component (including all its component values) between new node 1503 and original node 401. The positive end of the duplicate is connected to the original node 401 and its negative end is connected to new node 1503.

The portion of the netlist for FIG. 4 describing the single 5-Ohm resistor R1 consists of the following one-line netlist:

R1 402 401 5 ohms

The SERIES function changes the above one-line netlist into the following three lines:

R1 402 1504 5 ohms
Z6 1504 1503
R7 1503 401 5 ohms

Note that modifiable wires (such as Z6) are used only during the developmental process; all such wires are edited out prior to the final creation of the netlist for SPICE. Also, note that the SERIES function may be applied to a wire; in that event, the result is a series composition of three wires (each with its own writing head). That is, wires are developmental components.

Note the convention of globally numbering components consecutively instead of maintaining a different series of consecutive numbers for each type of component (e.g., the new resistor is called R7, instead of R2). This global numbering convention plays a role in the operation of certain functions (e.g., PSS and PSL) described in the next section.

The PSS and PSL Parallel Division Functions

The two four-argument functions (PSS and PSL) in the group of parallel division functions each operate on a highlighted component to create a parallel composition consisting of the original highlighted component, a duplicate of the original component, two modifiable new wires, and two new nodes. After execution of PSS or PSL, there are four writing heads. These writing heads point to the original component, the two new wires, and the duplicate of the original component.

The PSS and PSL functions operate in slightly different ways depending on the degree of the nodes to which the original highlighted component is connected and the numbering of existing components in the circuit.

Figure 16:
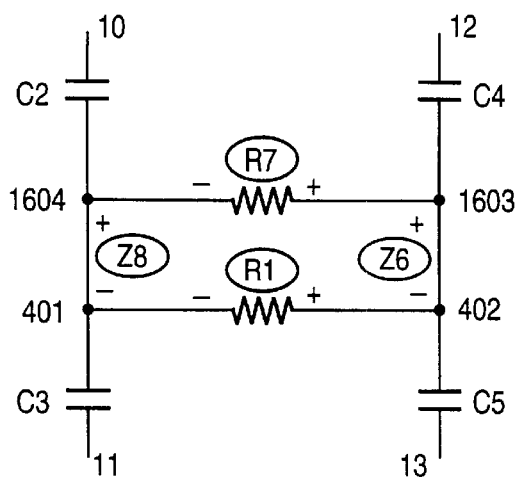
FIG. 16 illustrates a result of applying the parallel division function PSS to a resistor R1.
Figure 17:
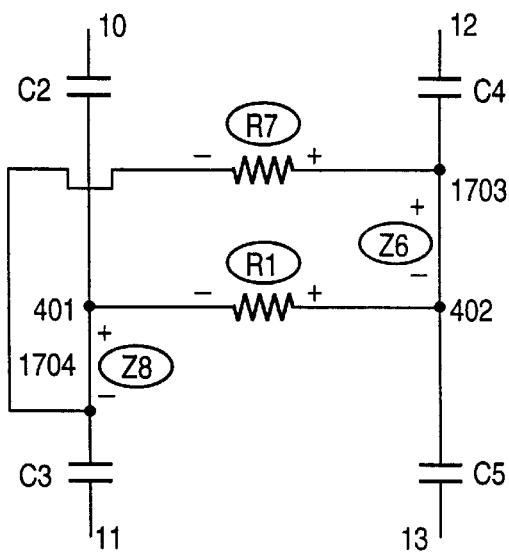
FIG. 17 illustrates a result of applying the parallel division dunction PSL to a resistor R1.

First, consider the case where both nodes of the highlighted component (i.e., nodes 401 and 402 of FIG. 4) are of degree 3. FIG. 4 shows a resistor R1 connecting nodes 401 and 402 of a partial circuit containing four capacitors. In this figure, node 401 is of degree 3 (because R1, capacitor C2, and capacitor C3 are connected to it) and node 402 is also of degree 3 (because R1, capacitor C4, and capacitor C5 are connected to it). FIG. 16 and FIG. 17 show the results of applying the PSS and PSL functions, respectively, to the resistor R1 when both nodes of the highlighted component (i.e., nodes 401 and 402) are of degree 3 (as is the case in FIG. 4).

First, the parallel division function creates two new nodes, 1603 and 1604, and also creates two new wires Z6 (between original node 402 and new node 1603) and Z8 (between original node 401 and new node 1604). The negative ends of both new wires are connected to the nodes (i.e., 401 and 402) of the original component thereby establishing the polarity of the new wires.

Second, the parallel division function inserts a duplicate of the highlighted component (including all of its component values) between the new nodes 1603 and 1604. The negative end of the duplicate is connected to node 1604 (the new node connected by the new wire that is connected to the negative end of the original component, namely Z8). The positive end of the duplicate is connected to node 1603 (the new node connected by the new wire that is connected to the positive end of the original component, namely Z6). This establishes the polarity of the new component.

Third, the topology of the new component in relation to the original components must be established. The two parallel division functions operate in slightly different ways in this regard. The third character (S or L) of the name (PSS or PSL) of the function indicates whether the negative end of the new component is connected to the smaller (S) or larger (L) numbered component of the two components that were originally connected to the negative end of the highlighted component.

The netlist for FIG. 4 is as follows:

R1 402 401 5 ohms
C2 401 10
C3 401 11
C4 402 12
C5 402 13

Recall that the first-listed node in a netlist is the node connected to the positive end of a component.

The parallel division function PSS changes the above original netlist to the following new netlist:

R1 402 401 5 ohms
Z6 1603 402
Z8 1604 401
R7 1603 1604 5 ohms
C2 1604 10
C3 401 11
C4 1603 12
C5 402 13

C2 and C3 are the two original components that were originally connected to the negative end of original component R1 (at original node 1). When the resistor is duplicated, the question arises as to whether C2 or C3 should be connected to the new resistor (as opposed to the original, R1). Since C2 bears a smaller number than C3, the PSS function causes C2 (the component with the smaller number) to become connected to new node 1604 while leaving C3 connected to original node 401. Note that we did not show the polarity of the four capacitors in FIG. 4; we simply assumed, in presenting the above netlist, that the positive ends of C2 and C3 were connected to original node 401 (so that 1604 preceded 10 on the line of the netlist relating to C2 and 401 preceded 11 for C3). The important aspect of the PSS function is not the polarity of C2 and C3, but the fact that 1604 appears on C2's line of the netlist (and 401 appears on C3's line).

The PSL function operates slightly differently than the PSS function. The PSL function changes the original netlist to the following new netlist:

R1 402 401 5 ohms
Z6 1703 402
Z8 1704 401
R7 1703 1704 5 ohms
C2 401 10
C3 1704 11
C4 1703 12
C5 402 13

Since C3 bears a larger number than C2, the PSL function causes C3 (the component with the larger number) to become connected to new node 1704 while leaving C2 connected to original node 401.

Note that the PSS and PSL functions produce all possible topologies that can arise when resistor R1 is duplicated as part of a parallel composition. Thus, there is no need to consider the relative magnitude of the component numbers for the components connected to the positive end of the original component.

Note that polarity affects the developmental process even for components for which polarity has no electrical significance (e.g., resistors). Of course, for many components (e.g., diodes and transistors), polarity is also electrically significant.

Consider the case where both nodes of the highlighted component (i.e., nodes 1201 and 1202 of FIG. 12) are of degree 2. As will be shown, PSS and PSL produce identical results in this case.

Figure 18:
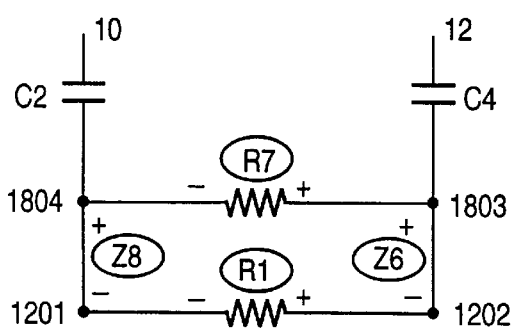
FIG. 18 illustrates a result of applying either PSS or PSL to a circuit in which nodes 1 and 2 are of degree 2.

FIG. 12 shows a resistor R1 connecting nodes 1201 and 1202 of a partial circuit containing two capacitors is shown. R1 possesses a writing head (i.e., is circled). Node 1201 is of degree 2 (because R1 and capacitor C2 are connected to it) and node 1202 is of degree 2 (because R1 and capacitor C4 are connected to it). FIG. 18 shows the result of applying either PSS or PSL to a circuit (e.g., FIG. 12 in which nodes 1201 and 1202 are of degree 2.

First, the parallel division function creates two new nodes, 1803 and 1804 and also creates two new wires Z6 (between original node 1202 and new node 1803) and Z8 (between original node 1201 and new node 1804). The negative ends of both new wires are connected to the nodes (i.e., 1201 and 1202) of the original component thereby establishing the polarity of the new wires.

Second, the parallel division function inserts a duplicate of the highlighted component (including all of its component values) between the new nodes 1803 and 1804. The negative end of the duplicate is connected to node 1804 (the new node connected by the new wire that is connected to the negative end of the original component, namely new wire Z8). The positive end of the duplicate is connected to node 1803 (the new node connected by the new wire that is connected to the positive end of the original component, namely new wire Z6). This establishes the polarity of the new component.

Figure 19:
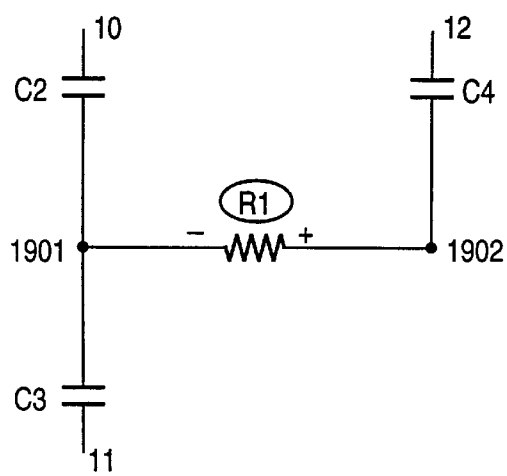
FIG. 19 is a circuit containing a resistor R1 in which node 1 is of degree 3 and node 2 is of degree 2.

Finally, consider the case where one node of the highlighted component (say, node 401 of FIG. 4) is of degree 3 while node 402 is of degree 2. FIG. 19 shows a resistor R1 connecting nodes 1901 and 1902 of a partial circuit containing three capacitors in which node 1901 is of degree 3 and node 1902 is of degree 2.

The only potential issues about the topology are whether new node 2003 is to be located between C4 and original node 1902 and whether original node 2 is to be located between C4 and new node 2003 (and similarly for C2, node 1901 and node 2004).

Figure 20:
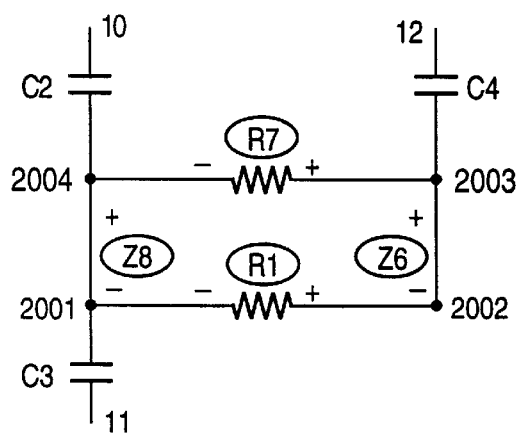
FIG. 20 illustrates a result of applying either PSS to a circuit in which node 1 is of degree 3 and node 2 is of degree 2.

FIG. 20 shows the result of applying either PSS or PSL to FIG. 19.

Note that the PSS and PSL functions are examples (of several herein) of context-sensitive component-creating functions.

The STAR Division Functions

The two functions in the group of three-argument STAR division functions (STAR0 and STAR1) operate on one highlighted component and create a star-like composition that includes the highlighted component, two copies of the highlighted component and two new nodes. After execution of a STAR function, there are three writing heads, which point to the original component and the two copies.

The STAR functions insert the two copies at the "active" node of the highlighted component. For the STAR0 function, the active node is the node to which the positive end of the highlighted component is connected. For the STAR1 function, the active node is the node to which the negative end of the highlighted component is connected.

To illustrate a STAR function, consider the results of applying one of these functions to nodes 401 and 402 of resistor R1 of FIG. 5. The result is shown in FIG. 94.

First, the STAR function renames the active node as node 3.

Second, if the degree of the active node is 3, then the STAR function creates two new nodes, 4 and 5; however, if the degree of the active node is only 2, then the STAR function creates only one new node, 4. Third, the STAR function inserts one duplicate (called R6) of the original component (including all its component values) between new node 3 and new node 4 (with the positive end of the duplicate being connected to node 3). Fourth, if the degree of the active node is 3, the STAR function inserts a second duplicate (called R7) of the original component (including all its component values) between new node 3 and new node 5 (with the positive end of the duplicate being connected to node 3). However, if the degree of the active node is 2, then the STAR function inserts the second duplicate (R7) of the original component between new node 3 and node 4 (so that R6 and R7 are in parallel with each other between nodes 3 and 4). Nodes 4 and 5 connect to the negative end of R1.

Figure 94:
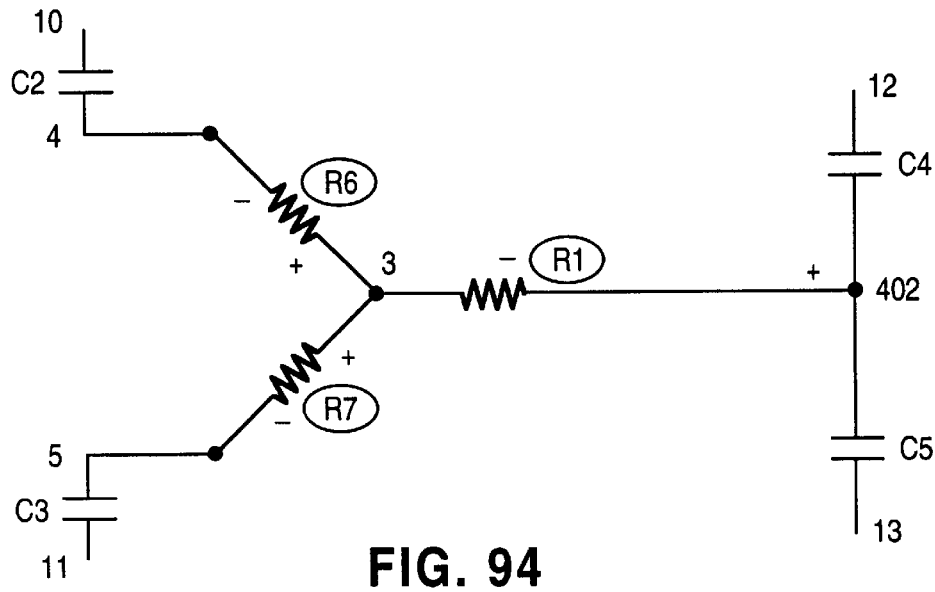
FIG. 94 illustrates the result of applying the STAR 1 division function to resistor R1.

FIG. 94 illustrates the result of applying the STAR1 division function to resistor R1 of FIG. 5. Note that node 1 of FIG. 5 is the active node for STAR1 and is of degree 3.

The portion of the netlist for FIG. 5 describing the single 5-Ohm resistor R1 consists of the following five lines:

R1 402 401 5 ohms
C2 401 10
C3 401 11
C4 402 12
C5 402 13

The STAR1 function changes the above into the following:

R1 402 3 5 ohms
R6 3 4 5 ohms
R7 3 5 5 ohms
C2 4 10
C3 5 11
C4 2 12
C5 2 13

If node 1 of FIG. 5 were of degree 2, then the result would be the following:

R1 402 3 5 ohms
R6 3 4 5 ohms
R7 3 4 5 ohms
C2 4 10
C4 2 12
C5 2 13

The TRIANGLE Functions

The two functions in the group of six-argument TRIANGLE functions (TRIANGLE0 and TRIANGLE1) operate on one highlighted component by eliminating it (and one adjacent node) and creating a triangular composition consisting of three copies of the original highlighted component (and all of its component values), three new modifiable wires, and five new nodes. After execution of a TRIANGLE function, there are six writing heads. They point to the three copies and the three new wires.

The TRIANGLE functions create the triangular composition at the "active" node of the highlighted component. If the two nodes of the highlighted component have different degrees, the active node is the node of degree 3. Otherwise, for the TRIANGLE0 function, the active node is the node to which the positive end of the highlighted component is connected, but, for the TRIANGLE1 function, the active node is the node to which the negative end of the highlighted component is connected.

When the active node is of degree 3, the TRIANGLE function produces the following results when it is applied to nodes 401 and 402 of resistor R1 of FIG. 5:

First, the TRIANGLE function eliminates the highlighted component and renames the active node as node 3 and creates a new modifiable wire Z5 between node 3 and the passive node.

Second, then the TRIANGLE function creates four new nodes, 4, 5, 6, and 7.

Third, the TRIANGLE function inserts one duplicate (called R6) of the original component (including all its component values) between new node 3 and new node 4 (with the positive end of the duplicate being connected to node 3) and a new modifiable wire Z9 between new node 4 and new node 6.

Fourth, the TRIANGLE function inserts a second duplicate (called R7) of the original component between new nodes 3 and 5 (with the positive end of the duplicate being connected to node 3) and a new modifiable wire Z10 between new node 5 and new node 7.

Fifth, the TRIANGLE function inserts a third duplicate (called R8) of the original component between new nodes 4 and 5 (with the positive end of the duplicate being connected to node 4).

Figure 95:
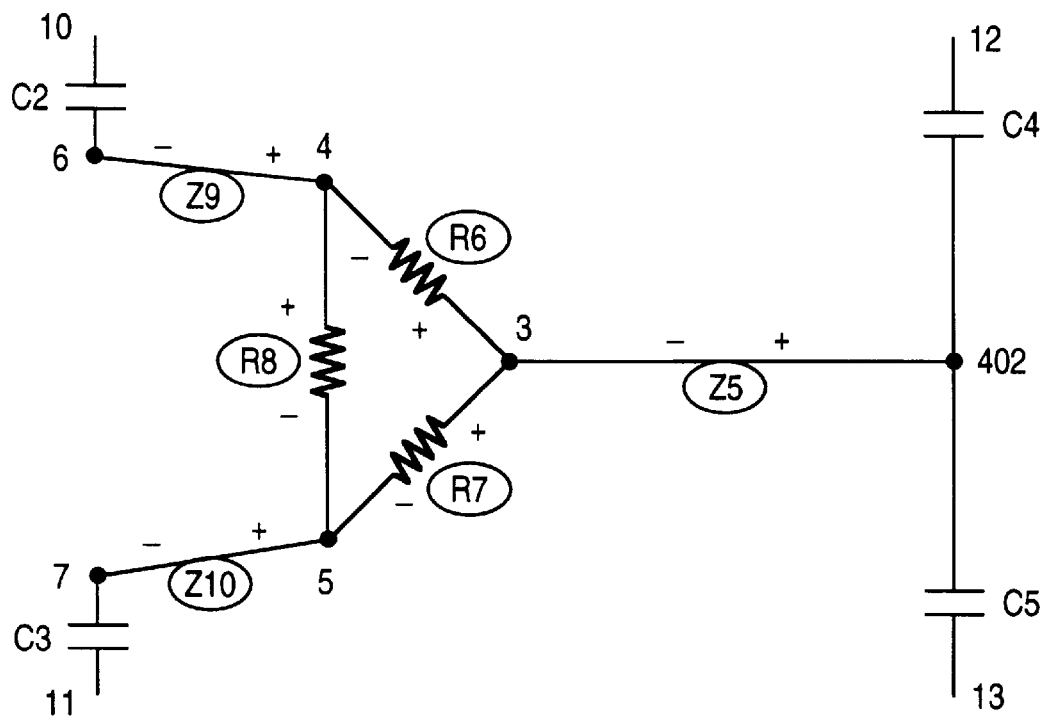
FIG. 95 illustrates the result of applying the TRIANGLE1 division function to resistor R1 when the active node (node 1) is of degree 3.

FIG. 95 illustrates the result of applying the TRIANGLE1 division function to resistor RI of FIG. 5 when the active node (node 401) is of degree 3.

When the active node is of degree 2, the TRIANGLE function produces the following results when it is applied to nodes 401 and 402 of resistor R1 of FIG. 5:

First, the TRIANGLE function renames the active node as node 3 and creates a new modifiable wire Z5 between node 3 and the passive node.

Second, then the TRIANGLE function creates three new nodes, 4, 5, and 6.

Third, the TRIANGLE function inserts one duplicate (called R6) of the original component (including all its component values) between new node 3 and new node 4 (with the positive end of the duplicate being connected to node 3) and a new modifiable wire Z9 between new node 4 and new node 6.

Fourth, the TRIANGLE function inserts a second duplicate (called R7) of the original component between new nodes 3 and 5 (with the positive end of the duplicate being connected to node 3) and a new modifiable wire Z10 between new node 5 and new node 6.

Fifth, the TRIANGLE function inserts a third duplicate (called R8) of the original component between new nodes 4 and 5 (with the positive end of the duplicate being connected to node 4).

Figure 96:
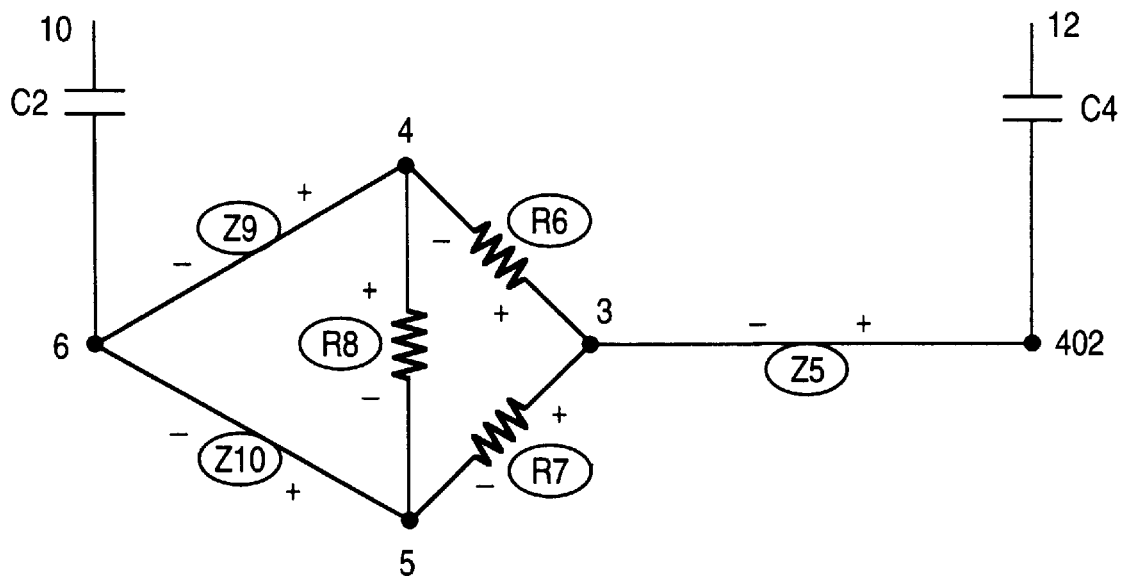
FIG. 96 illustrates the result of applying the TRIANGLE1 division function to resistor R1 when the active node (node 1) is of degree 2.

FIG. 96 illustrates the result of applying the TRIANGLE1 division function to resistor R1 of FIG. 5 when the active node (node 401) is of degree 2.

The CUT Function

Figures 21, 22:
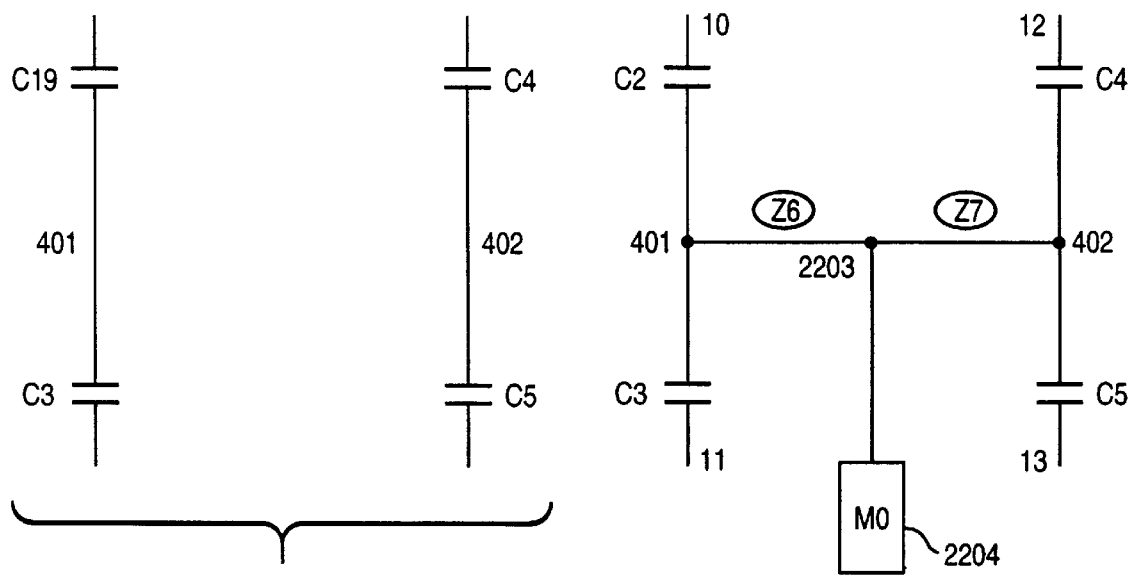
FIG. 21 illustrates a result of applying the CUT to resistor R1.
FIG. 22 illustrates a result of applying the VIA0 function to resistor R1.

The zero-argument CUT function causes the highlighted component to be removed from the circuit. The CUT function also causes the writing head to be lost—thereby ending that particular developmental path. The occurrence of an CUT function stops the development only along its developmental path within the overall program tree. FIG. 21 illustrates the result of applying the cut function to the modifiable wire in FIG. 4.

The Two-Argument VIA, GND, and POS Functions

The eight two-argument VIA functions (referred to herein as VIA0, . . . , VIA7), the two-argument GND ("ground") function, and two-argument POS ("positive reference voltage source") function enable distant parts of a circuit to be connected together.

The Two-Argument VIA Functions

The eight two-argument VIA functions (referred to herein as VIA0, . . . , VIA7), each create a series composition consisting of two wires that each possesses a successor writing head and a numbered port (referred to as a "via") that possesses no writing head. The port is connected to a designated one of eight imaginary layers (numbered from 0 to 7) in the wafer on which the circuit resides. If one or more other parts of the circuit connects to a particular layer, all such parts become electrically connected as if wires were running between them. If no other part of the circuit connects to a particular layer, then the one port connecting to the layer is useless (and this port is deleted when the netlist for the circuit is eventually created). After execution of a VIA function, there are two writing heads. They point to the two new wires.

FIG. 22 shows the results of applying the VIA0 function to resistor R1 from FIG. 4. Here wire Z6 between node 401 and new node 2203 and wire Z7 between node 402 and new node 2203 replace the original component. Port M0 2204 provides a way to connect new node 2203 to other parts of the overall circuit. Port M0 2204 is connected to the layer numbered 0.

The Two-Argument GND Function

The two-argument GND ("ground") function enables distant parts of a circuit to be connected to ground. The GND function is a special "via" function that connects directly to the electrical ground of the circuit. This direct connection to ground is made even if there is only one GND function calling for a connection to ground in the circuit. After execution of a GND function, there are two writing heads. They point to the two new wires.

The Two-Argument POS Function

The two-argument POS ("positive reference voltage source") function enables distant parts of a circuit to be connected to a positive (e.g., +5.0) DC volt power source. The POS function is a special "via" function that connects directly to the positive power source. This direct connection is made even if there is only one POS function calling for a connection to a power source. After execution of a POS function, there are two writing heads. They point to the two new wires.

The Three-Argument THVIA Functions

Each of the eight three-argument THVIA functions (called THVIA0, . . . , THVIA7) enables distant parts of a circuit to be connected together. The THVIA functions are similar to the VIA functions; however, the THVIA functions take three arguments. Three new modifiable wires are created and there are three writing heads after execution of a THVIA function. The three writing heads point to the three new wires.

Figure 23:
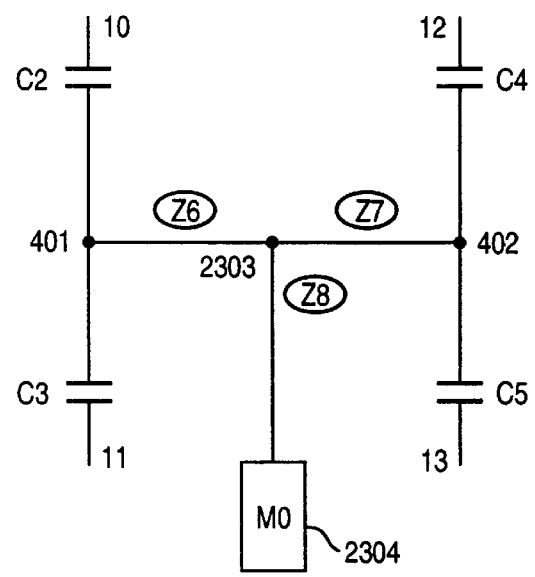
FIG. 23 illustrates the result of applying the THVIA0 function to resistor R1.

FIG. 23 shows the results of applying the THVIA0 function to wire Z0 from FIG. 4. The THVIA0 function replaces Z0 by a new modifiable wire Z6 between node 401 and new node 2303, new modifiable wire Z7 between node 402 and new node 2303, new modifiable wire Z8 between new node 2203, and port M0 2304. Thus, THVIA0 2304 provides a way to potentially connect node 2303 to other parts of the overall circuit.

The Three-Argument THGND Function

The three-argument THGND function enables distant parts of a circuit to be connected to ground. The THGND function is a special "via" function that connects directly to the electrical ground of the circuit. This direct connection to ground is made even if there is only one THGND function calling for a connection to ground in the circuit. After execution of a THGND function, there are three writing heads. They point to the three new wires.

The Three-Argument THPOS Function

The three-argument THPOS ("positive reference voltage source") function enables distant parts of a circuit to be connected to a positive (e.g., +5.0) DC volt power source. The THPOS function is a special "via" function that connects directly to a positive power source. This direct connection is made even if there is only one THPOS function calling for a connection to the power source. After execution of a THPOS function, there are three writing heads. They point to the three new wires.

The NOP Function

The one-argument NOP function has no effect on the highlighted component; however, it delays activity on the developmental path on which it appears in relation to other developmental paths in the overall program tree—thereby (possibly) affecting the overall result produced by the construction process. After execution of the NOP function, one writing head points to the original highlighted component.

The END Function

The zero-argument END function causes the highlighted component to lose its writing head—thereby ending that particular developmental path. The occurrence of an END function stops the development only along its developmental path within the overall program tree.

Other Connection-Creating Functions

The above connection-creating functions are illustrative of the generality and flexibility of the automated design system of the present invention. Many other connection-creating functions can be used to accommodate the requirements of designing particular classes of circuits or topological arrangements of circuit elements.

Other Functions

As already illustrated by the QT function, components may be created to replace a node (point) as well as to replace an edge (line) in the circuit diagram. In addition, although the degree of nodes is two or three in the foregoing description, other connection-creating functions, in conjunction with other component-creating functions, can be defined to accommodate nodes with greater degree.

Arithmetic-Performing Functions

The arithmetic-performing subtree(s) of the component-creating functions are compositions of arithmetic-performing functions and terminals. When evaluated, an arithmetic-performing subtree returns a floating-point value that becomes (after interpretation) a numerical component value.

Table 6 lists the arithmetic-performing functions and terminals.

TABLE 6

Arithmetic-performing functions and terminals.

| Name | Short Description | Arity |
|---|---|---|
| R | Random constants | 0 |
| + | Addition | 2 |
| − | Subtraction | 2 |
|  | Automatically defined function 0, . . . | Varies |
| ARG0, . . . | Dummy variable (formal parameter) 0, . . . | 0 | where "R" represents floating-point random constants between −1.000 and +1.000.

In one embodiment, multiplication and division (and other functions, such as exponential and logarithmic functions) are not included in the set of arithmetic-performing functions because the floating-point value returned by an arithmetic-performing subtree is interpreted on a logarithmic scale. However, other arithmetic-performing functions may be added if desired or required by a particular application.

The functions in arithmetic-performing subtrees are executed in depth-first order (in accordance with programming languages such as LISP).

The automatically defined functions, such as ADF0, and their dummy variables (formal parameters), such as ARGO, are discussed in the next section. They may or may not be used on particular problems and they may or may not be used in arithmetic-performing subtrees.

Automatically Defined Functions

Problems of automatic programming and automated design are replete with regularities, symmetries, homogeneities, similarities, patterns, and modularities. The approach to automatic programming and automated design in the present invention incorporates some hierarchical mechanism to exploit, by reuse and parameterization, the regularities, symmetries, homogeneities, similarities, patterns, and modularities inherent in problem environments. Subroutines do this in ordinary computer programs.

Describing how to evolve multi-part programs consisting of a main program and one or more reusable, parameterized, hierarchically-called subprograms is well-known in the art. For instance, see U.S. Pat. No. 5,343,554 and the book *Genetic Programming II: Automatic Discovery of Reusable Programs* (Koza 1994).

An automatically defined function (ADF) is a function (sometimes referred to as a subroutine, subprogram, DEFUN, procedure, or module) whose work-performing body is dynamically evolved during a run of genetic programming and which may be called by a calling main program (or calling subprogram) whose work-performing body is concurrently being evolved. When automatically defined functions are being used, a program in the population has a hierarchy of one (or more) reusable function-defining branches (i.e., automatically defined functions) along with one (or more) main result-producing branch(es). The automatically defined functions may possess one or more dummy arguments (formal parameters). Typically, the automatically defined functions are reused with different instantiations of these dummy arguments. During a run, genetic programming evolves different subprograms in the function-defining branches of the overall program, different main programs in the result-producing branch, different instantiations of the dummy arguments of the automatically defined functions in the function-defining branches, and different hierarchical references between the branches.

When automatically defined functions are being used in genetic programming, the initial random generation of the population is created so that every individual program has a constrained syntactic structure consisting of a particular architectural arrangement of branches. In one embodiment, when crossover is to be performed, a type is assigned to each potential crossover point in the parental computer programs either on a branch-wide basis (called branch typing) or on the basis of the actual content of the subtree below the potential crossover point (called point typing). Crossover is then performed in a structure-preserving way (given closure) so as to ensure the syntactic validity of the offspring.

In the context of design, automatically defined functions provide a way to exploit, by reuse and parameterization, the regularities, symmetries, homogeneities, similarities, patterns, and modularities inherent in problem environments. Thus, it is desirable to include automatically defined functions in runs of genetic programming for designing complex structures.

Table 7 lists the potential functions and terminals that are used in connection with automatically defined functions. There is a maximum number, $MAX_{adf}$, of automatically defined functions and a maximum number, $MAX_{arg}$, of arguments that may be possessed by an automatically defined function.

TABLE 7

Potential functions and terminals for automatically defined functions.

| Name | Short Description | Range of Arity |
| --- | --- | --- |
| ADF-i | Automatically defined function i | 0 to $MAX_{adf}$ |
| ARG-i | Dummy variable i (formal parameter) of automatically defined function(s) | 0 to $MAX_{arg}$ |

Note that it is possible for arithmetic-performing subtrees to invoke automatically defined functions in order to provide reusablility of the results of numerical calculations.

When an automatically defined function is encountered during execution of a program tree, the order of execution of the functions in the automatically defined function and the program tree is as if the entire body of the automatically defined function were inserted into the program tree.

Automatically defined functions may be used in two distinct ways. First, they may be composed of connection-creating and component-creating functions and invoked as part of the process of creating the topology and inserting components into the topology. Second, they may be composed of arithmetic functions and invoked from an arithmetic-performing subtree as part of the process of sizing components.

Detailed Example of Development of a Circuit from the Embryonic Circuit

This section presents an example of the process of developing a circuit from an embryonic circuit. The individual program tree used in this section happens to be the best of generation circuit from generation 0 of one run of a problem discussed later in the first section on the design of a lowpass filter. The first result-producing branch of this program tree has 25 points (i.e., functions and terminals) and is shown below:

(C
 (−0.963 (−(− −0.875−0.113) 0.880))
 (series
  (flip end)
  (series
   (flip end)
   (L −0.277 end)
   end)
 (L
  (− −0.640 0.749)
  (L −0.123 end))))

The second result-producing branch has 5 points and is shown below:

(flip
 (nop
  (L −0.657 end))))

Figure 24:
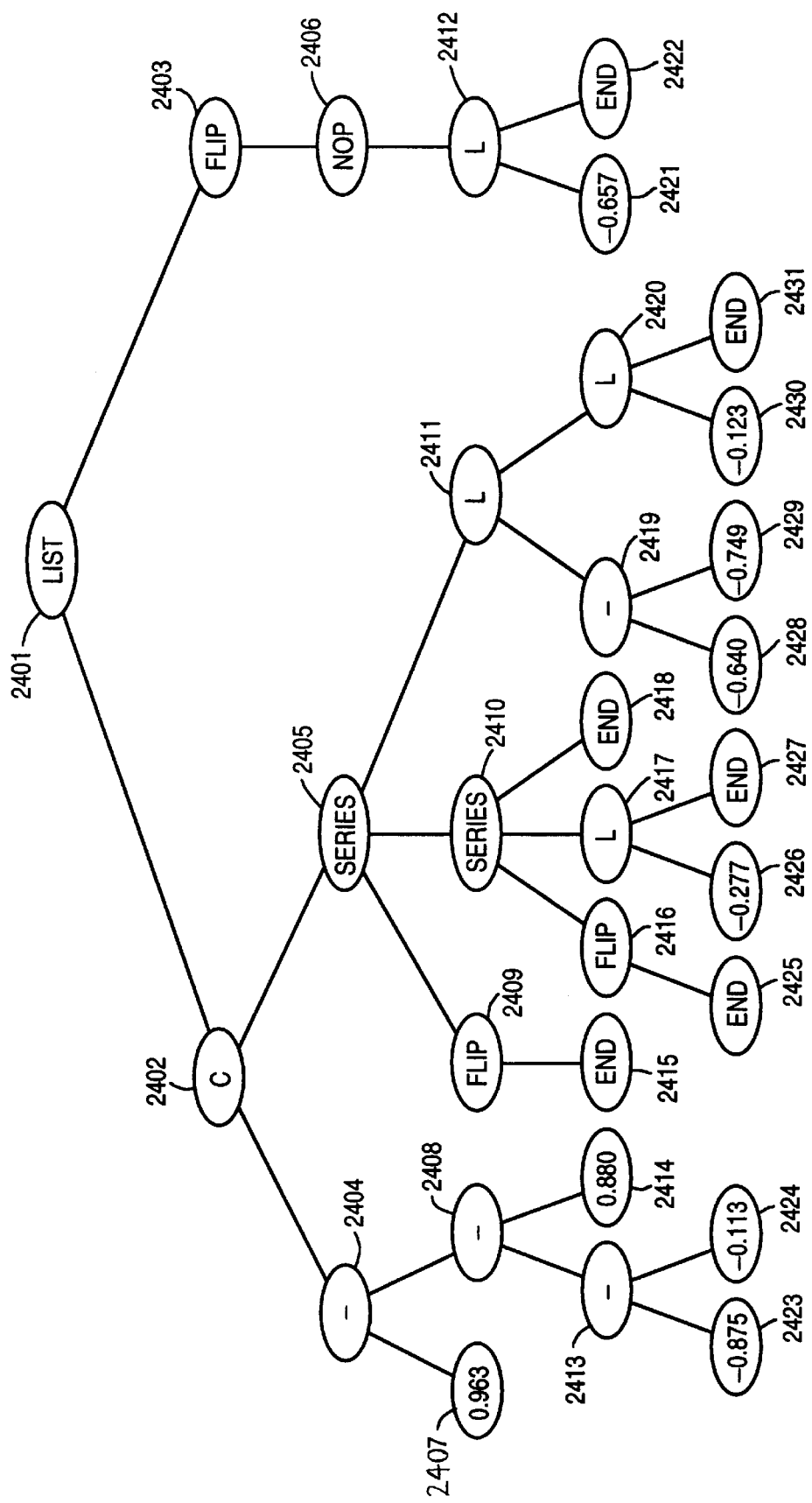
FIG. 24 illustrates a program tree for best circuit of generation 0.

FIG. 24 presents this circuit-constructing program as a rooted, point-labeled tree with ordered branches. The connective LIST function 2401 joins the two result-producing branches. The first result-producing branch is rooted at the C function 2402 and the second result-producing branch is rooted at the FLIP function 2403.

FIG. 25 shows the topmost three points of the program tree of FIG. 24 along with the embryonic circuit for this problem. FIG. 24 also shows the initial two writing heads. One writing head is initially associated with the C function 2402 and points to modifiable wire Z0; the other is initially associated with the FLIP function 2403 and points to modifiable wire Z1.

In executing a program tree, the functions in the result-producing branches below the connective LIST function 2401 at the root of the tree are executed in a breadth-first order; however, each arithmetic-performing subtree (such as the 7-point subtree rooted at point 2404 is immediately executed, in its entirety, in a depth-first order whenever a component-creating function is encountered. Thus, the C (capacitor) function 2402 in FIG. 24 is executed first. Then, the 7-point arithmetic-performing subtree 2404 is immediately executed in its entirety in a depth-first way so as to deliver the numerical component value needed by the capacitor function C. Then, the breadth-first order is resumed and the FLIP function 2403 is executed.

FIG. 26 shows the result of executing the C function 2402 acting on the modifiable wire Z0 of the embryonic circuit of FIG. 25 to create the new capacitor C3. The 7-point subtree
(−0.963 (−(− −0.875 −0.113) 0.880))
(rooted at point 2404) is an arithmetic-performing subtree and is therefore executed in its entirety immediately after the C function 2402. This 7-point subtree evaluates to 2.605 which, when interpreted and scaled (in the manner described earlier) establishes 403 nF as the component value for capacitor C3. After execution of the C function 2402, one writing head points to C3.

The FLIP function 2403 in the second result-producing branch of the overall program tree of FIG. 24 is now executed. FIG. 27 shows the result of executing the FLIP function 2403 acting on the modifiable wire Z1 (whose positive end was originally at node 2502) to changes its polarity (so that its negative end is now at node 2502). A change of polarity has no electrical effect on a wire (or on a capacitor, resistor, or inductor); however, a change of polarity does affect many components (e.g., diodes). In any event, polarity does affect the topology resulting from certain functions (e.g., SERIES division) that may be subsequently executed. After execution of the FLIP function, one writing head points to Z1.

Execution of the breath-first search of the program tree now proceeds to the third level of the tree of FIG. 24. Since the 7-point arithmetic-performing subtree 2404 has already been entirely executed, the SERIES function 2405 is executed next.

FIG. 28 shows the result of executing the SERIES function 2405 acting on capacitor C3 to create a series arrangement consisting of capacitor C3, the new node 2806, the modifiable wire Z4, the new node 2807, and new capacitor C5 (with the same component value, 403 nF, as C1). After execution of the SERIES function, there are three writing heads (pointing to C3, Z4, and C5) as well as one writing still head pointing to Z1.

The NOP ("No Operation") function 2406 in the second result-producing branch of the overall program tree is now executed. Its only effect is on the tiring of execution of subsequent functions in the second result-producing branch relative to the first result-producing branch.

Execution now proceeds to the fourth level of the program tree of FIG. 24.

Figure 29:
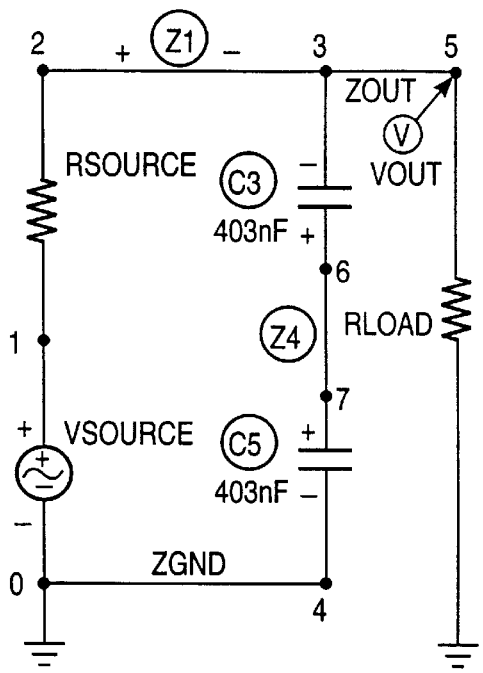
FIG. 29 illustrates a result of executing the FLIP function.

FIG. 29 shows the result of executing the FLIP function 2409 acting on capacitor C3 (whose positive end is originally at node 2503) to change its polarity (so that its negative end is now at node 2503). After execution of the FLIP function, one writing head points to C3 (as well as writing heads still pointing to Z4, C5, and Z1).

Figure 30:
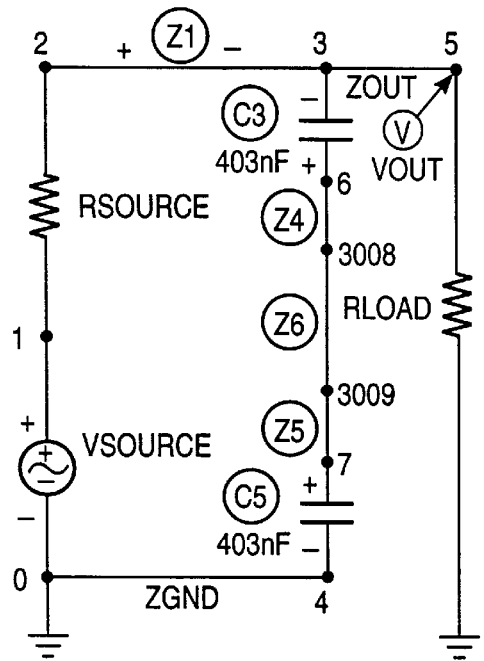
FIG. 30 illustrates a result of executing the SERIES function.

FIG. 30 shows the result of executing the SERIES function 2410 acting on modifiable wire Z4 to create a series arrangement consisting of modifiable wire Z4, new node 3008, modifiable wire Z6, new node 3009, and Z5. After execution of this SERIES function, there are six writing heads (pointing to C3, Z4, Z6, C5, C5, and Z1).

Figure 31:
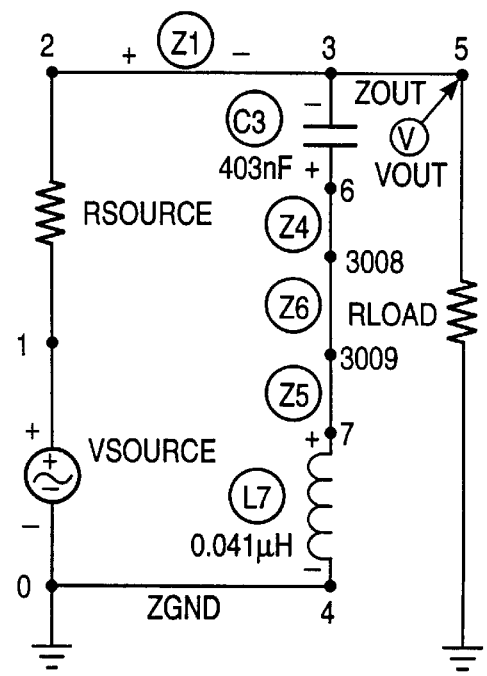
FIG. 31 illustrates a result of executing the L function acting on a capacitor to convert it into a new inductor.

FIG. 31 shows the result of executing the L function 2411 acting on the capacitor C5. The L function converts capacitor C5 into new inductor L7. The return value of this 3-point subtree (rooted at 2419)

(– –0.640 0.749)

is –1.389. After being interpreted, this return value establishes 0.041 micro-Henrys as the component value for the new inductor L7. After execution of this L function, there are still 6 writing heads.

Figure 32:
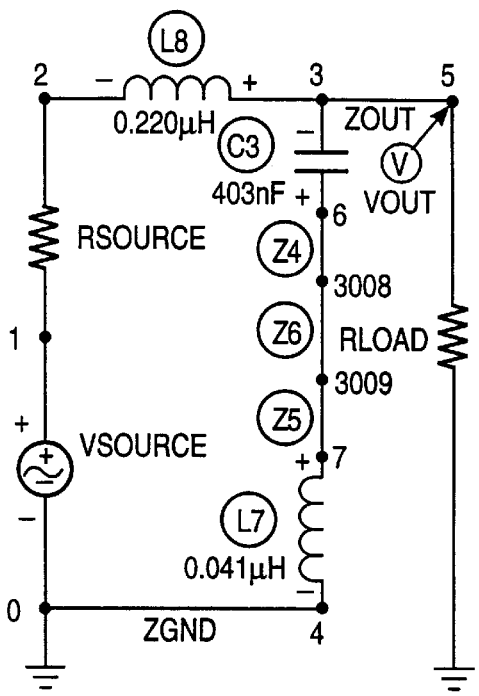
FIG. 32 illustrates a result of executing the L function.

The L function 2412 in the second result-producing branch of the overall program tree is now executed. FIG. 32 shows the result of executing the L function 2412 from the second result-producing branch acting on the modifiable wire Z1 to create inductor L8. When interpreted, the constant –0.657 (2421) establishes 0.220 micro-Henrys as the component value for L8. After execution of this L function, there are still 6 writing heads.

Execution now passes to the fifth level of the program tree of FIG. 24.

The END function (labeled 515) is now executed thereby ending the developmental process for that particular path (starting at point 2401 of the tree in FIG. 24 and running through points 2402, 2405, and 2409 to point 24015). The writing head associated with that path is eliminated, so there are now only five writing heads.

The FLIP function 2416 has no electrical effect since it operates on wire Z4.

Figure 33:
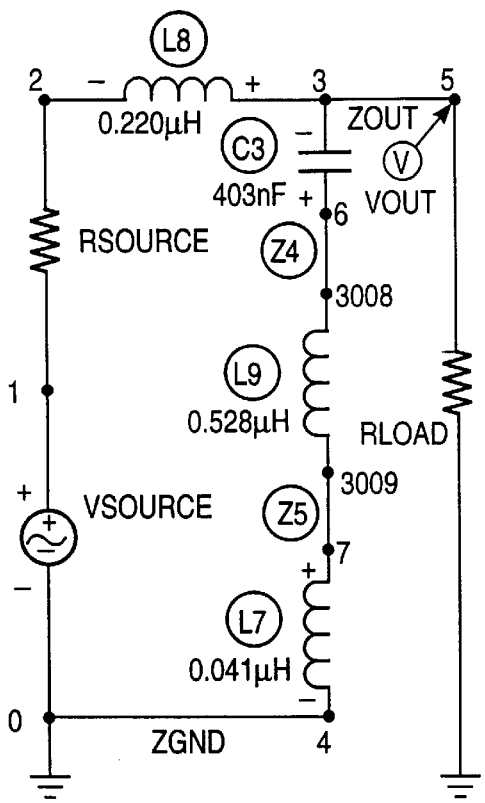
FIG. 33 illustrates a result of executing the L function.

FIG. 33 shows the result of executing the L function 2417 acting on the modifiable wire Z5 to create a new inductor L9. When interpreted, the constant –0.277 (2426) establishes 0.528 micro-Henrys as the component value for the new inductor L9.

The END function 2418 is now executed thereby ending the developmental process for Z5 and causing the writing head associated with that component to be eliminated. Thus, there are now only four writing heads.

Figure 34:
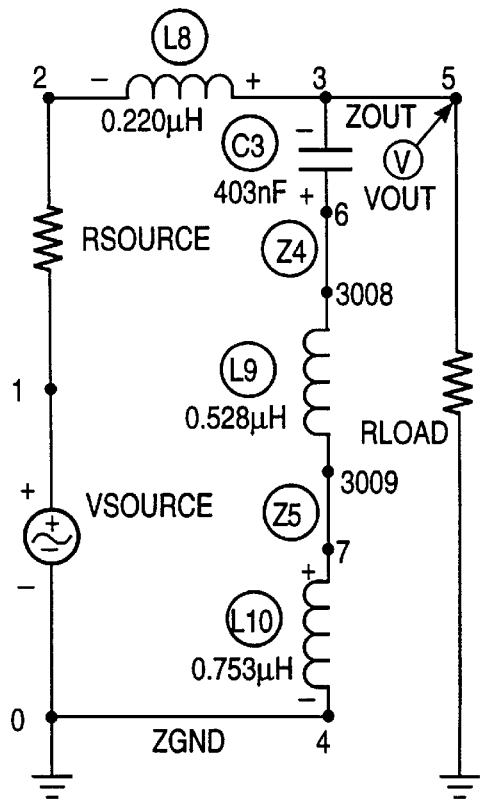
FIG. 34 illustrates a result of executing the L function.

FIG. 34 shows the result of executing the L function 2420 from the first result-producing branch acting on the existing 0.47 micro-Henrys inductor L7 to create a new inductor L10 in its stead. When interpreted, the constant –0.123 2430 establishes 0.753 micro-Henrys as the component value for the new inductor L10.

The END function at the point 2422 is now executed, thereby completing the second result-producing branch.

Execution now proceeds to the sixth (bottom) level of the program tree of FIG. 24. The END functions at the points 2425, 2427, and 2431 are now executed thereby eliminating the writing heads on Z4, L9 and L10 and consummating the entire developmental process of the circuit. There are now no writing heads remaining.

Figure 35:
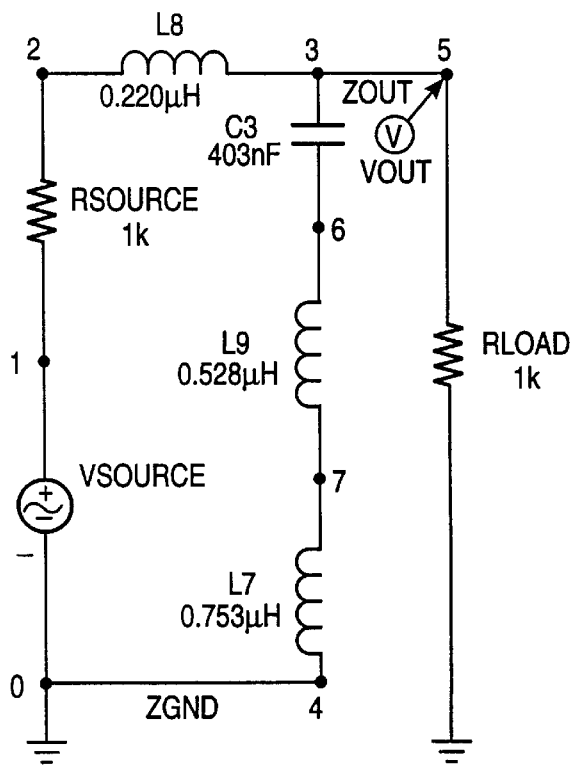
FIG. 35 illustrates the best circuit of generation 0.

FIG. 35 shows the best circuit of generation 0 after editing out of all now-extraneous wires (i.e., Z4 and Z5) and all now-extraneous nodes (i.e., 3008 and 3009).

In one embodiment, the program tree is traversed in a breath-first way (except for the immediately executed arithmetic-performing subtrees). This method of traversal appears advantageous based on current experience with this process. However, the process could be implemented using alternative approaches, such as depth-first search.

Designing a Lowpass LC Filter

An ideal lowpass filter passes all frequencies below a certain specified frequency, but stops all higher frequencies. An ideal highpass filter does the opposite. An ideal bandpass filter passes all frequencies in one or more specified ranges while stopping all other frequencies. An ideal stopband filter stops all frequencies in one or more specified ranges while passing all other frequencies. Practical filters never achieve ideal performance.

The starting point for the design of a filter is the specification by the user of the frequency ranges for the passband(s) and the stopband(s). Additionally, the user may specify the maximum passband ripple (i.e., the small variation that is tolerated within the passband) and the minimum stopband attenuation (i.e., the large degree of blockage in the signal that is demanded in the stopband) or other factors such as rolloff.

The design of filters becomes increasingly difficult as the user imposes more requirements and more stringent constraints. In practice, the user may impose additional design requirements—involving, for example, the power consumption of the circuit, the number of components in the circuit, the cost of components, the surface area occupied by all of the components, or the sensitivity of the circuit to temperature.

Consider a circuit design problem in which the goal is to design a filter using inductors and capacitors with an AC input signal with a 2 volt amplitude. The circuit is to be driven from a source with an internal (source) resistance of 1,000 Ohms and terminated in a load resistance of 1,000 Ohms. The filter is to have a passband below 1,000 Hertz with voltage values between 970 millivolts and 1 volt and to have a stopband above 2,000 Hz with voltage values between 0 volts and 1 millivolt.

A decibel is a unitless measure of relative voltage. A decibel is defined as 20 times the common logarithm of the ratio between the voltage at a particular probe point and a reference voltage (which, herein, is always 1.0 volts). Thus, the above requirement may be restated as a requirement for a pass band ripple of at most 0.3 decibels and a stop band attenuation of at least 60 decibels.

A practicing engineer would recognize that these requirements can be satisfied by a Chebychev-Cauer filter of complexity 5.

Preparatory Steps for the Lowpass LC Filter

Before applying genetic programming to a circuit design problem, seven major preparatory steps are performed, typically by the user. These steps include (1) identifying the terminals of the to-be-evolved programs, (2) identifying the primitive functions contained in the to-be-evolved programs, (3) creating the fitness measure for evaluating how well a given program does at solving the problem at hand, (4) choosing certain control parameters (notably population size and the maximum number of generations to be run), (5) determining the termination criterion and method of result designation, (6) determining the architecture of the overall program, and (7) identifying the embryonic circuit that is suitable for the problem.

In the following discussion, preparatory steps (7) and (6) are discussed prior to the other steps.

Embryonic Circuit

Since the problem of designing the lowpass LC filter calls for a one-input, one-output circuit with a source resistor and a load resistor, the embryonic circuit in FIG. 3 is suitable for this illustrative problem.

Program Architecture

No automatically defined functions are to be used in this illustrative problem.

Since the embryonic circuit initially has two writing heads—one associated with each of the result-producing branches—there are two result-producing branches in each overall program tree. Thus, the architecture of each overall program tree in the population consists of two result-producing branches joined by a LIST function.

Function and Terminal Sets

The terminal sets and function sets are identical for both result-producing branches of the program trees in the population for this illustrative problem.

Each branch is created in accordance with the constrained syntactic structure, such as shown in FIG. 2.

The functions are divided into three categories for this illustrative problem:
(1) connection-creating functions that create the topology of circuit from the embryonic circuit,
(2) component-creating functions that convert wires (and other components) within the circuit into specified components, and
(3) arithmetic-performing functions and numerical terminals that together specify the numerical value (sizing) for each component of the circuit.

The arithmetic-performing subtree(s) contains arithmetic functions and random constants and specifies the numerical value of the component. The construction-continuing subtree(s) continue the developmental process. Since the components used in this problem (i.e., inductors and capacitors) each take one numerical component value, there is only one arithmetic-performing subtree associated with each component-creating function.

Connection-creating functions have one or more construction-continuing subtrees. However, the connection-creating functions have no arithmetic-performing subtrees.

For this illustrative problem, the function set, $F_{ccs}$, for each construction-continuing subtree is $F_{ccs}$={C, L, SERIES, PSS, FLIP, NOP, GND, VIA0, VIA1, VIA2, VIA3, VIA4, VIA5, VIA6, VIA7}, taking 2, 2, 3, 4, 1, 1, 2, 2, 2, 2, 2, 2, 2, 2, and 2 arguments, respectively.

The terminal set, $T_{ccb}$, for each construction-continuing subtree consists of $T_{ccs}$={END}.

The function set, $F_{aps}$ for each arithmetic-performing subtree is, $F_{aps}$={+, −} each taking two arguments.

The terminal set, $T_{aps}$, for each arithmetic-performing subtree is $T_{aps}$={R} where "R" represents random floating-point constants between −1.000 and +1.000.

Fitness Measure

Note that the embryonic circuit, the program architecture, the function and terminal sets, and the constrained syntactic structure described above could be applied to any one-input, one-output LC circuit. It is the user-provided fitness measure that directs the evolutionary process (in the search space of circuit-constructing program trees) to a program that constructs the desired filter. In other words, the desired circuit structure arises from fitness.

FIG. 1B is a flow-chart for the overall process for designing a circuit. RUN is the current run number while N is the maximum number of runs to be made. The variable GEN refers to the current generation number. The variable M is the population size. The index i refers to the current individual in the population.

Referring back to FIG. 1B, the overall process of the present invention comprises several independent runs, controlled by processing logic so the process starts with the number of runs, RUN, being initialized to 0 at processing block 102. The processing logic may comprise hardware, and/or software, dedicated logic, etc. Each run consists of many generations, so the generation number, GEN, is initialized to 0 at processing block 104.

In generation 0, the first step is "Create Initial Population for Run" (processing block 106) which creates a number, M, of individuals (typically randomly).

The test for "Termination Criterion Satisfied for Run" at processing block 108 is typically based on either reaching a certain maximum number of generations, G, or on satisfying some problem-specific criteria. If the test for "Termination Criterion Satisfied for Run" is satisfied (processing block 108), the next step is "Designate Result for Run" (typically by designating the best individual achieved over the generations) at processing block 110. Then, the run number, RUN, is incremented at processing block 112. If the run number, RUN, satisfies the test at processing block 114 of being equal to the maximum number of runs to be run, N, then the process ends at "End" (processing block 116). Otherwise, the process continues to another run by next performing processing block 104.

The processing logic then performs a generational iterative step that contains two main iterative steps over the individuals in the population. In the first of these two main iterative steps (beginning at processing block 120), the fitness of each individual i in the population is determined. In the second of these two main iterative steps (beginning at processing block 140), the genetic operations are performed.

The first of these two main iterative steps over the individuals in the population begins with initializing the index, i, of the individual in the population (processing block 120). The index, i, is tested at step 121 as to whether it equals (or exceeds) the population size, M. If it does not, the fitness of each individual i in the population is determined. As a general principle, the determination of fitness may be implicit or explicit and it may or may not produce a numerical value of fitness. This flowchart is based on the case in which the determination of fitness is explicit and in which a numerical value of fitness is determined. When genetic programming is being used for the design of a circuit, the measurement of fitness consists of four steps:
(1) apply the individual circuit-constructing program tree to the embryonic circuit in order to produce a fully developed circuit (processing block 122), (2) create a description of the fully developed circuit (processing block 124), (3) analyze the circuit (in a real environment or by simulating the circuit based on its description) in order to produce its behavior (processing block 126), (4) apply the fitness measure to the behavior in order to produce a fitness value for the circuit (processing block 128).

Then, the index, i, of the individual in the population is incremented at processing block 130. If the index, i, satisfies the test at processing block 121 of being equal to (or greater than) the population size, M, then the first of these main iterative steps over the individuals in the population ends and processing continues at processing block 140.

The second of these two main iterative steps over the individuals in the population begins with initializing the index, i, of the individual in the population (processing block 140). The index, i, is tested as to whether it equals (or exceeds) the population size, M. If it does not, the step of "Select Genetic Operation" (processing block 146) is performed.

The step of "Choose Genetic Operation" (processing block 146) is probabilistic. The sum of the probabilities of choosing the operations of reproduction, crossover, mutation, branch duplication, argument duplication, branch deletion, argument deletion, branch creation, and argument creation is one. Thus, one of the nine alternatives is chosen.

Each of the nine alternatives begins with a selection step. For example, for the genetic operation of reproduction the step of "Select 1 Individual "is the selection step (processing block 158). This selection step selects an individual from the population with relatively high fitness values, in a probabilistic manner, with said selection, in most cases, being substantially based on the fitness of the individual such that individuals having a relatively high value of fitness are preferred over individuals having a relatively low value of fitness. Note that the selection step for the crossover operation at processing block 160 requires the selection of two individuals based on fitness. The selection step for the mutation operation (processing block 170), and the other six selection steps requires selection of one individual based on fitness. Note that the same individual in the population may be selected more than once during each generation.

For each of the nine alternatives, the genetic operation is performed. For example, if the operation of reproduction is chosen, then the operation of reproduction is performed (processing block 152). If the operation of crossover is chosen, then the crossover operation is performed (processing block 162). Note that in the version of the crossover operation used herein, a single offspring is produced. If the operation of mutation is chosen, then the mutation operation is performed (processing block 172). The other six operations are handled similarly.

Then, the common step of "Insert Offspring into New Population" 1090 is performed for each of the nine alternatives (processing block 190).

Then, the index, i, of the individual in the population is incremented (processing block 192). If the index, i, does not satisfy the test at processing block 142 of being equal to (or greater than) the population size, M, this second main iterative steps continues at processing block 146.

If the index, i, satisfies the test at processing block 142, then the second of these main iterative steps over the individuals in the population ends. The generation number, GEN, is incremented at processing block 144 and processing continues at processing block 108.

It should be recognized that there are numerous slight variations of the overall process possible. Some of these variations can be used as a matter of convenience.

For simplicity, the flowchart does not show certain additional genetic operations such as "permutation" or "define building block" (also called "encapsulation") that are not employed in one embodiment.

The evaluation of fitness for each individual circuit-constructing program tree in the population begins with its execution. This execution applies the functions in the program tree to the very simple embryonic circuit, thereby developing the embryonic circuit into a fully developed circuit. A netlist describing the circuit is then created. The netlist identifies each component of the circuit, the nodes to which that component is connected, the value of that component (if applicable), and the model of the component (if applicable). Each circuit is then simulated to determine its behavior. The 217,000-line SPICE simulator was modified to run as a submodule within the genetic programming system. The input to a SPICE simulation consists of a netlist describing the circuit to be analyzed and certain commands that instruct SPICE as to the type of analysis to be performed and the nature of the output to be produced. SPICE can produce tabular information describing the circuit's electrical behavior. This tabular information is then used to measure fitness.

The fitness measure may incorporate any calculable characteristic or combination of characteristics of the circuit, including the circuit's behavior in the time domain, its behavior in the frequency domain, its power consumption, the number of components, cost of components, surface area occupied by its components, or sensitivity to temperature or other variables. Since we are designing a filter, the focus is on the behavior of the circuit in the frequency domain.

For this problem, the voltage VOUT is probed at isolated node 305 of FIG. 3 and the circuit is viewed in the frequency domain. The SPICE simulator is requested to perform an AC small signal analysis and to report the circuit's behavior for each of 101 frequency values chosen over five decades of frequency (from 1 Hz to 100,000 Hz). Each decade is divided into 20 parts (using a logarithmic scale).

Fitness is measured in terms of the sum, over these 101 fitness cases, of the absolute weighted deviation between the actual value of the voltage in the frequency domain) that is produced by the circuit at the probe point VOUT at isolated node 305 and the target value for voltage. The smaller the value of fitness, the better. A fitness of zero represents an ideal filter.

Specifically, the standardized fitness is $$F(t) = \sum_{i=0}^{100} [W(d(f_i), f_i)d(f_i)]$$

where $f(i)$ is the frequency (in Hertz) of fitness case i; $d(x)$ is the difference between the target and observed values at frequency x; and $W(y,x)$ is the weighting for difference y at frequency x. The fitness measure does not penalize ideal values; it slightly penalizes every acceptable deviation; and it heavily penalizes every unacceptable deviation.

The procedure for each of the 61 points in the 3-decade interval from 1 Hz to 1,000 Hz is as follows: if the voltage equals the ideal value of 1.0 volts in this interval, then the deviation d(f;) is 0.0; if the voltage is between 970 millivolts and 1,000 millivolts, then the absolute value of the deviation from 1,000 millivolts is weighted by a factor of 1.0; if the voltage is less than 970 millivolts, then the absolute value of the deviation from 1,000 millivolts is weighted by a factor of 10.0. This arrangement reflects the fact that the ideal voltage in the passband is 1.0 volt, the fact that a 30 millivolt shortfall is acceptable, and the fact that a voltage below 970 millivolts in the passband is not acceptable. It is not possible for the voltage to exceed 1.0 volts in an LC circuit of this kind.

The procedure for each of the 35 points in the interval from 2,000 Hz to 100,000 Hz is as follows: If the voltage is between 0 millivolts and 1 millivolt, the absolute value of the deviation from 0 millivolts is weighted by a factor of 1.0. If the voltage is more than 1 millvolt, the absolute value of the deviation from 0 millivolts is weighted by a factor of 10.0. This arrangement reflects the fact that the ideal voltage in the stopband is 0.0 volts, the fact that a 1 millivolt ripple above 0 millivolts is acceptable, and the fact that a voltage above 1 millivolt in the stopband is not acceptable.

In this example, the number of fitness cases (61 and 35) in these two main bands are sufficiently close that no attempt was made to equalize the weight given to the differing numbers of fitness cases in these two main bands. The deviation is considered to be zero for each of the 5 points in the interval above 1,000 Hz and below 2,000 Hz (i.e., the "don't care" band).

Hits are defined as the number of fitness cases for which the voltage is acceptable or ideal or that lie in the "don't care" band. Thus, the number of hits ranges from a low of 5 to a high of 101 for this problem. Note that the user-supplied problem-specific fitness measure drives the evolutionary process.

Some of the bizarre circuits that are randomly created for the initial random population and that are created by the crossover operation and the mutation operation in later generations cannot be simulated by SPICE. Circuits that cannot be simulated by SPICE are assigned a high penalty value of fitness ($10^8$). These circuits become the worst-of-generation circuits for each generation. The practical effect of this high penalty value of fitness is that these individuals are rarely selected to participate in genetic operations and that they quickly disappear from the population.

In one embodiment, if the netlist of a circuit has any of the following pathological characteristics, it is not passed along to SPICE for simulation, but, instead, is immediately assigned the high penalty value of fitness:
(1) the circuit contains a voltage source with both ends connected to the same node;
(2) the circuit contains an inductor with both ends connected to the same node;
(3) the circuit contains a component with an unconnected lead;
(4) the circuit contains a node with no DC path to ground that does not pass through a capacitor; or
(5) the circuit has a pair of nodes with no path between them.

In one embodiment, if any of the following types of errors occur during the SPICE simulation, the simulation is stopped and the circuit is assigned the high penalty value of fitness:
(1) the number of memory allocation requests exceeds a prespecified upper limit of 2,000 requests;
(2) the amount of memory allocated exceeds a prespecified upper limit of 300 kilobytes (This limit indirectly acts as a time limit on the simulation);
(3) a floating-point error (e.g., division by zero, underflow, overflow, etc.) occurs, for example, during the simulation of bipolar junction transistors, floating-point overflows sometimes occurs or during the probe output setup, divisions by zero sometimes occur;
(4) a null (invalid) pointer appears in one of the matrix routines; or
(5) an attempt is made to free a block of memory that has not previously been allocated.

Control Parameters

For this illustrative problem, the population size, M, was 320,000 for most runs (but 40,000 for a few runs). The percentage of genetic operations on each generation was 89% crossovers, 10% reproductions, and 1% mutations. The architecture-altering operations were not used on this illustrative problem. A maximum size of 200 points was established for each of the two result-producing branches in each overall program.

In randomly choosing functions during the creation of the initial random population, the C, L, SERIES, PSS, FLIP, NOP, each GND functions were each assigned a relative weight of 8, while each of the eight VIA functions were assigned a relative weight of 1.

The other parameters for controlling the runs of genetic programming were the default values specified in Koza 1994 (appendix D).

Termination Criterion and Results Designation

In this example, it is difficult in advance to determine whether it would be possible to evolve an individual scoring 101 hits. Moreover, if this maximum number of hits were attainable, several different distinct solutions may be obtained from the various processing nodes of the parallel computer system. Since this problem runs slowly, a maximum number of generations, G, is set to a large number to increase the potential for development.

Parallel Computer System

Parallel processing is advantageous (but in no way required) for implementation of the present invention because of the uncoupled nature of the time-consuming fitness measurements of the process. Parallelization can be used with almost 100% efficiency by the process of the present invention.

In one embodiment, the processing logic generates and executes a run on a medium-grained parallel Parystec computer system consisting of 64 Power PC 601 80 MHz processors (each with an accompanying INMOS transputer) arranged in a toroidal mesh with a host PC Pentium® type computer. The Power PC processors communicate by way of a INMOS transputer that is associated with each Power PC processor. The so-called distributed genetic algorithm or island model for parallelization is used. That is, subpopulations (referred to herein as demes) are situated at the processing nodes of the system. The population size is Q=5,000 at each of the D=64 demes, so that the total population size, M, is 320,000. The initial random subpopulations of generation 0 are created locally at each processing node. Generations are run asynchronously on each node. After the genetic operations are performed locally on each node, four boatloads of emigrants, each consisting of B=2% (the migration rate used in one embodiment of the system) of the node's subpopulation (selected on the basis of fitness) are dispatched to each of the four toroidally adjacent processing nodes. The immigrants are assimilated into each destination processing node just after that node dispatches its immigrants to its neighboring nodes.

Figure 36:
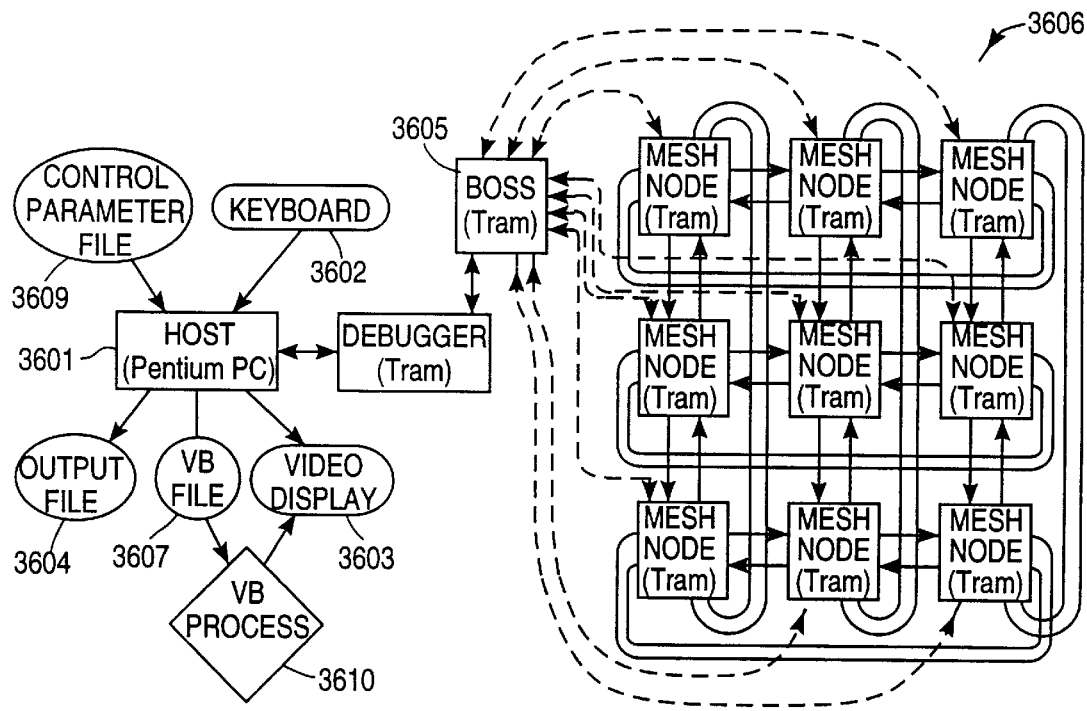
FIG. 36 illustrates the parallel genetic programming system.

The physical system used in one implementation of parallel genetic programming uses a PC Pentium® processor type computer as a host and a network of processing nodes. FIG. 36 shows the various elements of the system. These elements are arranged in an overall system consisting of the following:
(1) the host computer consisting of a keyboard 3602, a video display monitor 3603, and a large disk memory 3604,
(2) a processor 3605 containing the central supervisory process (the Boss process), and
(3) the 64 processors 3606 of the parallel network, each running a Monitor process, a Breeder process, an Exporter process, and an Importer Process.

The PC computer 3601 is the host and acts as the file server for the overall system. The "Boss Node" 3605 contains the central supervisory process for running genetic programming.

The 64 processing nodes are arranged in a toroidal network in which 62 of the 64 processing nodes are physically connected to four neighbors (in the N, E, W, and S directions) in the network. Two of the 64 nodes of the network are exceptional in that they are physically connected to the Boss Node 3605 and only three other processing nodes. The Boss Node 3605 is physically linked to only two processing nodes of the network. The communication between processes on different processing nodes is by means of one-way, point-to-point, unbuffered, synchronized channels.

The processing nodes run inter-communicating processes connected by channels. Host 3601 has two processes. The first process on Host 3601 receives input from keyboard 3602, reads an input file 3609 containing the parameters for controlling the run, writes the two output files, output file 3604 and video buffer (VB) file, and communicates with boss 3605. The second process on the Host computer is the monitoring process. The boxes in the figure denote the various computers, including the host computer (a PC Pentium® processor type machine), the optional Debugger Node 3607 (a TRAM used to house the INMOS debugger), the Boss Node 3605, and the network of processing nodes (which are also referred to as mesh-nodes). For simplicity, FIG. 36 shows only a network of nine nodes (rather than all 64 nodes). The ovals denote the various files (all on the host computer), including one input file for each run (containing the parameters for controlling the run) and two output files (one containing the intermediate and final results of the run and one containing summary information needed by a monitoring process, referred to herein as the VB process 3610). The rounded boxes denote the input-output devices of the host computer, including its keyboard and video display monitor. The diamond denotes the monitoring process that displays information about the run on the video display monitor of the host computer. Heavy unbroken lines are used to show the physical linkage between the various elements of the system. Heavy broken lines show the lines of virtual communication between the Boss node 3605 and the processing nodes. Light unbroken lines show the lines of virtual communication connecting each of the processing nodes with their four neighbors.

The optional transputer for the Debugger runs only one process, the INMOS Debugger process. The processor with the Boss runs only one process, the Boss.

Each of the 64 processors in the toroidal network concurrently runs the following four processes:
(1) the Importer,
(2) the Exporter,
(3) the Breeder, and
(4) the Monitor.

Figure 37:
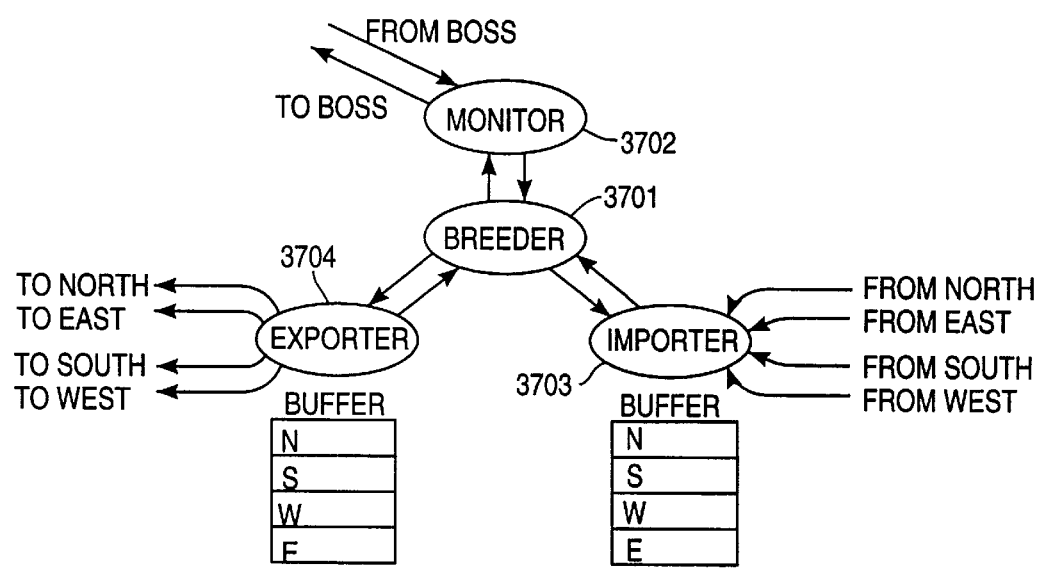
FIG. 37 illustrates the four processes on each of the 64 processing nodes.

FIG. 37 shows these four processes on each of the 64 processors. The primary process on each of the processing nodes is the Breeder process 3701. The Breeder process 3701 performs the bulk of the computation in genetic programming, and the three other processes facilitate communication with the Boss and the four neighboring nodes. Specifically, the other three processes permit asynchronous communication and serve to avoid deadlocks.

The Boss process is responsible for communicating with the Host process, for sending initial start messages to each of the processors in the network, for tabulating information sent up from each processor at the end of each generation, for sending information to the monitoring process on the host, and for handling error conditions.

At the beginning of a run of genetic programming, the Boss process initializes various data structures, creates the set of fitness cases either functionally or by obtaining information from a file on the Host, creates a different random seed for each processor, pings each processor to be sure it is ready, and reads in a set of parameters from a file on the host that controls genetic programming. Then, the Boss sends a Start-Up message to each Monitor process, such as monitor process 3702 (which will in turn send it along to the Breeder process such as Breeder process 3701). This message contains the following:

the size of the subpopulation that is to be created at the processing node, the control parameters for creating the initial random subpopulation at that processing node, including the method of generation and the maximum size for the initial random individuals (and each function-defining and result-producing branch thereof), the common, network-wide table of random constants for the problem (if any), the control parameters specifying the number of each genetic operation (e.g., reproduction, crossover, etc.) to be performed for each generation, a node-specific seed for the randomizer, the actual fitness cases for the problem, the number of primed individuals (and, if any, the primed individuals themselves).

After sending the Start-up message, the Boss enters a loop where it handles the various messages that each Monitor sends until an error condition occurs, a solution is found, or all processors have either crashed or completed a number of generations specified in a parameter file.

The Monitor process of each processing node is continually awaiting messages from both the Boss process of the Boss node as well as from the Breeder process of its processing node. Upon receipt of a Start-Up message from the Boss, the Monitor process passes this message along to the Breeder process on its node.

The Monitor process also passes the following messages from the Breeder process of its node along to the Boss:
(1) End-of-Generation Message: The end-of-generation message contains the best-of-generation individual for the current subpopulation on the processing node and statistics about that individual such as its fitness and number of hits. This message also contains the fitness (and hits) for the worst-of-generation individual of the processing node, the average fitness (and hits) for the subpopulation at the node, and the variance of the fitness (and hits) of the subpopulation.
(2) Eureka Message: The eureka message announces that the processing node has just created an individual in its subpopulation that satisfies the success criterion of the problem and contains the just-created best-of-run individual and various statistics about it.
(3) Trace Message: The trace message announces that the Breeder process has reached certain milestones in its code (e.g., received its start-up message, completed creation of the initial random subpopulation for the node).
(4) Error Message: The error message announces that the Breeder process has encountered certain anticipatable error conditions.

After the Breeder process of a processing node receives the Start-up message, it creates the initial random subpopulation of individuals for the node. Then, in the main generational loop, the Breeder process of a processing node iteratively performs the following steps:
(1) Evaluates the fitness of every individual in the subpopulation.
(2) Selects, probabilistically, based on fitness, a small number of individuals to be emigrants (except on generation 0) and sends them to a buffer in the Exporter process.
(3) Assimilates the immigrants currently waiting in the buffers of the Importer process (except on generation 0). Note that the fitness of an individual is part of the data structure associated with that individual so that the fitness of an immigrant need not be recomputed upon its arrival at its destination.
(4) Creates an end-of-generation report for the subpopulation.
(5) Performs the genetic operations on the subpopulation.

The breeder process runs until one individual is created that satisfies the success predicate of the problem or until it is stopped by the Boss process.

The amount of computer time required to evaluate individuals in genetic programming usually varies considerably among small subpopulations. The presence of just one or a few time-consuming programs in a particular subpopulation can dramatically affect the amount of computer time required to run one generation. Any attempt to synchronize the activities of the algorithm at the various processing nodes would require slowing every processing node to the speed of the slowest. Therefore, each processing node operates asynchronously from all other processing nodes. After a few generations, the various processing nodes of the system will typically be working on different generations.

This speed variation arises from numerous factors, including the different sizes of the individual programs, the mix of faster and slower primitive functions in the programs, and, most importantly, the number, nature, and content of the function-defining branches of the overall program. Each invocation of an automatically defined function requires execution of the body of that automatically defined function, so that the effective size of the overall program at the time of execution is considerably larger than the visible number of points (i.e., functions and terminals) actually appearing in the overall program. Moreover, when one automatically defined function can hierarchically refer to another, the effective size (and the execution time) of the program may be an exponential function of the visible number of points actually appearing in the overall program. In addition, for problems involving a simulation of behavior over many time steps, many separate experiments, or many probabilistic scenarios, some programs may finish the simulation considerably earlier or later than others.

The desired asynchrony of the generations on nearby processors requires that the exporting and importing of migrating programs take place in a manner that does not require that the breeder itself ever wait for a neighboring process to finish a generation. To allow the breeder 3701 nearly uninterrupted computing time, the Exporter process 3704 and the Importer process 3703 handle the communication. The Monitor process acts in a similar fashion for communication with the Boss process. In addition, the use of multiple processes is important to prevent dead-locks from taking place.

The Exporter process 3704 periodically interacts with the Breeder process 3701 of its processing node as part of the Breeder's main generational loop for each generation (except generation 0). At that time, the Breeder 3701 sends four boatloads (groups) of individual program trees from the population (i.e., emigrants) to a buffer of the Exporter process 3704. The Exporter process 3704 then sends one boatload of emigrants to the Importer process 3703 of each of the four neighboring processing nodes of the network.

The purpose of the Importer 3703 is to store incoming boatloads of emigrants until the Breeder 3701 is ready to incorporate them into the subpopulation. When a boatload of immigrants arrives via any one of the four channels connecting the Importer process 3703 to its four neighboring Exporter processes, the Importer 3703 consumes the immigrants from that channel and places these immigrants into the buffer associated with that channel (occasionally overwriting previously arrived, but not yet assimilated, immigrants in that buffer). When the Breeder process 3701 is ready to assimilate immigrants, it calls for the contents of the buffers of the Importer 3703. If all four buffers are full, the four boatloads of immigrants replace the emigrants that were just dispatched by the Breeder process 3701 to the Exporter process 3704 of the node. If fewer than four buffers are full, the new immigrants replace as many of the just-dispatched emigrants as possible.

Some runs of this illustrative problem were run on a coarse-grained parallel Parystec computer system consisting of 4 Power PC 601 80 MHz processors arranged in a toroidal mesh with a host PC Pentium® type computer. The population size was Q=10,000 at each of the D=4 demes, so the total population size, M, is 40,000.

Results for the Lowpass LC Filter

The results of several different runs of genetic programming on the problem of designing a lowpass LC filter will illustrate the principles behind the automated design process of the present invention.

Description of a First Run

A run of genetic programming for this illustrative problem starts with the random creation of an initial population of 320,000 program trees (each consisting of two result-producing branches) composed of the functions and terminals identified above and in accordance with the constrained syntactic structure described above.

For each of the 320,000 program trees in the population, the sequence of functions in the circuit-constructing program tree is applied to the embryonic circuit for this problem (FIG. 3) in order to create a circuit. The netlist for the resulting circuit is then determined. This netlist is wrapped inside an appropriate set of SPICE commands and the circuit is then simulated using our modified version of SPICE.

The initial random population of a run of genetic programming is a blind random search of the search space of the problem. As such, it provides a baseline for comparing the results of subsequent generations.

The worst individual circuit-constructing program trees from generation 0 create circuits which are so pathological that the SPICE simulator is incapable of simulating them. These circuits are assigned a high penalty value of fitness (i.e., $10^8$).

The worst simulatable individual from generation 0 has a fitness of 892.0. This individual program tree has 11 points in its first result-producing branch and 14 points in its second result-producing branch. The circuit that results when the embryonic circuit is developed in accordance with the functions in this circuit-constructing program tree has no inductors at all. This circuit scores only 5 hits (representing the five "don't care" points among the 101 fitness cases). The behavioral characteristics of a putative filter are best measured by its frequency domain behavior. In this instance, the frequency response of the circuit bears no resemblance to that of a lowpass filter.

However, even among randomly created circuits, some are better than others.

The circuit from the 25th percentile of fitness from generation 0 (from among the simulatable individuals) has a fitness of 610.1 and scores 34 hits (out of 101). Unlike the previous circuit that entirely lacked inductors, this circuit has one inductor and one capacitor.

The median (50th percentile) circuit from generation 0 has a fitness of 610.0 and scores 40 hits (out of 101). The output probe point VOUT of this circuit receives no power at all from the voltage source VSOURCE. Consequently, the circuit produces an output of 0 volts for all frequencies. The behavior of this median circuit of generation 0 in the frequency domain is not that of a filter because the circuit treats all frequencies alike. This median circuit of the initial random generation is far removed from the operating characteristics of an analog electrical filter circuit.

The circuit from the 75th percentile of fitness from generation 0 has a fitness of 401.0 and scores 5 hits. The behavior of this 75th percentile circuit in the frequency domain is not that of a filter because it treats all frequencies alike.

However, it achieves a better value of fitness than the median individual of generation 0 because its constant value of voltage (about 0.8 volts) is closer to 1 volt for the somewhat more numerous points in the passband (1 Hz to 1,000 Hz) than the constant value of 0 volts produced by the median individual of generation 0. In other words, given the fitness measure chosen for this illustrative problem, this individual is slightly better than the median circuit.

The best circuit of the 320,000 circuits from generation 0 has a fitness of 58.71 (on the scale of weighted volts described earlier) and scores 51 hits. This individual program tree was previously discussed in detail in FIGS. 25 to 35.

The behavior of this circuit in the frequency domain in the interval between 1 Hz and 100 Hz is very close to the required 1 volt (accounting for most of the 51 hits scored by this individual). However, the voltages produced between 100 Hz and 1,000 Hz are considerably below the minimum of 970 millivolts required by the design specification (in fact, by hundreds of millivolts as one approaches 1,000 Hz). Moreover, the voltages produced above 2,000 Hz are, for the most part, considerably above the minimum of 1 millivolt required by the design specification (by hundreds of millivolts in most cases). Nonetheless, the behavior of this noncomplaint circuit from generation 0 bears some resemblance to that of a lowpass filter in that the voltage is near 1 volt for the first two decades of frequency and the voltage is near zero for a few sample points at higher frequencies.

Generation 1 (and each subsequent generation of the run) is created from the population at the preceding generation by performing reproduction, crossover, and mutation on individuals (or pairs of individuals in the case of crossover) selected from the population at the previous generation on the basis of fitness.

The best individual program in generation 1 has a fitness of 58.59 (i.e., slightly better than the 58.71 of generation 0) and scores 52 hits (one more than generation 0).

As the run proceeds from generation to generation, the fitness of the best-of-generation individual tends to improve. For example, new pace-setting values of fitness (i.e., a best-of-generation fitness value reported from one of the 64 processors that is better than any previously reported best-of-generation fitness value) were reported in generations 2, 3, 4, 5, 6, 7, 9, and 13. Specifically, these pace-setting values of fitness for the best-of-generation individuals of these generations are 58.56, 57.51, 57.45, 48.51, 22.51, 21.58, 5.75, and 5.52, respectively. The number of hits for the best of generation individual in the population reaches 56 on generation 5 and 86 on generation 13. The best of generation 23 has fitness 0.37 and scores 99 hits.

Seventy-two percent of the programs of generation 0 for this problem produce circuits that cannot be simulated by SPICE. The unsimulatable programs are the worst-of-generation programs for each generation and receive the high penalty value of fitness ($10^8$). However, the percentage of unsimulatable programs drops to 31% by generation 1, 16% by generation 2, 15% by generation 3, and 7% by generation 10. In other words, the vast majority of the offspring created by Darwinian selection and the crossover operation are simulatable after just a few generations.

In trying to evolve electronic circuits using genetic programming, one of our major threshold concerns was whether any significant number of the randomly created circuits of generation 0 in this highly epistatic search space would be simulatable. A second concern was whether the crossover operation would create any significant number of simulatable circuits. Neither of these concerns materialized with genetic programming on this problem. Darwinian selection apparently is very effective in quickly steering the population on successive generations into the portion of the search space where parents can beget simulatable offspring by means of the crossover operation.

This observation supports the general principle that the individuals in the population in intermediate generations of a run of genetic programming (and random subtrees picked from them) differ from the individuals (and their randomly picked subtrees) in the randomly created population of generation 0 of the same run. That is, crossover fragments from intermediate generations of a run of genetic programming are very different from the randomly grown subtree provided by the mutation operation. It is experimental evidence, for this non-trivial problem, that the population serves a vital role in the genetic algorithm—namely that of providing a reservoir of useful fragments to rapidly advance the search.

In the genetic algorithm, the entire population generally improves from generation to generation. The improvement, from generation to generation, in the fitness of the population as a whole is evident by examining the average fitness of the population by generation. The average fitness of the population of 320,000 individuals of generation 1 is 3,240, 415 (as compared to 7,232,192 for generation 0). That is, the entire population improves from generation 0 to generation 1. Part of this improvement reflects the smaller number of individuals in the population at generation 1 that receive the high penalty value of fitness. The average fitness of the population as a whole reaches 1,328,221 for generation 5 and 924,046 on generation 13 (again indicating that many fewer individuals in the population are receiving the high penalty value of fitness). The average fitness of the population as a whole is 1,054 for generation 0, 443 for generation 2, 213 for generation 5, 58.2 for generation 10, 38.0 for generation 20, and 16.5 by generation 30. The evolutionary process thus continues from generation to generation.

The best individual program tree of generation 32 has 306 points, has a fitness of 0.00781 and scores 101 hits. That is, by generation 32, all 101 sample points are in compliance with the design requirements for this illustrative problem. The deviation averages about 0.08 millivolts per sample point.

Figure 38:
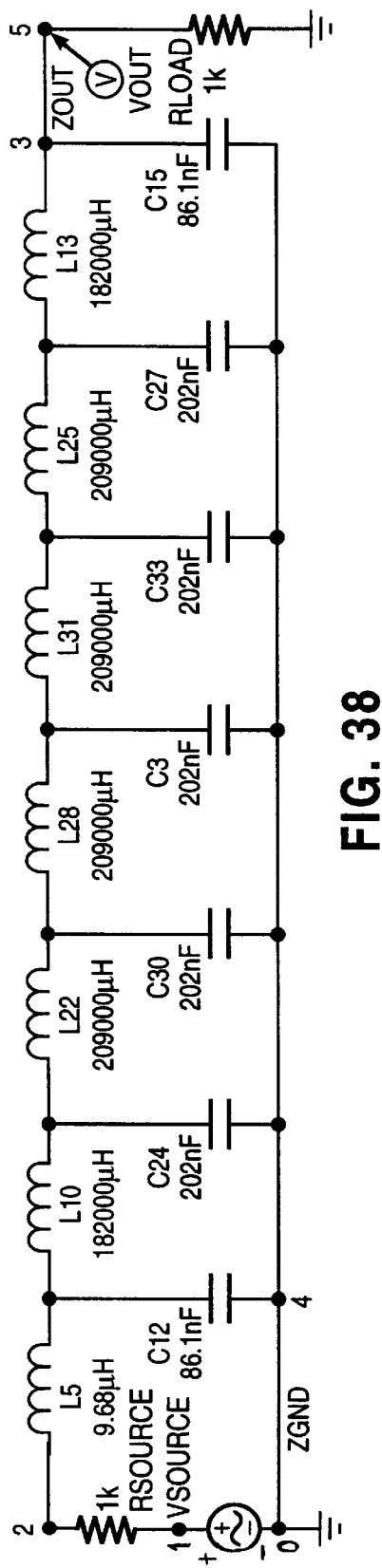
FIG. 38 illustrates the best-of-run "seven-rung ladder" circuit from generation 32.

FIG. 38 shows the best circuit from generation 32. This circuit is a seven-rung ladder consisting of numerous repeated values of various inductors and capacitors. This ladder structure is the topology of a Butterworth or Chebychev filter, but this circuit does not possess components with the exact numerical values that would be associated with a Butterworth or Chebychev filter.

When continuing the run of genetic programming after the emergence of the first 100%-compliant individual, additional 100%-compliant individuals often emerge. These additional solutions frequently have radically different topologies as well as different sizing. Second, as the run continues, the quest for ever better values of fitness continues and even more fit (100%-compliant) individuals are often created. When a parallel computing system with demes is used, there are often especially pronounced differences between the harvested solutions from the same run (as contrasted with a serial computer implementation without demes).

Figure 39:
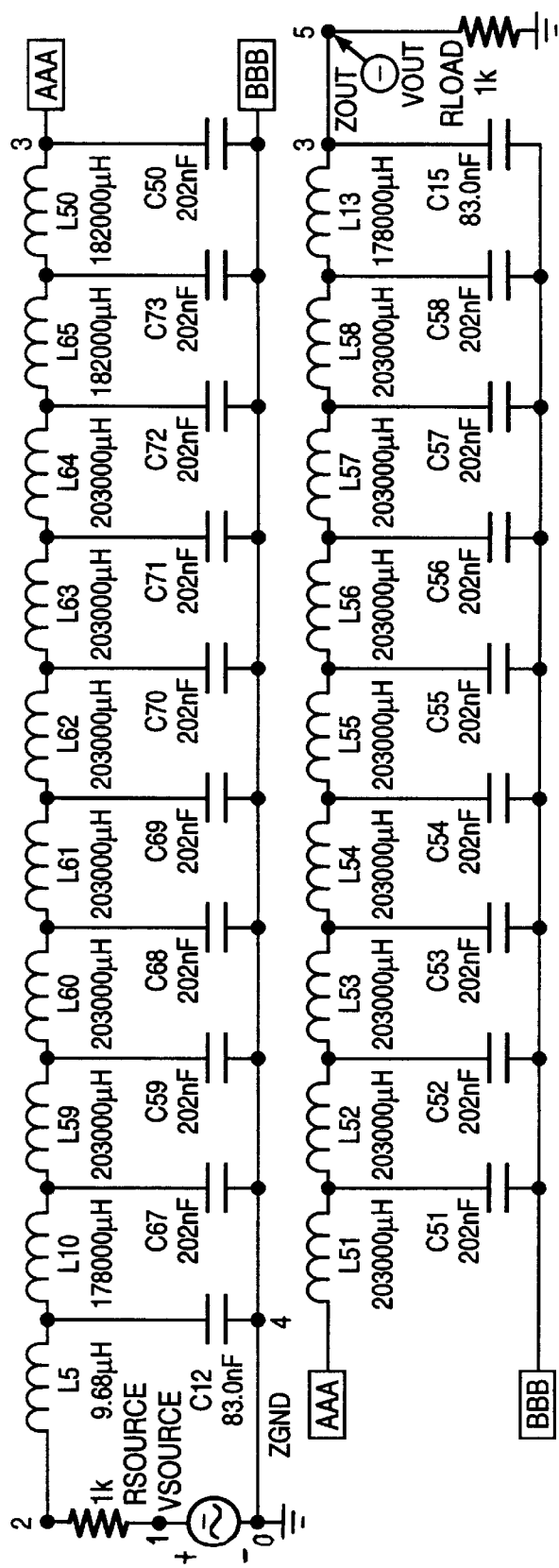
FIG. 39 illustrates the best-of-run "19-rung ladder" circuit from generation 76.

The best individual from generation 76 of this same run has a fitness (0.000995) that is about an order of magnitude better than that of the first fully compliant individual seen in generation 32. FIG. 39 shows the best-of-run circuit from generation 76. This circuit has a ladder consisting of 17 0.203 Henry inductors and 17 201 nF capacitors. It also has four differently valued inductors and capacitors at the beginning and end of the ladder.

Several other circuits scoring 101 hits were harvested from this run. All employed a ladder structure (with differing numbers of rungs and differing component values).

Therefore, the present invention allows useful electronic circuits that satisfy the user's design goal to be automatically created.

A "Bridged T" Circuit from Run 2

Genetic programming involves probabilistic steps at least four places, namely creating the initial population of generation 0, selecting individuals from the population on which to perform each operation, selecting the particular operation to perform, and selecting a point (e.g., the crossover point) within the selected individual at which to perform the genetic operation. Thus, different runs of genetic programming produce different results.

Figure 40:
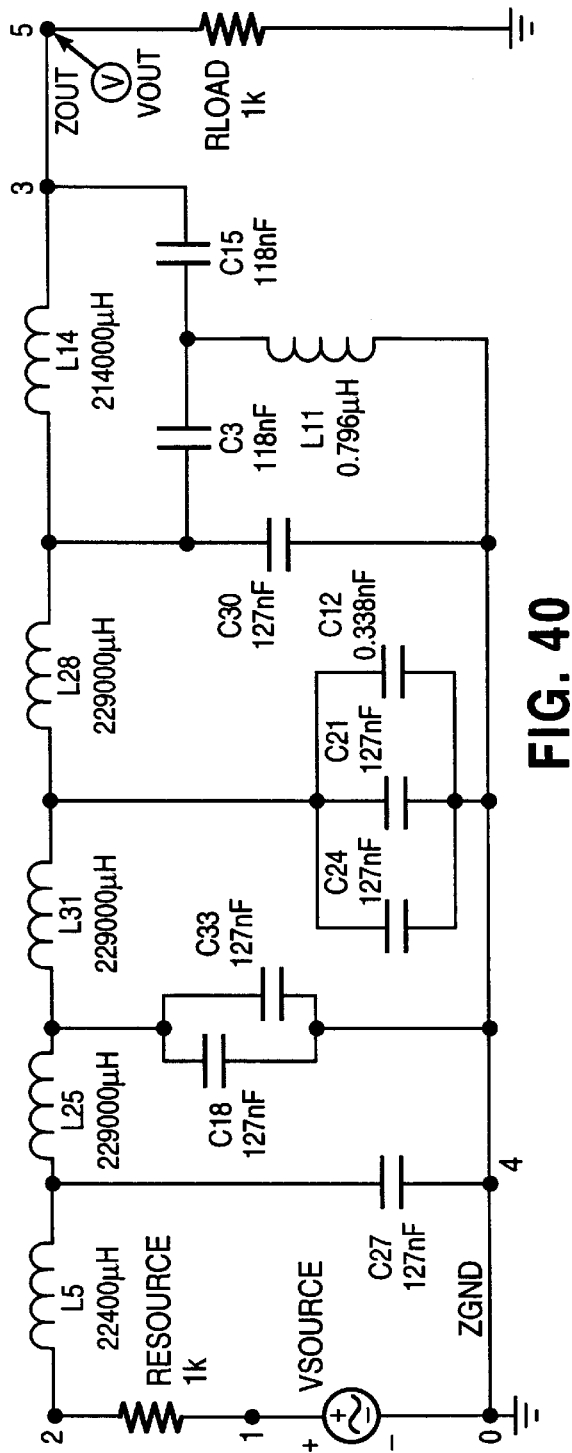
FIG. 40 illustrates a "bridged T" circuit from generation 64.

FIG. 40 shows a fully compliant best-of-run circuit from generation 64 of another run of genetic programming on this problem. In this circuit (which has a fitness of 0.04224), inductor L14 forms a recognizable "bridged T" substructure in conjunction with capacitors C3 and C15 and inductor L11. Of course, the parallel capacitors (the pair C18 and C33 as well as the triplet C24, C21, and C12) could be combined. This "bridged T" circuit is different in topology from the "ladder" circuits.

Additional evolved fully compliant circuits illustrate the great variety of results that can be obtained from genetic programming.

Figure 41:
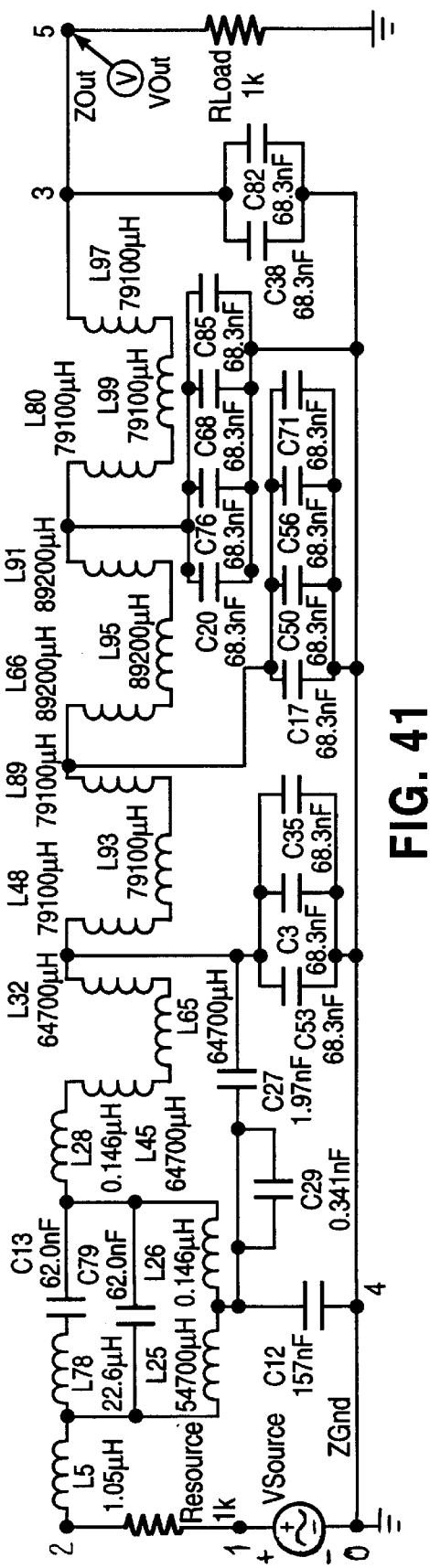
FIG. 41 illustrates the best-of-run circuit from generation 58.

FIG. 41 shows another fully compliant best-of-run circuit from generation 58 of run 3 of genetic programming on this problem with a fitness of 0.03201. Although this circuit has numerous instances of parallel capacitors and series inductors which can be combined and although its right half has a ladder structure, its left half is considerably different from the previously seen ladder circuits.

The bypassing of capacitor C29 is an example of the kind of anomaly that often appears in genetically evolved structures. Many such anomalies can, of course, be removed by standard manual or automated editing and simplification methods.

Figure 42:
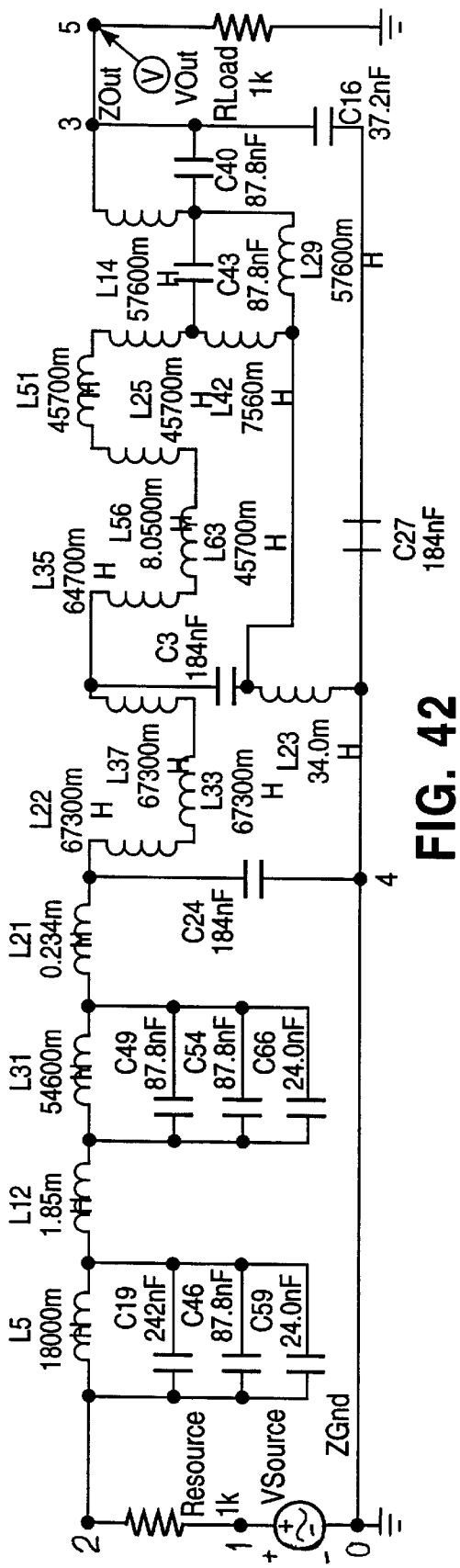
FIG. 42 illustrates best-of-run circuit from generation 212.

FIG. 42 shows another fully compliant circuit from generation 212 of run 4 of genetic programming on this problem with a fitness of 0.00114. Again, even after combining the parallel capacitors and series inductors, the topology of this circuit differs from those seen previously.

Figure 43:
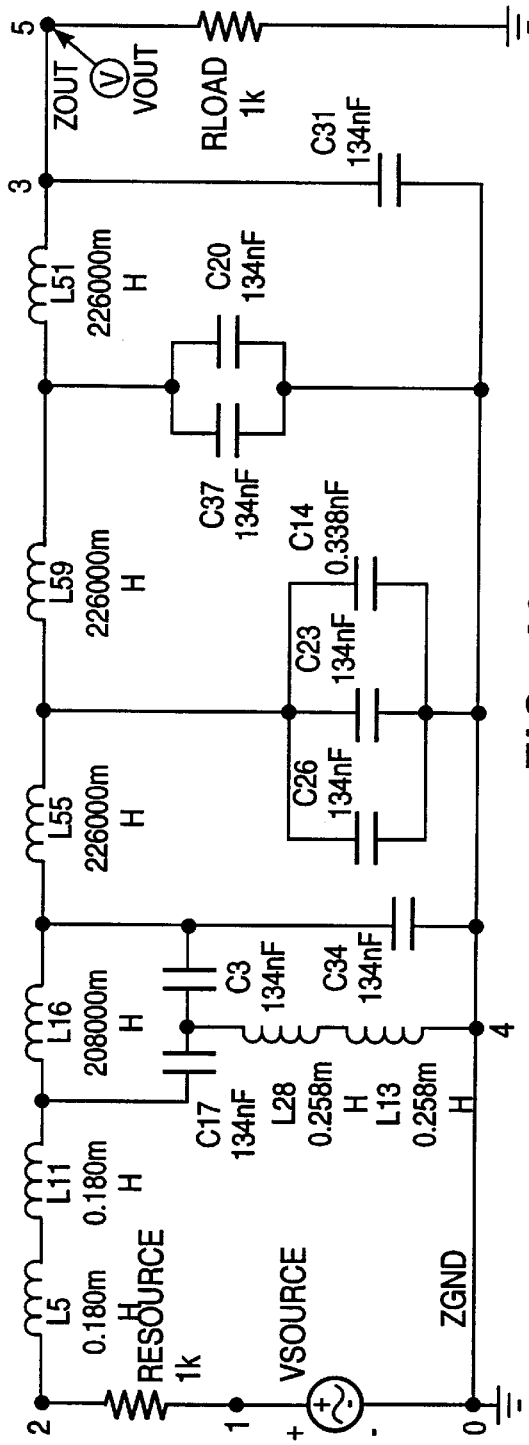
FIG. 43 illustrates best-of-run circuit from generation 53.

FIG. 43 shows another fully compliant circuit from generation 53 of run 5 of genetic programming on this problem with a fitness of 0.06507. When the parallel capacitors and series inductors of this circuit are combined, the right half of this circuit has a ladder structure.

Designing a Lowpass LC Filter Using Automatically Defined Functions

Automatically defined functions (ADFs) provide a mechanism for reusing parts of computer programs. In this section, the goal is to use automatically defined functions while designing a lowpass filter that satisfies the same design characteristics as previously discussed. In this section, the architectural arrangement will be specified in advance by the user (i.e., the architecture-altering operations for creating, modifying, and deleting automatically defined functions will not be used).

Preparatory Steps for the Lowpass LC Filter Using ADFs

Automatically Defined Functions

The Embryonic Circuit

The embryonic circuit in FIG. 25 for a one-input, one-output circuit with two writing heads is again suitable for this problem.

Program Architecture

Since the embryonic circuit initially has two writing heads—one associated with each of the result-producing branches—there are two result-producing branches (called RPB0 and RPBL) in each program tree.

Four zero-argument automatically defined functions (referred to as ADF0, ADF1, ADF2, ADF3) are included in each program tree. There are no hierarchical references among the automatically defined functions. Thus, there are four function-defining branches in each program tree. Note, if desired, that any number of automatically defined functions could be used and any number of them could refer to one another in a hierarichal way.

Figure 44:
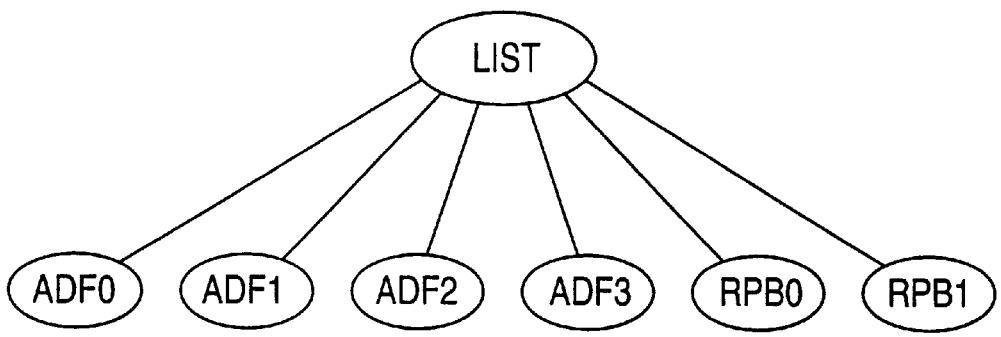
FIG. 44 illustrates a program having four function-defining branches and two result-producing branches.

Consequently, the architecture of each overall program tree in the population consists of a total of six branches (i.e., four function-defining branches and two result-producing branches) joined by a LIST function. FIG. 44 shows this six-branch overall architectural structure.

Function and Terminal Sets

All four function-defining branches and both result-producing branches of each program tree in the population employ the same terminal set for this illustrative problem. Also, all four function-defining branches employ a common function set for this problem. Both result-producing branches employ a common function set and their common function set differs from that of the four function-defining branches only in that it includes the four automatically defined functions. Each branch is created in accordance with the constrained syntactic structure.

The functions are divided into four categories for this illustrative problem:
1) connection-creating functions that create the topology of circuit from the embryonic circuit,
(2) component-creating functions that convert wires (and other components) within the circuit into specified components,
(3) arithmetic-performing functions and numerical terminals that together specify the numerical value (sizing) for each component of the circuit, and
(4) automatically defined functions (subroutines) whose number and arity are specified in advance by the user.

The automatically defined functions take no arguments and do not refer to each other hierarchically.

The function set, $F_{ccs}$, for each construction-continuing subtree is $F_{ccs}=\{$ADF0, ADF1, ADF2, ADF3, C, L, SERIES, PSS, FLIP, NOP, THGND, THVIA0, THVIA1, THVIA2, THVIA3, THVIA4, THVIA5, THVIA6, THVIA7$\}$.

The first ten functions take 0, 0, 0, 0, 2, 2, 3, 4, 1, 1, 3, and 0 arguments, respectively.

The eight THVIA functions each take 3 arguments.

The terminal set, $T_{ccb}$, for each construction-continuing subtree is $T_{ccs}=\{$END, CUT$\}$.

The function set, $F_{aps}$, for each arithmetic-performing subtree is $F_{aps}=\{+,-\}$ each taking two arguments.

The terminal set, $T_{aps}$, for each arithmetic-performing subtree is $T_{aps}=\{R\}$, where R represents floating-point random constants between −1.000 and +1.000.

Fitness Measure

The fitness measure is the same as in the previously discussed LC lowpass filter design problem.

Parameters

The control parameters were the same as in the previously discussed LC lowpass filter design problem, except that (1) a maximum size of 300 points was established for each of the two result-producing branches in each overall program, and (2) in randomly choosing functions during the creation of the initial random population, the C, L, SERIES, PSS, FLIP, NOP, and THGND functions were each assigned a relative weight of 8, while each of the eight THVIA functions, each of the four automatically defined functions (ADF0, ADF1, ADF2, ADF3) were assigned a relative weight of 1.

Termination Criterion and Results Designation

The termination criterion and method of results designation are the same as in the previously discussed LC lowpass filter design problem.

Results for the Lowpass LC Filter Using Automatically Defined Functions

The best circuit from generation 0 has a fitness of 58.6 and scores 52 hits (out of 101). It has 283 points in its first result-producing branch and 3 points in its second result producing branch and has 52, 284, 20, and 33 points in automatically defined functions ADF0, ADF1, ADF2, and ADF3, respectively. However, neither of the result-producing branches of this best-of-generation individual references any of the four automatically defined functions. This best-of-generation circuit has a single inductor and a single capacitor. The topological arrangement of these two components are that of the first rung of a classical ladder filter. The behavior of the best-of-generation circuit from generation 0 in the frequency domain bears only a faint resemblance to that of the desired lowpass filter.

Note that 98% of the programs of generation 0 for this problem produce circuits that cannot be simulated by SPICE. The unsimulatable programs are the worst-of-generation programs for each generation and receive the high penalty value of fitness ($10^8$). However, the percentage of unsimulatable programs drops to 84% by generation 1, 77% by generation 2, 41% by generation 3, and 15% by generation 4. Thereafter, the percentage ranges between 6% and 12% for the rest of the run. In other words, the vast majority of the offspring created by Darwinian selection and the crossover operation are simulatable after just a few generations.

The best-of-generation individual from processing node 18 of generation 9 is the first pace-setting individual where an automatically defined function is called more than once. This individual has a fitness of 29.5 and scores 65 hits.

Figure 45:
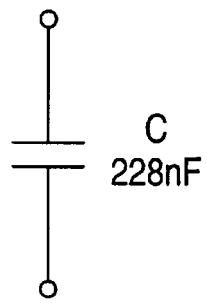
FIG. 45 illustrates twice-used automatically defined function ADF3 and generation 9.

FIG. 45 shows that the twice-used automatically defined function ADF3 creates a 228 nF capacitor. This ADF3 illustrates one of the simplest benefits of an automatically defined function, namely to make a component with a common value available at more than one place in a circuit.

Figure 46:
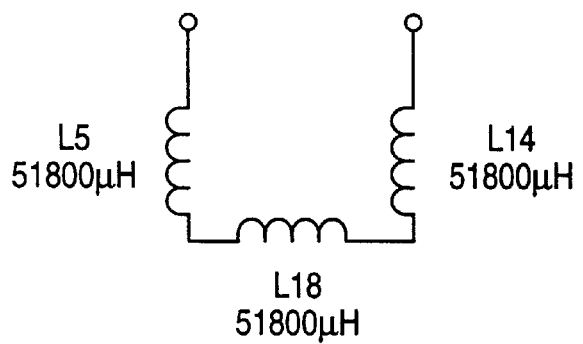
FIG. 46 illustrates the twice-used automatically defined function ADF0 and generation 9.

The best individual program from processing node 21 in generation 9 has a fitness of 10.3 and scores 84 hits. It has 19 points in its RPB0 and 8 points in its RPB1 and has 48, 283, 6, and 2 points in ADF0, ADF1, ADF2, and ADF3, respectively. FIG. 46 shows the twice-used ADF0

The best circuit from processing node 21 in generation 9 differs from all previous pace-setting best-of-generation individuals in that it has a different topology, namely a two-rung ladder. The induction element of both rungs of the ladder comes from a series composition of three inductors (L5, L18, and L14 for the first rung and L16, L20, and L11 for the second rung). Both groups of inductors come from ADF0. The two-rung ladder markedly improves the behavior in the frequency domain.

The best individual program in generation 16 has a fitness of 4.1 and scores 90 hits. ADF0 is used three times. The repetition of the value of 55,500 micro-Henrys of the three inductors in ADF0 reflects the previous effect of a SERIES function within ADF0. The best circuit of generation 16 has a different topology from its predecessors, namely a three-rung ladder.

The best individual program in generation 19 has a fitness of 4.1 and scores 95 hits. Its ADF0 is used four times. This best circuit of generation 19 has a different topology from its predecessors, namely a four-rung ladder.

The best individual program in generation 31 is especially interesting because it has the exact topology of an elliptic filter. This individual scores 101 hits (out of 101) and has a fitness of 0.0850. It came from processing node 3. It has 41 points in its RPB0 and 7 points its RPB1 and has 52, 297, 22, and 2 points in ADF0, ADF1, ADF2, and ADF3, respectively. ADF0 (FIG. 47) is used five times.

FIG. 48 shows this best circuit of generation 31. As is shown, there is an inductor and a capacitor on each of the five vertical shunts of this circuit (e.g., L34 and C18 appear in the first shunt).

The best individual program in generation 35 scores 101 hits (out of 101) and has a fitness of 0.00752 (i.e., about an order of magnitude better than that of the best-of-generation individual from generation 31). It has 34 points in its RPB0 and 4 points in its RPB1 and has 55, 260, 3, and 2 points in ADF0, ADF1, ADF2, and ADF3, respectively. Only ADF0 is referenced by the result-producing branches.

Figure 50:
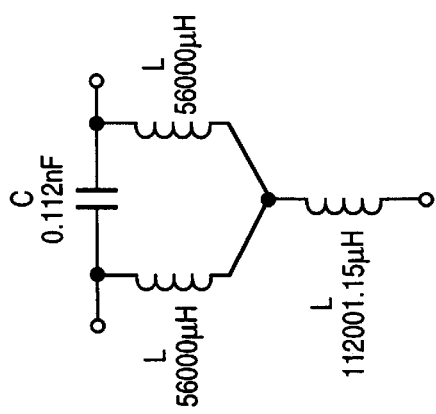
FIG. 50 illustrates an edited version of ADF0 of best-of-run circuit from generation 35.

ADF0 (FIG. 49) is invoked four times in the best-of-generation program from generation 35. The topology of the portion of the circuit created by this automatically defined function is considerably more complicated than that seen before. Two inductors (L52 and L34) and one capacitor (C51) form a triangle and there is an additional induction element (specifically, a series composition of three inductors, L43, L42, and L61) branching away from the triangle at node 10 where inductors L52 and L34 meet. Also, ADF0 has three ports. FIG. 50 shows a version of this ADF0 after simplifying the series composition of inductors and changing its orientation to a triangular orientation.

Figure 51:
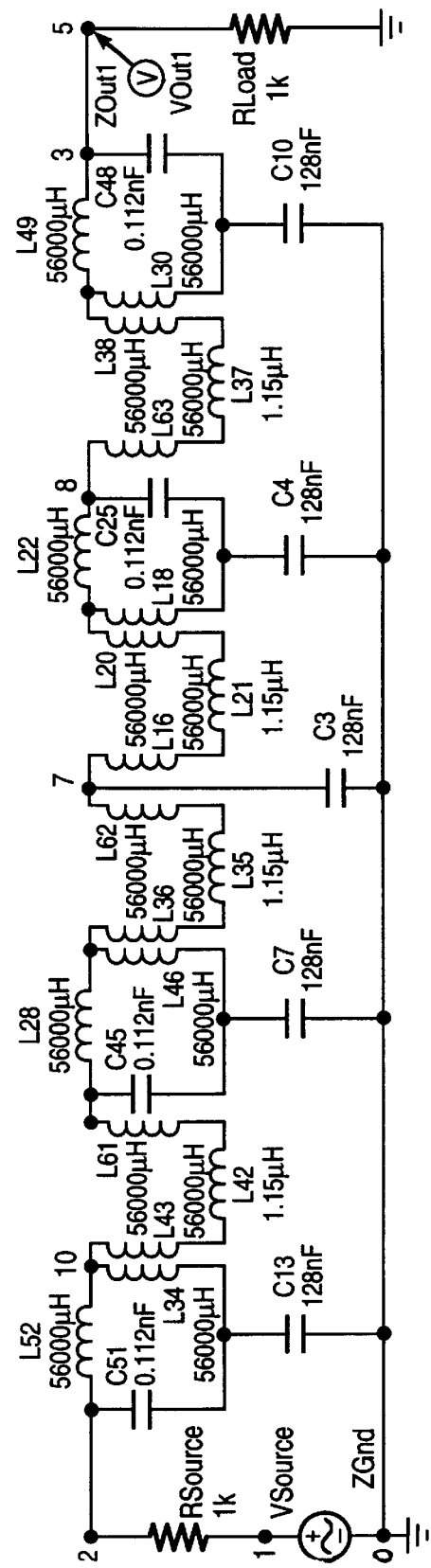
FIG. 51 illustrates the best-of-run circuit from generation 35.

FIG. 51 shows this best-of-run circuit from generation 35. The behavior in the frequency domain of the best-of-run circuit from generation 35 exhibits a classical "brick wall" separating the passband and the stopband.

Figure 52:
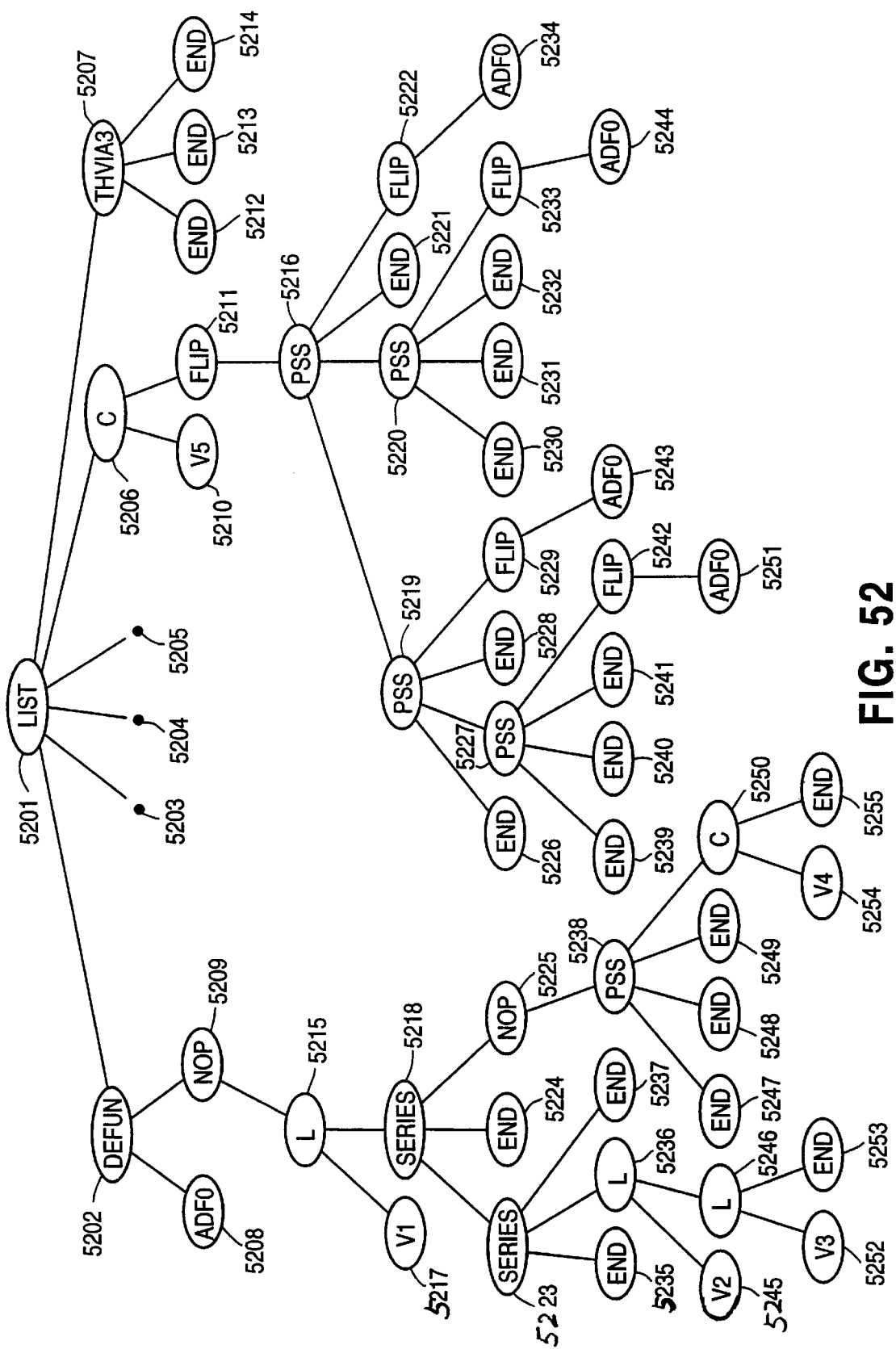
FIG. 52 illustrates the best-of-run individual from generation 35.

FIG. 52 presents the best-of-run individual from generation 35 as a rooted, point-labeled tree with ordered branches.

The first result-producing branch, RPB0, is rooted at the C function 5206 and the second result-producing branch, RPB0, is rooted at the THVIA3 function 5207. The first automatically defined function, ADF0, is rooted at the DEFUN 5202. ADF0 is the only function-defining branch that is actually referenced by either result-producing branch. The three unreferenced function-defining branches, ADF1, ADF2, and ADF3, are abbreviated by the filled circles labeled 5203, 5205. The arithmetic-performing subtrees are not shown, but, instead, are abbreviated as V1 5217, V2 5245, V3 5252, V4 5254, and V5 5210.

Detailed Analysis of Result-Producing Branches

Figure 53:
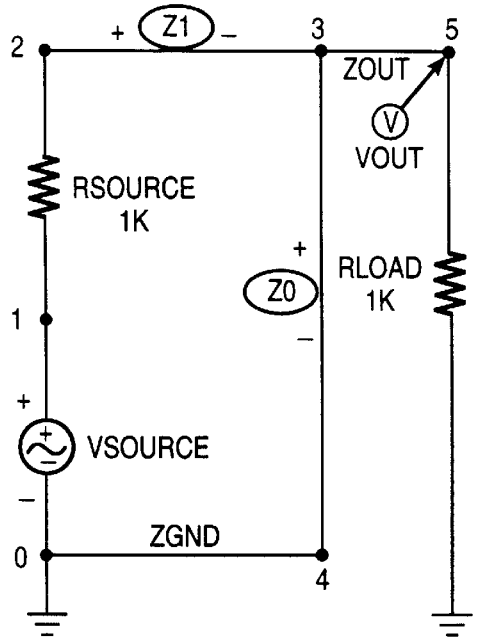
FIG. 53 illustrates one-input, one-output embryonic circuit.

FIG. 53 shows the one-input, one-output embryonic circuit used for this problem. The following traces the development of this best-of-run individual from generation 35 from the embryonic circuit.

Figure 54:
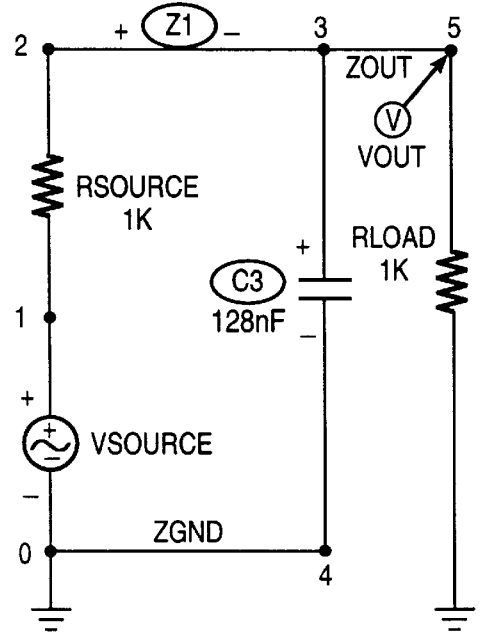
FIG. 54 illustrates the result of executing the C function.

The C function 5206 in FIG. 52 and underlined in the program fragment (below) at the root of the first result-producing branch RPB0 converts modifiable wire Z0 into capacitor C3. The 11-point arithmetic-performing subtree rooted at the +function (abbreviated as V5 5210 in FIG. 52 and underlined in the program fragment below) is immediately executed in its entirety in a depth-first way when the C function 5206 is executed. FIG. 54 shows the result of executing this C function 5206. This subtree returns a value that, when interpreted, causes the value of 128 nF to be assigned to capacitor C3. The writing head now points to capacitor C3.

(C (+(−0.166 −0.376)(+(−0.910 −0.0366)(− −0.297 −0.917))) (flip (pss (pss end (pss end end end (flip (adf0))) end (flip (adf0))) (pss end end end (flip (adf0))) end (flip (adf0)))))

Figure 55:
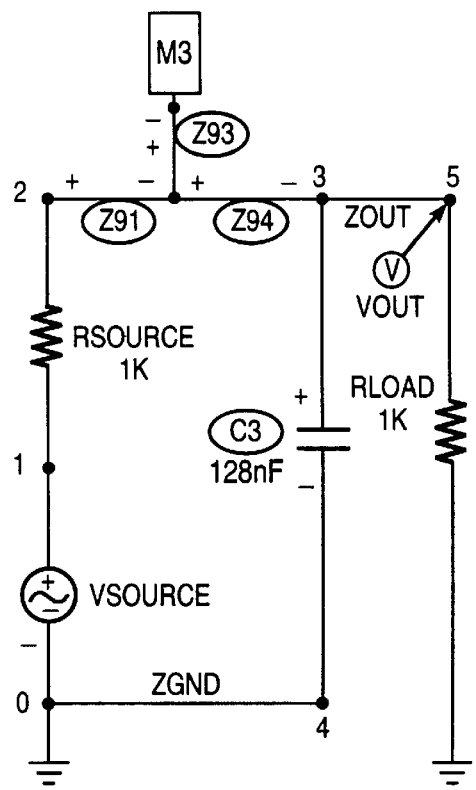
FIG. 55 illustrates the result of executing the THVIA function.

The breadth-first execution of the program tree next causes the execution of the THVIA3 function in RPB1 (5207 in FIG. 52). This THVIA3 function converts wire Z1 into one port to layer 3 and three new modifiable wires, Z91, Z92, and Z93. Each of the three wires has a writing head. FIG. 55 shows the result of executing this THVIA function (labeled 7).

Figure 56:
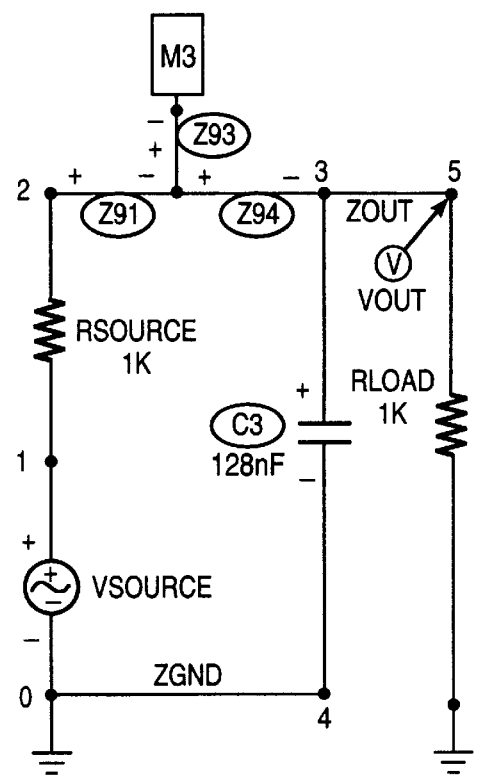
FIG. 56 illustrates the result of executing the FLIP function.

Since V5 5210 represents an arithmetic-performing subtree that was immediately executed in its entirety in a depth-first way at the time that the C function 5206 was executed, the breadth-first execution of the program tree next causes the execution of the FLIP function in RPB1 (5211 in FIG. 52 and underlined below). The FLIP function flips the polarity of capacitor C3 and the writing head continues to point to capacitor C3. FIG. 56 shows the change of polarity of capacitor C3 resulting from the execution of this FLIP function.

(C (+(−0.166 −0.376)(+(−0.910 −0.0366)(− −0.297 −0.917))) <u>flip</u> (pss (pss end (pss end end end (flip (adf0))) end (flip (adf0))) (pss end end end (flip (adf0))) end (flip (adf0)))))

Figure 57:
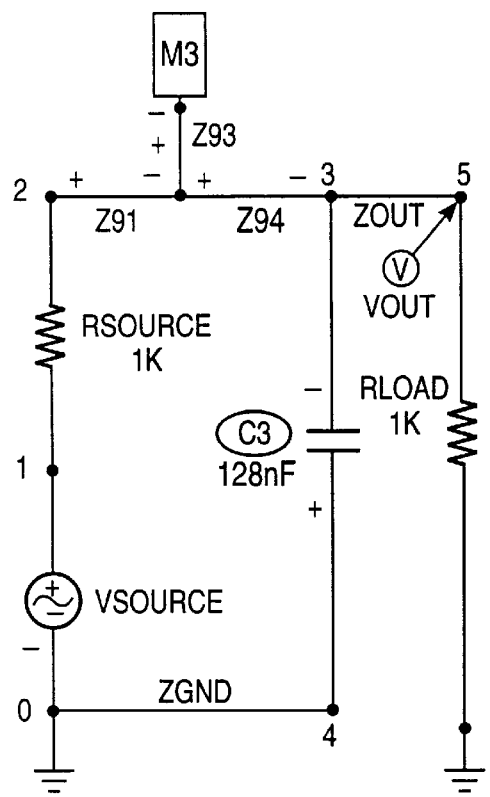
FIG. 57 illustrates the result of executing the three END functions.

The breadth-first execution of the program tree next causes the execution of the three END functions in RPB1 (5212–5214 in FIG. 52). These three END functions eliminate all three writing heads spawned by the THVIA3 function 5207. FIG. 57 shows the result of executing the three END functions 5212–5214.

The first PSS function in RPB0 (5216 in FIG. 52 and underlined below) is then executed.

(C (+(−0.166 −0.376)(+(−0.910 −0.0366)(− −0.297 −0.917))) (flip <u>pss</u> (pss end (pss end end end (flip (adf0))) end (flip (adf0))) (pss end end end (flip (adf0))) end (flip (adf0)))))

Figure 58:
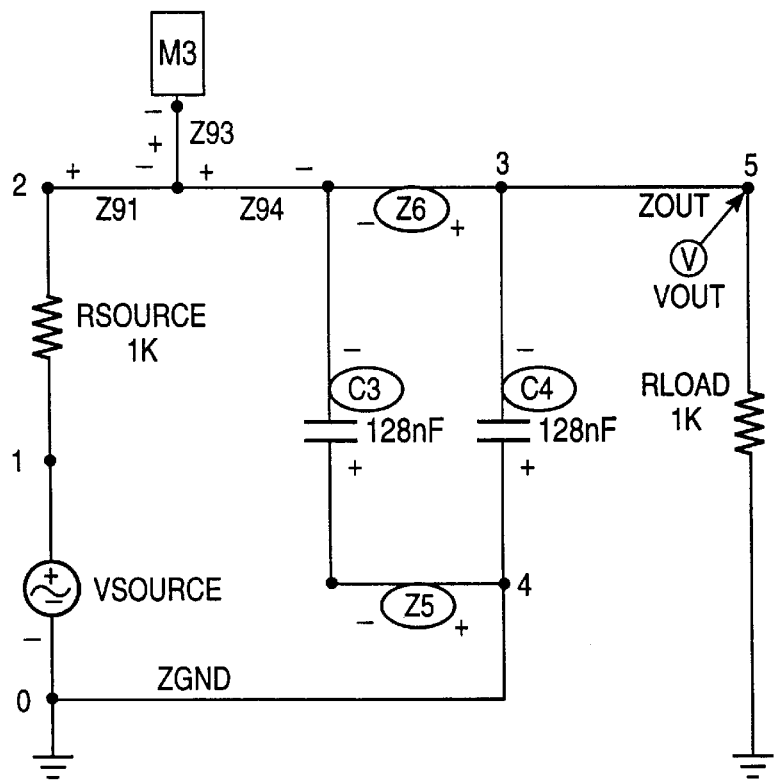
FIG. 58 illustrates the result of executing the PSS function.

This PSS function operates on capacitor C3 and parallelizes it by creating a duplicate capacitor C4 and by creating new modifiable wires Z5 and Z6. This PSS function spawns four writing heads. Note that the PSS function establishes the polarity of both Z5 and Z6. This polarity matters when Z6 is later converted into components. FIG. 58 shows the result of executing the PSS function 5216.

The next PSS function in RPB0 (5219 in FIG. 52 and underlined below) then parallelizes capacitor C3 a second time and creates new capacitor C7 and modifiable wires Z8 and Z9.

(C (+(−0.166 −0.376)(+(−0.910 −0.0366) (− −0.297 −0.917))) (flip (pss (<u>pss</u> end (pss end end end (flip (adf0))) end (flip (adf0))) (pss end end end (flip (adf0))) end (flip (adf0)))))

Figure 59:
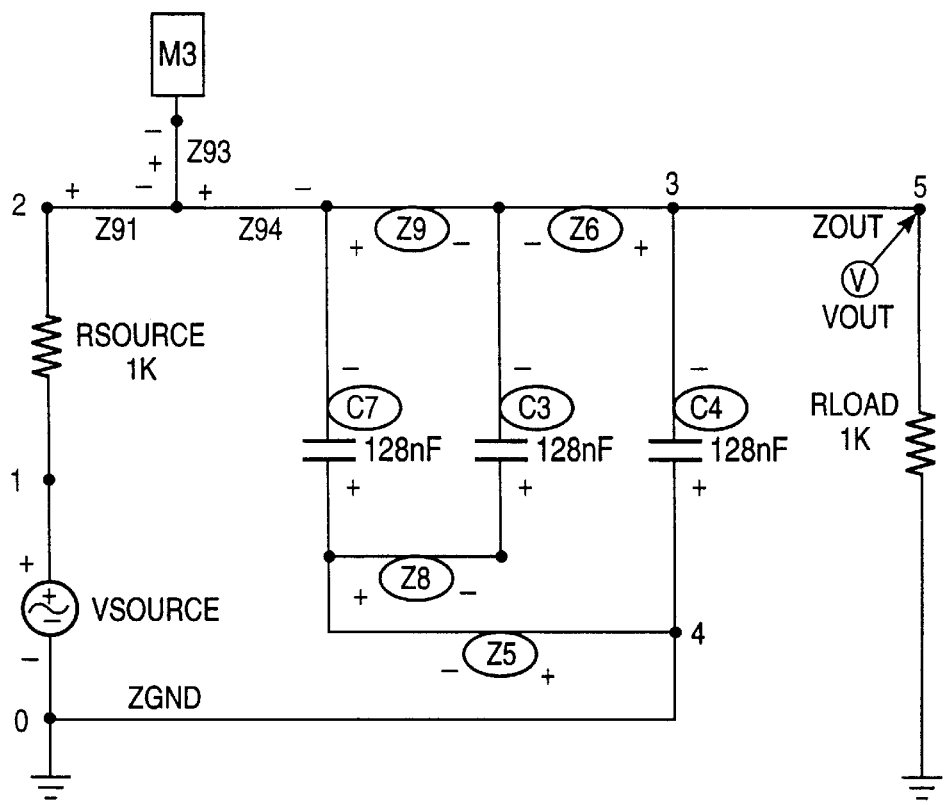
FIG. 59 illustrates the result of executing the PSS function.

This PSS function spawns four writing heads. FIG. 59 shows the result of executing this PSS function 5219.

The breadth-first execution of the program tree next causes the execution of the PSS function in RPB0 (5220 in FIG. 52 and underlined below).

(C (+(−0.166 −0.376)(+(−0.910 −0.0366)(− −0.297 −0.917))) (flip (pss (pss end (pss end end end (flip (adf0))) end (flip (adf0))) <u>pss</u> end end end (flip (adf0))) end (flip (adf0)))))

Figure 60:
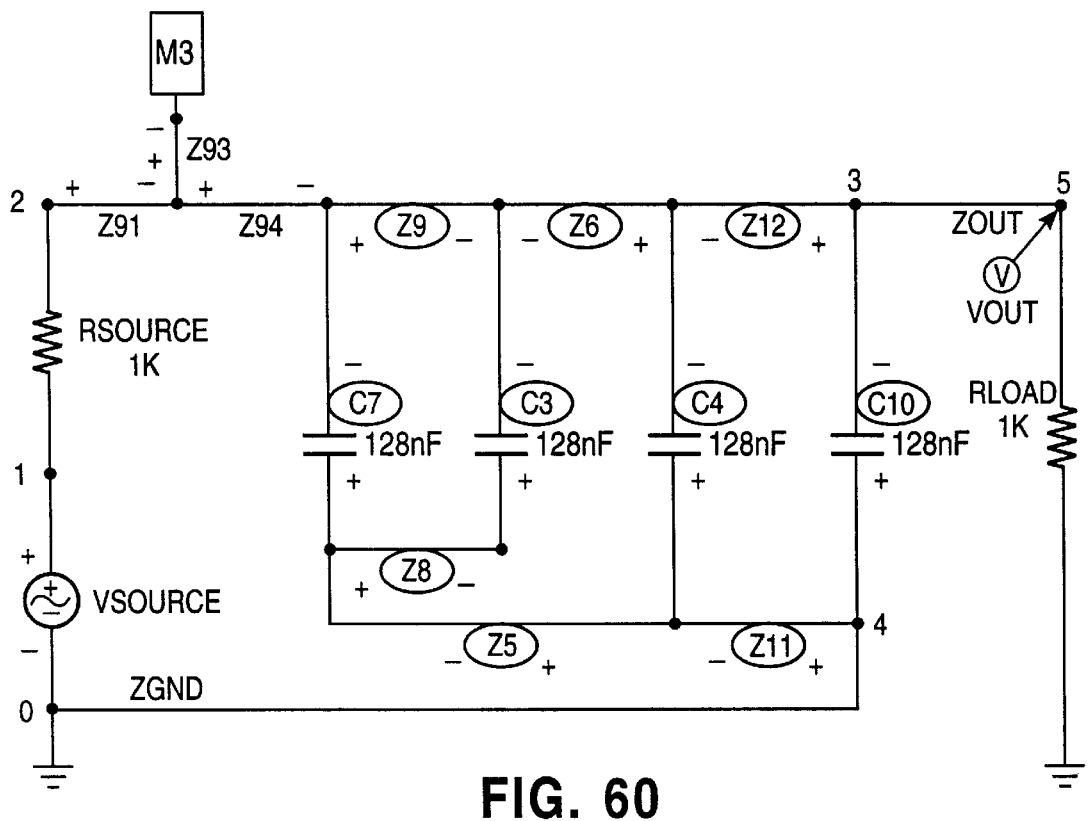
FIG. 60 illustrates the result of executing the PSS function.

This PSS function parallelizes capacitor C4 (i.e., the component to which the second writing head spawned by the PSS labeled 16 is pointing). This PSS function creates new capacitor C10 and modifiable wires Z11 and Z12. This PSS function spawns four writing heads. FIG. 60 shows the result of executing this PSS function 5220.

The breadth-first execution of the program tree next causes the execution of the END function (5221 in FIG. 52). This eliminates the writing head on Z5 created by the PSS function 5216.

The breadth-first execution of the program tree next causes the execution of the FLIP function (5222 in FIG. 52 and underlined below) operating on wire Z6. The execution of this FLIP function completes the execution of the functions that are located at the fourth level in the program tree below the topmost LIST function.

On the fifth level, the END function (5226 in FIG. 52 and underlined below) is executed, thereby eliminating a writing head on C3. Then, the PSS function (5227 in FIG. 52 and underlined below) is executed causing capacitor C7 (i.e., the component to which the second writing head spawned by the PSS 5219 is pointing) to be parallelized. This PSS function creates new capacitor C13 and modifiable wires Z14 and Z15. This PSS function (5227), in turn, spawns four additional writing heads.

(C (+(−0.166 −0.376)(+(−0.910 −0.0366)(− −0.297 −0.917))) (flip (pss (pss <u>end</u> (<u>pss</u> end end end (flip (adf0))) end (flip (adf0))) (pss end end end (flip (adf0))) end (<u>flip</u> (adf0)))))

Figure 61:
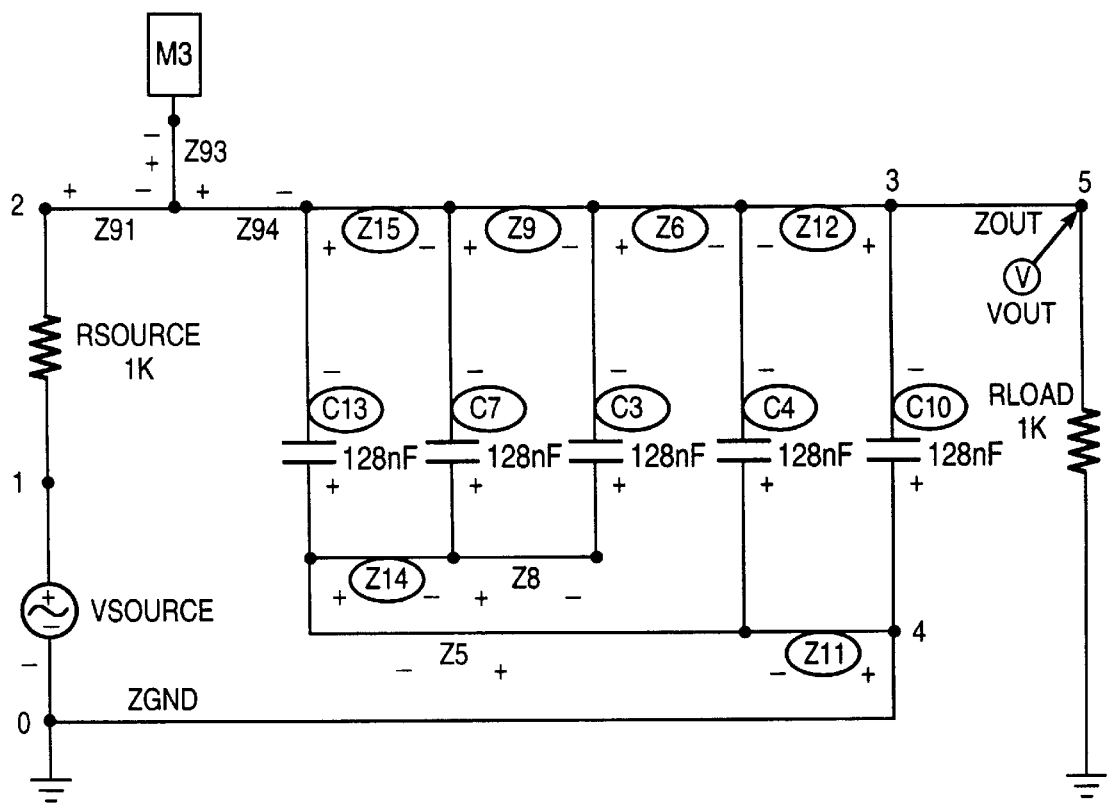
FIG. 61 illustrates a result of executing the FLIP function, the END function and the PSS function.

FIG. 61 shows the result of executing the FLIP function (5222), the END function (5226), and PSS function (5227).

At this point, the remainder of the program tree of FIG. 52 consists only of END functions (at 5228, 5230, 5231, and 5232) and four occurrences of the two-point composition (flip (adf0)).

These four occurrences are located at the pairs of points 5222 and 5234, (already discussed) 5229 and 5243, 5233 and 5244, and 5229 and 5243.

The END functions at 5228, 5230, 5231, and 5232 eliminate the writing heads at Z8, C4, C10, and Z11.

Detailed Analysis of ADF0

The following discussion focuses on the particular (flip (adf0)) that is located at the pairs of points 5222 and 5234 in FIG. 52 (underlined below).

(C (+(−0.166 −0.376)(+(−0.910 −0.0366)(− −0.297 −0.917))) (flip (pss (pss end (pss end end end (flip (adf0))) end (flip (adf0))) (pss end end end (flip (adf0)))
end (flip (adf0)))

Figure 62:
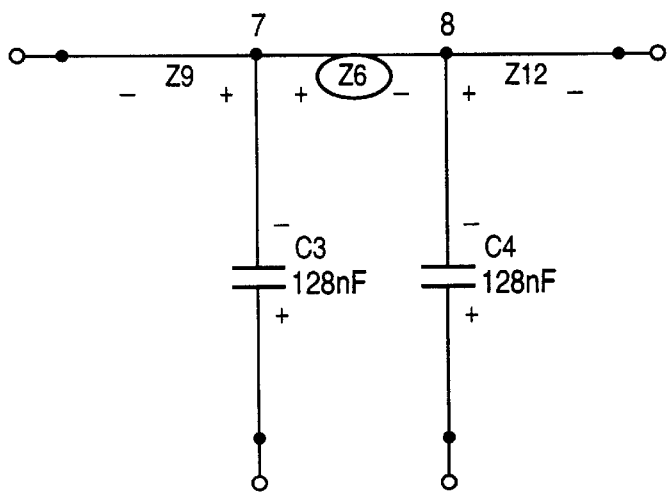
FIG. 62 illustrates a cutaway portion of developing circuit where an ADF is about to be applied.

As already mentioned, the FLIP 5222 was executed on the fourth level of the program tree and ADF0 5234 remains to be executed on the fifth level. FIG. 62 shows a cutaway portion of FIG. 61 with the writing head pointing to modifiable wire Z6.

The first function-defining branch of the overall program tree defines automatically defined function ADF0 and is shown in FIG. 52 starting at the DEFUN 5202. The work-performing body of ADF0 begins with the NOP function 5209. ADF0 is as follows:

(nop (L (+0.504 (−(+(+(+0.0830 0.406)(− −0.243 0.658))
(−(−(+(+0.809 0.407) (−0.893 −0.113))−0.212)(−(+(−
−0.506−0.0313)(− −0.243 0.658))(−(−0.556 0.0370)−
0.946))))−0.000741)) (series (series end (L −0.000741
(L 0.0609 end)) end) end (nop (pss end end end (C
−0.949 end))))))

Figure 63:
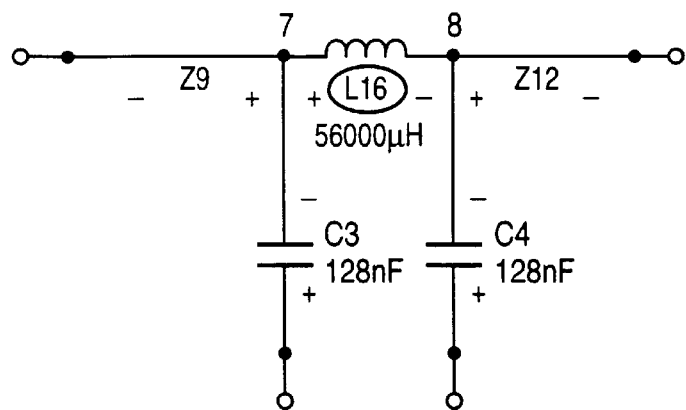
FIG. 63 illustrates the result of executing the NOP function and the L function in an ADF.

After the initial NOP function (5209 in FIG. 52) is executed, the inductor-to creating function L (5215 in FIG. 52 and underlined above) converts modifiable wire Z6 into inductor L16. The 34-point arithmetic-performing subtree (underlined above) assigns a value of 56,000 micro-Henrys to new inductor L16. This 34-point subtree is abbreviated in FIG. 52 as value V1 5217. FIG. 63 shows the result of executing the NOP and L functions in ADF0 (at 5234 of FIG. 52).

The developmental process then encounters the first SERIES function in ADF0 (5218 in FIG. 52 and underlined below).

(nop (L (+0.504 (−(+(+(+0.0830 0.406)(− −0.243 0.658))
(−(−(+(+8.086497e−01 0.407) (−0.893 −0.113))−
0.212)(−(+(− −0.506 −0.0313)(− −0.243 0.658))(−(−
0.556 0.0370)−0.946))))−0.000741)) (<u>series</u> (series end
(L −0.000741 (L 0.0609 end)) end) end (nop (pss end
end end (C −0.949 end))))))

Figure 64:
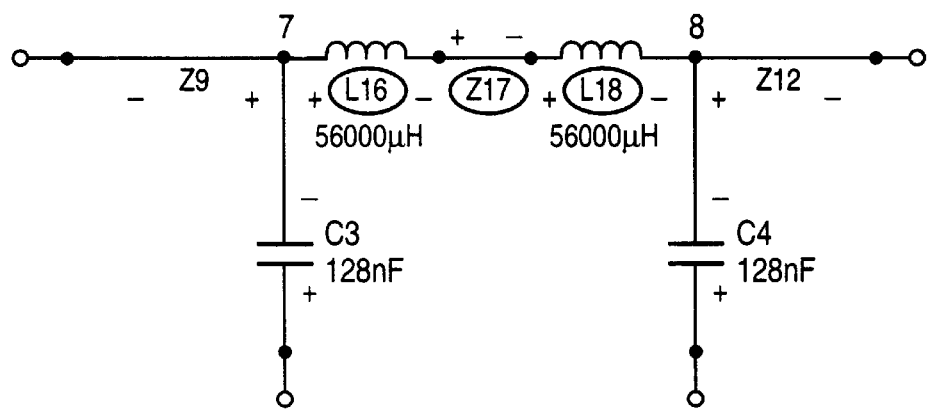
FIG. 64 illustrates the result of executing the first SERIES function in an ADF.

This SERIES function 5218 creates a series composition consisting of the original inductor L16, a new modifiable wire Z17, and a duplicate 56,000 micro-Henrys inductor L18. This SERIES function spawns three writing heads. FIG. 64 shows the result of executing the first SERIES function 5218 in ADF0.

Control then passes to the second SERIES function in ADF0 (5223 in FIG. 52 and underlined below). This SERIES function is applied to inductor L16.

(nop (L (+0.504 (−(+(+(+0.0830 0.406)(− −0.243 0.658))
(−(−(+(+8.086497e−01 0.407) (−0.893 −0.113))−
0.212)(−(+(− −0.506 −0.0313)(− −0.243 0.658))(−(−
0.556 0.0370)−0.946))))−0.000741)) (series (<u>series</u> end
(L −0.000741 (L 0.0609 end)) end) end (nop (pss end
end end (C −0.949 end))))))

Figure 65:
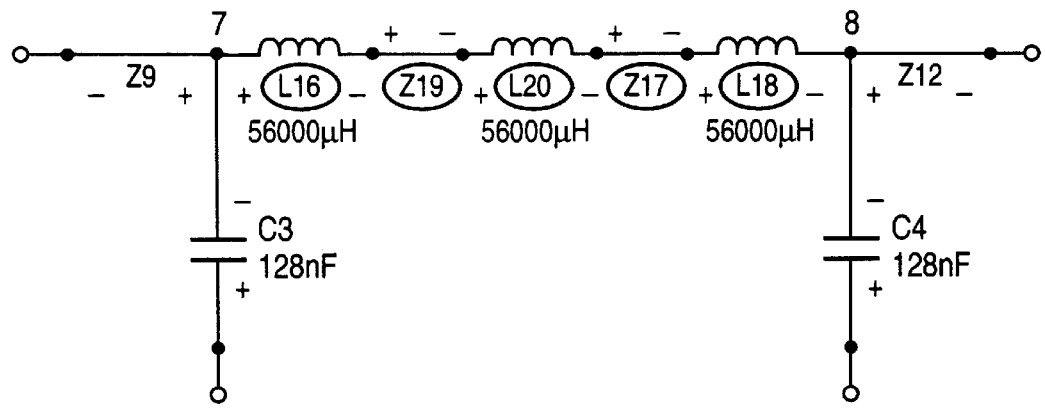
FIG. 65 illustrates the result of executing the second SERIES function in an ADF.

This second SERIES function 5223 creates a series composition consisting of inductor L16 (i.e., the component to which the first writing head spawned by the first SERIES 5218 is pointing), a new modifiable wire Z19, and another duplicate 56,000 micro-Henrys inductor L20. This SERIES function also spawns three writing heads. FIG. 65 shows the result of executing the second SERIES function 5223 in ADF0.

The breadth-first execution of the program tree next causes the execution of the END function (5224 in FIG. 52) thereby eliminating the writing head on Z17 created by the first SERIES function 5218. Then, the NOP function 5225 is executed. As it happens, the four executions of ADF0 do not interact in this particular program, so the NOP function does not influence the electrical circuit that is ultimately developed.

Control then passes to the END function (5235 in FIG. 52) which eliminates the writing head on L16.

Development then proceeds to the L function (5236 in FIG. 52 and underlined below) in ADF0.

(nop (L (+0.504 (−(+(+(+0.0830 0.406)(− −0.243 0.658))
(−(−(+(+8.086497e−01 0.407) (−0.893 −0.113))−
0.212)(−(+(− −0.506 −0.0313)(− −0.243 0.658))(−(−
0.556 0.0370)−0.946))))−0.000741)) (series (series end
(<u>L −0.000741</u> (L 0.0609 end)) end) end (nop (pss end
end end (C −0.949 end))))))

Figure 66:
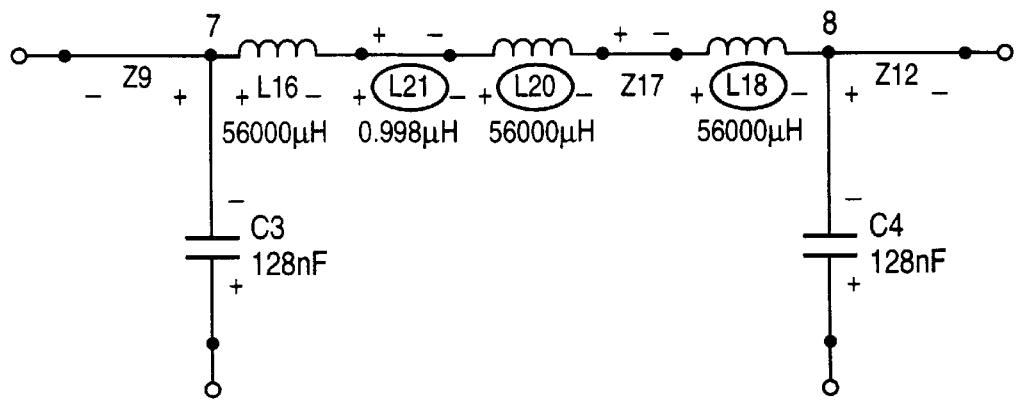
FIG. 66 illustrates the result of executing the L function in an ADF.

This component-creating function operates on Z19 and converts it into inductor L21. The small numerical value −0.000741 (underlined below and abbreviated as V2 at point 45 of FIG. 66) causes the value of inductor L21 to be set to 0.998 micro-Henrys. FIG. 66 shows the result of executing the L function 5236 in ADF0.

Control then passes to the END function (5237 in FIG. 52) that eliminates the writing head on L20. Then, control passes to the PSS parallel division function 5238. The discussion of this PSS function is briefly deferred to complete the discussion on inductor L21. The L function in ADF0 (5246 in FIG. 52 and underlined below) converts it into a differently valued inductor.

nop (L (+0.504 (−(+(+(+0.0830 0.406)(− −0.243 0.658))
(−(−(+(+8.086497e−01 0.407) (−0.893 −0.113))−
0.212)(−(+(− −0.506 −0.0313)(− −0.243 0.658))(−(−
0.556 0.0370)−0.946))))−0.000741)) (series (series end
(L −0.000741 (L 0.0609 end)) end) end (nop (pss end
end end (C −0.949 end))))))

Figure 67:
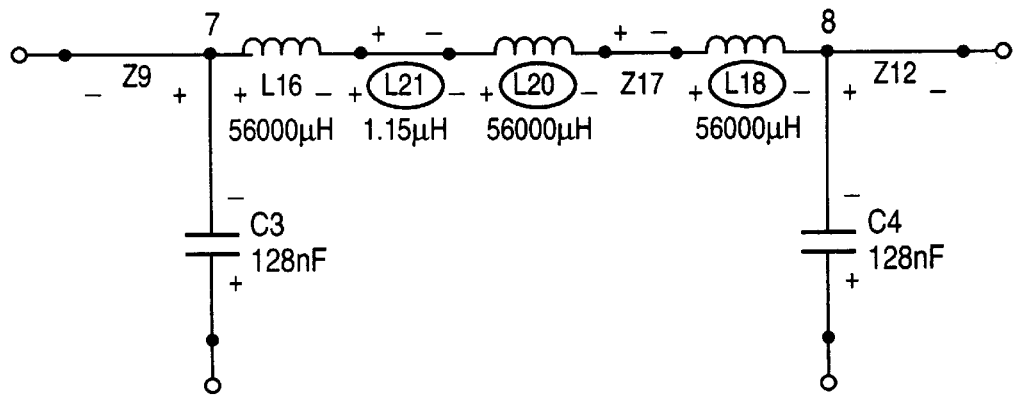
FIG. 67 illustrates the result of executing the L function in an ADF.

Specifically, the numerical value 0.0609 (underlined below and abbreviated as V3 at 5252 of FIG. 52) revalues L21 to 1.15 micro-Henrys. FIG. 67 shows the result of executing the L function 5246 in ADF0.

Returning to the PSS parallel division function 5238 and underlined below, it operates on L18 and creates a parallel composition consisting of new inductor L22, two new wires Z23 and Z24, and L18. This PSS function spawns four writing heads.

(nop (L (+0.504 (−(+(+(+0.0830 0.406)(− −0.243 0.658))
(−(−(+(+8.086497e−01 0.407)(−0.893 −0.113))−0.212)
(−(+(− −0.506 −0.0313)(− −0.243 0.658))(−(−0.556
0.0370)−0.946))))−0.000741)) (series (series end (L
−0.000741 (L 0.0609 end)) end) end (nop k end end end
(C −0.949 end))))))

Figure 68:
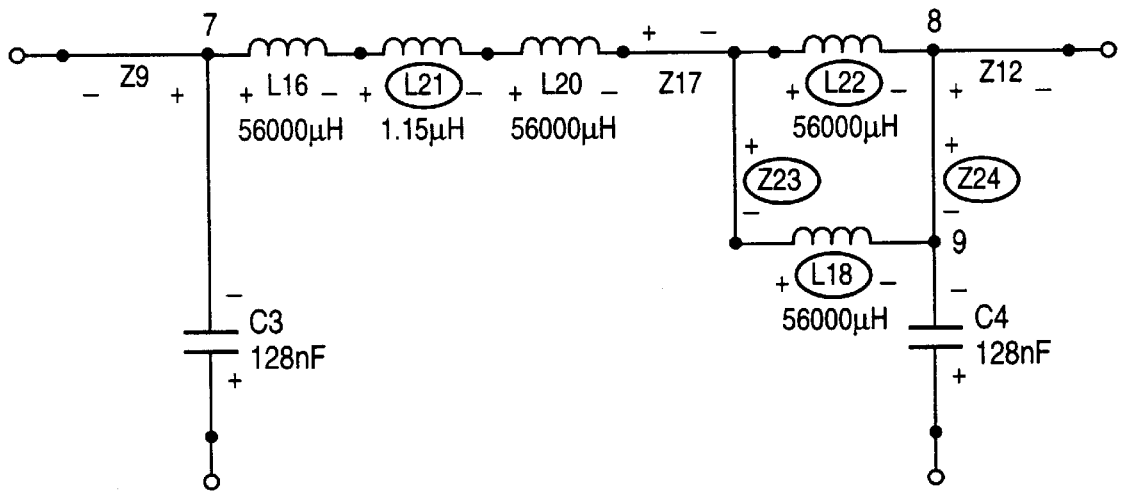
FIG. 68 illustrates the result of executing the PSS function in an ADF.

FIG. 68 shows the result of executing the PSS function 5238 in ADF0. Three of these writing heads spawned by the PSS function 5238 are quickly terminated by END functions (at 5247, 5248, and 5249), so attention is focused on the C function (5250 and underlined below).

(nop (L (+0.504 (−(+(+(+0.0830 0.406)(− −0.243 0.658))
(−(−(+(+8.086497e−01 0.407)(−0.893 −0.113))−0.212)
(−(+(− −0.506 −0.0313)(− −0.243 0.658))(−(−0.556
0.0370)−0.946))))−0.000741)) (series (series end (L
−0.000741 (L 0.0609 end)) end) end (nop (pss end end
end (C −0.949 end))))))

Figure 69:
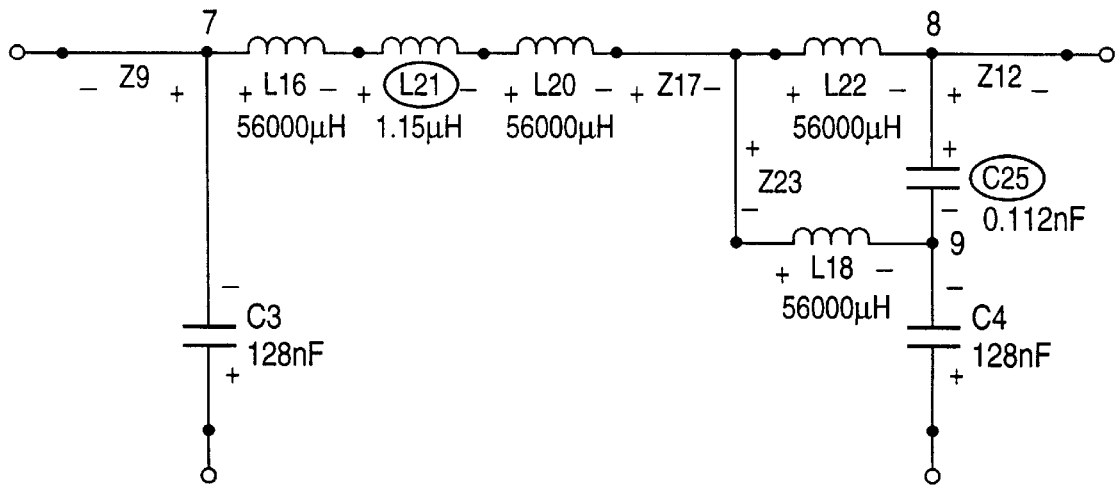
FIG. 69 illustrates the result of executing the C function in an ADF.

This C function operates on modifiable wire Z24 and converts it into capacitor C25. The small numerical value −0.949 abbreviated as V4 at 5454 of FIG. 52) causes capacitor C25 to acquire the component value of 0.112 nF. FIG. 69 shows the result of executing the three END functions 5247–5249 and the C function 5250 in ADF0.

Note that L16, L21, L20, Z17, L22, Z23, L18, and C25 were all created from modifiable wire Z6 by ADF0.

Note also that even though Z6 was a mere wire with two ends (at nodes 7 and 8 of FIG. 62), the result of executing ADF0 is a substructure with three ports (at nodes 6907, 6908, and 6909 of FIG. 69). Note that the word "substructure" is used here because the more commonly used word, "subcircuit," has a specialized meaning in SPICE.

These three ports arise as a consequence of the execution of the PSS function 5238 followed by the execution of C function 5250 which causes nodes 6908 and 6909 of FIG. 69 to become separated by an intervening component (i.e., capacitor C25).

The END functions 5253 and 5255 eliminate the writing heads on L21 and C25.

FIG. 49 shows the three-port substructure created by ADF0.

Figure 70:
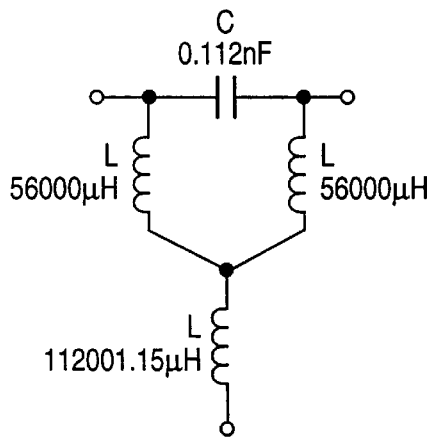
FIG. 70 is a three-port substructure created by an ADF.

FIG. 70 presents this same three-port substructure created by ADF0 in a different orientation as a triangular substructure.

Figure 71:
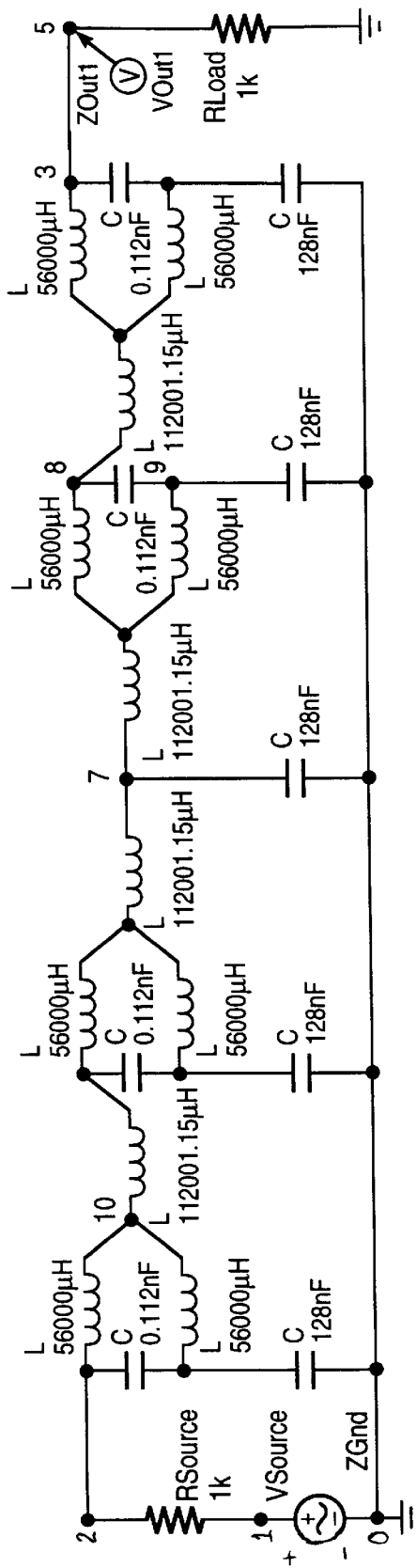
FIG. 71 is different presentation of the best-of-run circuit from generation 35.

FIG. 71 presents the best-of-generation circuit from generation 35 (presented earlier as FIG. 62) using the triangular three-port substructure created by ADF0.

Designing a Lowpass LC Filter Using Architecture-Altering Operations

In this section, the goal is to use automatically defined functions and the architecture-altering operations while designing a lowpass filter that satisfies the previously discussed design characteristics. That is, the architectural arrangement of the automatically defined functions will not be specified in advance by the user, but, instead, will be dynamically evolved during the run using the architecture-altering operations.

U.S. patent application Ser. No. 08/286,134, entitled "Simultaneous Evolution Of The Architecture Of A Multi-Part Program To Solve A Problem Using Architecture Altering Operations", filed Aug. 4, 1994, describes a method for evolving the architecture of an overall program dynamically during a run of genetic programming using six architecture-altering operations, namely branch duplication, argument duplication, branch deletion, argument deletion, branch creation, and argument creation. See also Koza (1994b). These six architecture-altering operations are as follows:

(i) Branch duplication: Create one new offspring program for the new population by duplicating one function-defining branch of one existing program and making additional appropriate changes to reflect this change.

(ii) Argument duplication: Create one new offspring program for the new population by duplicating one argument of one function-defining branch of one existing program and making additional appropriate changes to reflect this change.

(iii) Branch deletion: Create one new offspring program for the new population by deleting one function-defining branch of one existing program and making additional appropriate changes to reflect this change.

(iv) Argument deletion: Create one new offspring program for the new population by deleting one argument of one function-defining branch of one existing program and making additional appropriate changes to reflect this change.

(v) Branch creation: Create one new offspring program for the new population by adding one new function-defining branch containing a portion of an existing branch and creating a reference to that new branch.

(vi) Argument creation: Create one new offspring program for the population by adding one new argument to the argument list of an existing function-defining branch and appropriately modifying references to that branch.

These six architecture-altering operations provide an automated way to enable genetic programming to dynamically determine, during the run, whether to employ function-defining branches, how many function-defining branches to employ, and the number of arguments possessed by each function-defining branch. The architecture-altering operations and automatically defined functions together provide an automated way to change the representation of a problem while solving the problem. Alternately, they can also be viewed as an automated way to decompose a problem into a non-pre-specified number of subproblems of non-pre-specified dimensionality, solve the subproblems, and assemble the solutions of the subproblems into a solution of the overall problem.

Preparatory Steps for the Lowpass LC Filter Using Architecture-Altering Operations The Embryonic Circuit The embryonic circuit in FIG. 4 for a one-input, one-output circuit with two writing heads is suitable for this problem.

Program Architecture

Since the embryonic circuit initially has two writing heads—one associated with each of the result-producing branches—there are two result-producing branches (called RPB0 and RPB1) in each program tree.

The number of automatically defined functions, if any, will be determined by the evolutionary process using the architecture-altering operations.

Each program in the initial population of programs has a uniform architecture with no automatically defined functions (i.e., two result-producing branches).

Function and Terminal Sets

The functions are divided into four categories for this problem:

(1) connection-creating functions that create the topology of circuit from the embryonic circuit, (2) component-creating functions that convert wires (and other components) within the circuit into specified components, (3) arithmetic-performing functions and numerical terminals that together specify the numerical value (sizing) for each component of the circuit, and (4) automatically defined functions (subroutines) whose number, if any, is determined by the architecture-altering operations.

The terminal and function set is the same as in the earlier example of a run involving automatically defined functions, except that the existence of automatically defined functions is determined by the architecture-altering operations.

Fitness Measure

The fitness measure is the same as in the previously discussed LC lowpass filter design problem.

Parameters

The control parameters were the same as used previously, except for the following differences:

(1) The architecture-altering operations are intended to be used sparingly on each generation. The percentage of operations on each generation after generation 5 was 86.5% crossovers; 10% reproductions; 1% mutations; 1% branch duplications; 0% argument duplications; 0.5% branch deletions; 0.0% argument deletions; 1% branch creations; and 0% argument creations. In order to avoid wasting large amounts of computer time in early generations where only a few programs have any automatically functions at all, the percentage of operations on each generation before generation 6 was 78.0% crossovers; 10% reproductions; 1% mutations; 5.0% branch duplications; 0% argument duplications; 1% branch deletions; 0.0% argument deletions; 5.0% branch creations; and 0% argument creations.

(2) The maximum size for each of the two result-producing branches in each overall program (and any automatically defined functions) is 300 points.

(3) The maximum number of automatically defined functions is 4.
(4) The number of arguments for each automatically defined function is zero.
(5) In randomly choosing functions during the creation of the initial random population, the C, L, SERIES, PSS, FLIP, NOP, each THGND functions were each assigned a relative weight of 8, while each of the eight THVIA functions, and the CUT function were assigned a relative weight of 1.

Ternination Criterion and Results Designation

The termination criterion and method of results designation are the same as used previously.

Results for the Lowpass LC Filter Using Architecture-Altering Operations

The best-of-run individual program from generation 77 scores 101 hits (out of 101) and has a fitness of 0.000765. The program tree has 87 points in its RPB0 and 2 points in its RPB1 and has 65, 66, 94, and 9 points in ADF0, ADF1, ADF2, and ADF3, respectively.

Figure 72:
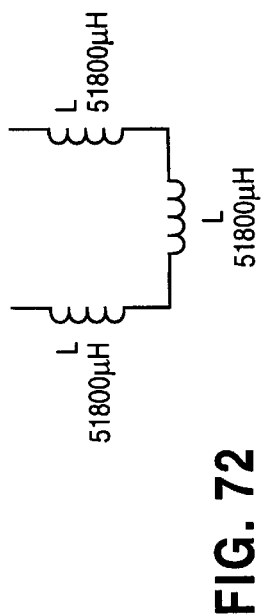
FIG. 72 illustrates the automatically defined function ADF0 of best-of-run circuit from generation 77.

ADF0 and ADF1 illustrate a common use for automatically defined functions, namely that of defining a particular substructure and reusing it multiple times. ADF0 is invoked six times and ADF1 is invoked three times. FIG. 72 shows this ADF0. The substructure in ADF0 consists of a series composition of three inductors (and is electrically equivalent to one inductor). The six invocations of ADF0 permit this value to be defined once and then reused on multiple occasions.

ADF1 consists of one 28,600 micro-Henrys inductor. The three invocations of ADF1 permit this inductor to be created once and then reused. ADF2 consists only of one 37,300 micro-Henrys inductor and is invoked only once. ADF3 is invoked once. ADF3 consists only of connection-creating functions and does not cause the creation of any components, as shown below:

(pss end(series end end(flip end))end end)

Figure 73:
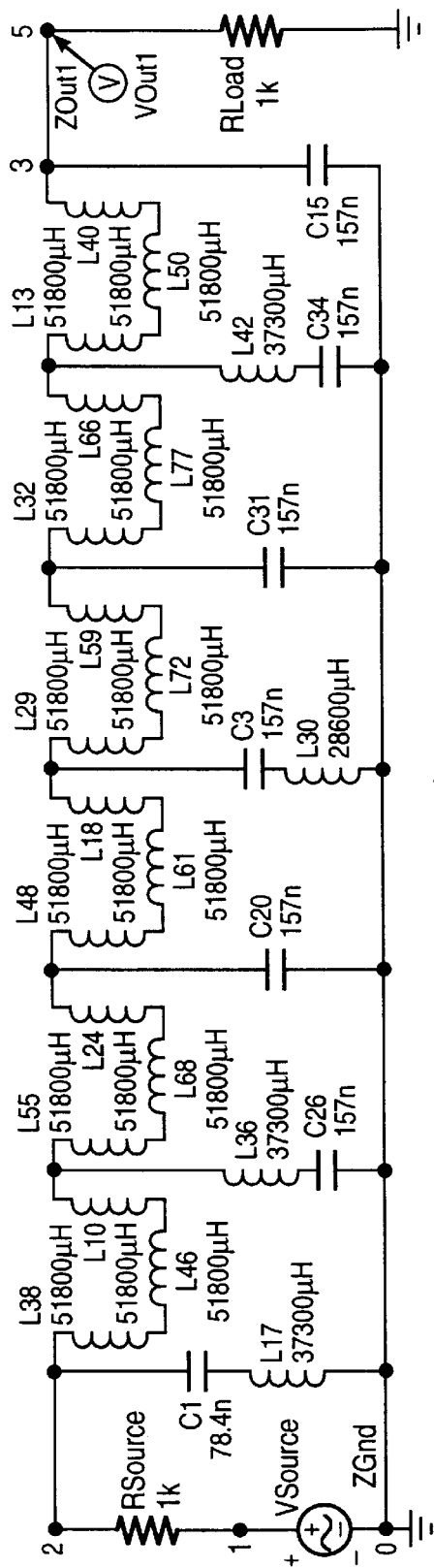
FIG. 73 illustrates the best-of-run circuit from generation 77.

FIG. 73 shows the best-of-run circuit from generation 77.

Multi-Objective Fitness Measures

The evolutionary process is driven by the fitness measure. In the foregoing discussion, fitness was measured in terms of a single factor—namely the weighted sum of the deviations between the desired behavior of the circuit (in the chosen frequency domain for the filter being designed) and the actual behavior of the circuit. The user-supplied fitness measure may incorporate any calculable characteristic or combination of characteristics of the circuit, including the circuit's power consumption, the number of its components, cost of its components, surface area occupied by its components, the circuit's behavior in the time domain, or its behavior in the frequency domain.

It is frequently desirable to incorporate multiple factors into the fitness measure of a run. In this section, the previously described illustrative lowpass filter design problem is revisited with a multiobjective fitness measure.

The primary factor in the fitness measure is compliance with the design requirements of the problem (as previously described). The secondary factor promotes a solution with a parsimonious design (given a particular assignment of costs). Specifically, the fitness of a circuit is 10.0 plus the same weighted sum that was used previously, over 101 sample points in the frequency domain, of the deviations of the actual voltage and desired voltage for every circuit that scores less than 101 hits (i.e., 101 compliant sample points). However, for circuits scoring a full 101 hits, fitness is 0.01 times the number of capacitors plus 0.02 times the number of inductors. That is, this multiobjective fitness incorporates the parsimony of the circuit into the fitness measure as a secondary factor. Parsimony is computed in such as way as to make inductors twice as costly as capacitors. This secondary factor is always considerably less than 10.0 (given the maximum number of points permitted in the program trees in these runs), so the fitness of any circuit with 101 compliant points is always better (less) than the fitness of the very best circuit with 100 or fewer compliant points. Among circuits with 101 compliant points, a circuit will be considered better if it is more parsimonious. This multiobjective fitness measure is lexical in the sense that compliance with the design requirements completely dominates parsimony until 100% compliance is achieved; thereafter, fitness is based on parsimony.

In one run, the first individual scoring 101 hits emerged in generation 37.

Figure 74:
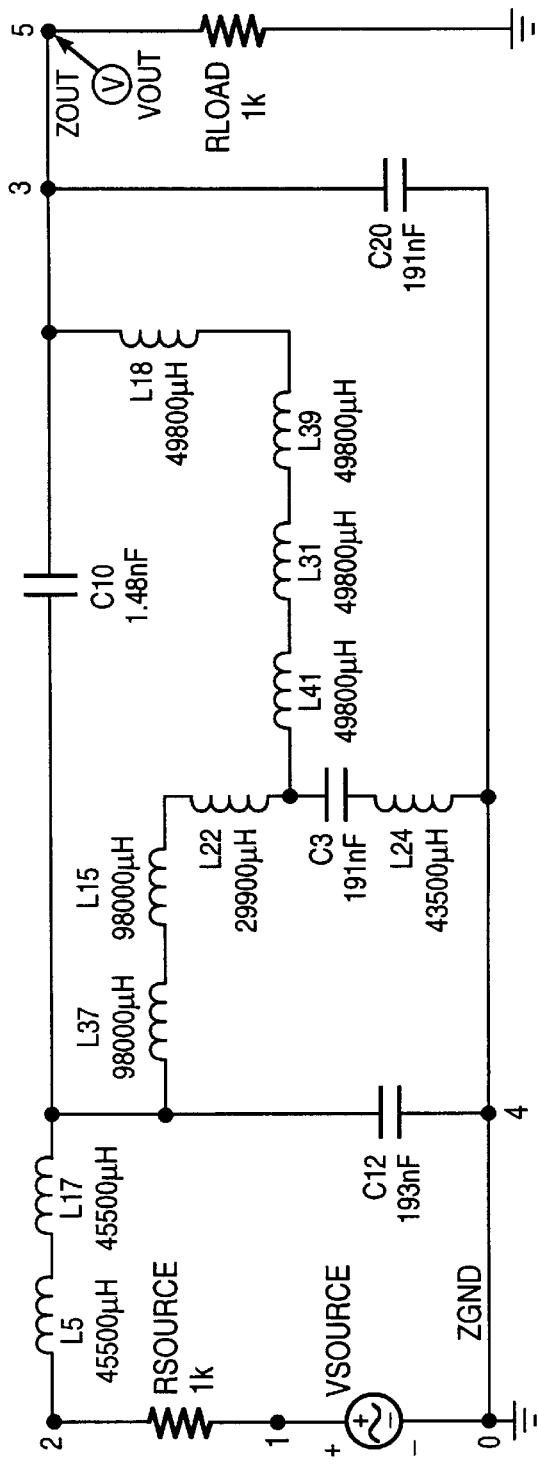
FIG. 74 illustrates the best-of-generation circuit from generation 37.

FIG. 74 shows that the 100% compliant circuit from generation 37 has 14 evolved components (10 inductors and 4 capacitors) for a cost of 0.024. After generation 37, numerous other circuit-constructing program trees scoring 101 hits were produced by the run. All programs scoring 101 hits had better fitness than any program scoring 100 or fewer hits. However, among programs scoring 101 hits, the more parsimonious programs had better fitness. Thus, in later generations of the run, such as generation 52, a more parsimonious individual scoring 101 hits emerged.

Figure 75:
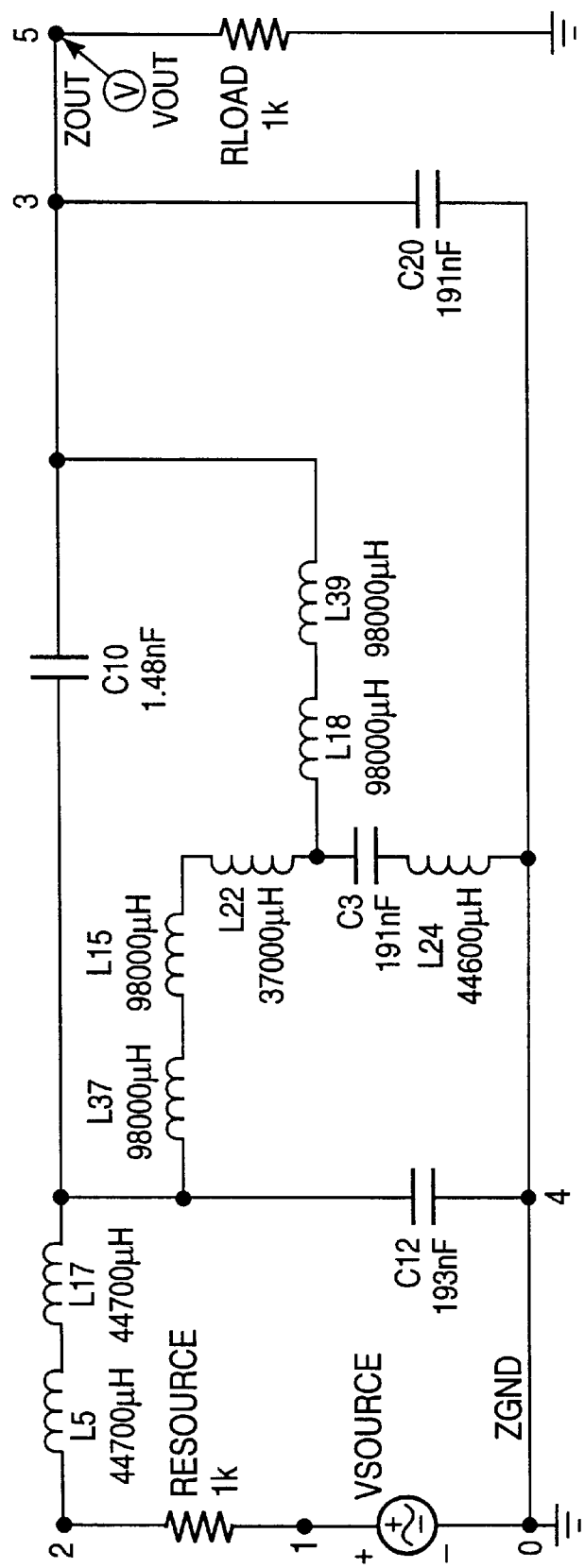
FIG. 75 illustrates a More Parsimonious circuit from generation 52.

FIG. 75 shows that the 100% compliant circuit from generation 52 has only 12 evolved components (8 inductors and 4 capacitors) for a cost of 0.020. Note that the improvement in parsimony occurs as a result of the deletion of L41 and L31 from the series composition consisting of four inductors (L41, L31, L18, and L39). A 100% compliance with the design requirements was maintained by slightly changing the values of L24, L5, and L17. Also, L18 and L39 have been flipped. This particular parsimonious program has 261 points (compared to 235 points for the 100% compliant program from generation 37).

This run demonstrates that it is possible to evolve electronic circuits using genetic programming using a multiobjective fitness measure that incorporates a primary factor and a secondary factor based on a user-defined measure of parsimony.

Designing a One-Input, Two-Output Circuit

A two-band crossover (woofer and tweeter) filter is a one-input, two-output circuit that passes all frequencies below a certain specified frequency to its first output port (the woofer) and that passes all higher frequencies to a second output port (the tweeter). A two-band crossover filter can be realized by a parallel composition consisting of a lowpass filter between the input and the first output port and a highpass filter between the input and the second output port.

In this section, a two-band crossover filter with a crossover frequency of 2,512 Hz is designed.

Preparatory Steps for the Two-Band Crossover (Woofer and Tweeter) Filter

This section discusses the preparatory steps for this problem.

The Embryonic Circuit

The embryonic circuit required for this problem reflects the fact that a two-band crossover (woofer and tweeter) filter has two outputs.

Figure 76:
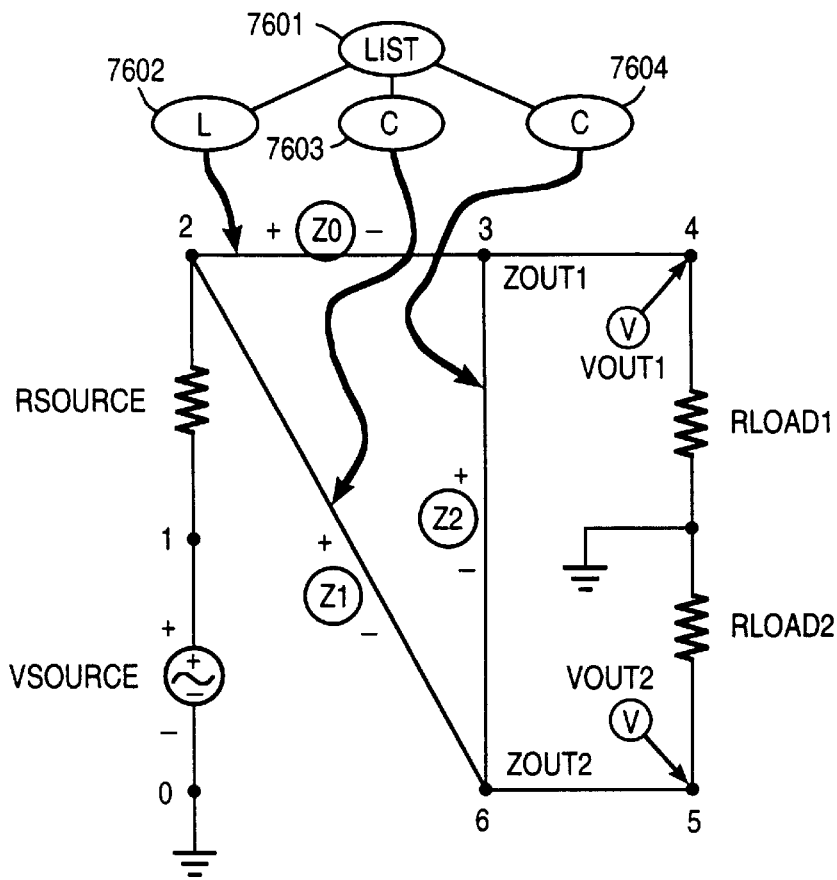
FIG. 76 illustrates a one-input, two-output embryo embryonic electrical circuit.
Figure 77:
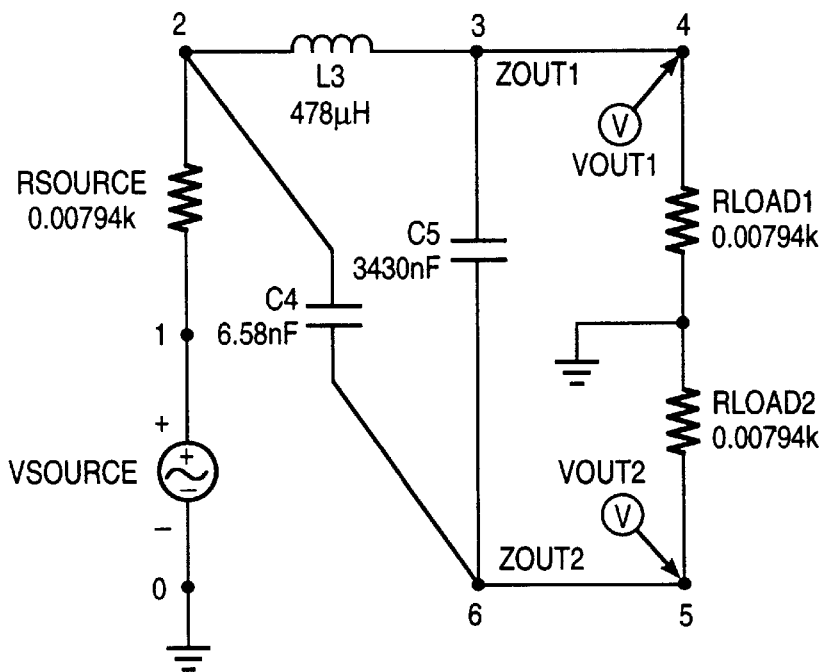
FIG. 77 illustrates the result of executing the L, C, and C functions.

The bottom three quarters of FIG. 76 shows the embryonic circuit for a one-input, two-output circuit for a two-band crossover filter. The energy source is a 2 volt sinusoidal voltage source VSOURCE whose negative (−) end is connected to node 0 (ground) and whose positive (+) end is connected to node 1. There is a source resistor RSOURCE between nodes 1 and 2. There is one modifiable wire (i.e., a wire with a writing head) Z0 between nodes 2 and 3, a second modifiable wire Z1 between nodes 2 and 6, and third modifiable wire Z2 between nodes 3 and 6. There are circles around modifiable wires Z0, Z1, and Z2 to indicate that the three writing heads (thick lines) point to them. There is an isolating wire ZOUT1 between nodes 3 and 4, a voltage probe VOUT1 at node 4, and a fixed load resistor RLOAD1 between nodes 4 and ground. Also, there is an isolating wire ZOUT2 between nodes 6 and 5, a voltage probe labeled VOUT2 at node 5, and a load resistor RLOAD2 between nodes 5 and ground. All three resistors have 0.00794 Kilo Ohms resistance. All of the above elements of this embryonic circuit (except Z0, Z1, and Z2) are fixed forever; they are not subject to modification during the process of developing the circuit. At the beginning of the developmental process, there is a writing head pointing to each of the three modifiable wires Z0, Z1, and Z2.

In one embodiment, the embryonic circuit is designed so that the number of lines impinging at any one node in the circuit is either two or three. This condition is maintained by all of the functions in the circuit-constructing program tree. The isolating wires ZOUT1 and ZOUT2 protect the probe points VOUT1 and VOUT2 from modification during the developmental process.

Note that little domain knowledge went into this embryonic circuit. Specifically, (1) the embryonic circuit is a circuit, (2) this embryonic circuit has one input and two outputs, and (3) there are modifiable connections Z0, Z1, and Z2 providing full point-to-point connectivity between the one input (node 2) and the two outputs (nodes 4 and 5). Specifically, note that the foreknowledge that a two-band crossover filter may be constructed by combining a lowpass and highpass filter in parallel is not used.

This embryonic circuit is applicable to any one-input, two-output circuit. It is the fitness measure that directs the evolutionary search process to the desired circuit.

Program Architecture

Since the embryonic circuit initially has three writing heads—one associated with each of the result-producing branches—there are three result-producing branches. No automatically defined functions are to be used in this illustrative problem. Thus, the architecture of the overall program tree consists of three result-producing branches joined by a LIST function.

The top quarter of FIG. 76 shows the topmost four points of an illustrative program tree. One writing head is initially associated with the L function 7602 and points to modifiable wire Z0; the second writing head is associated with the C function 7603 and points to modifiable wire Z1; and the third is associated with the C function 7604 and points to modifiable wire Z2.

Figure 78:
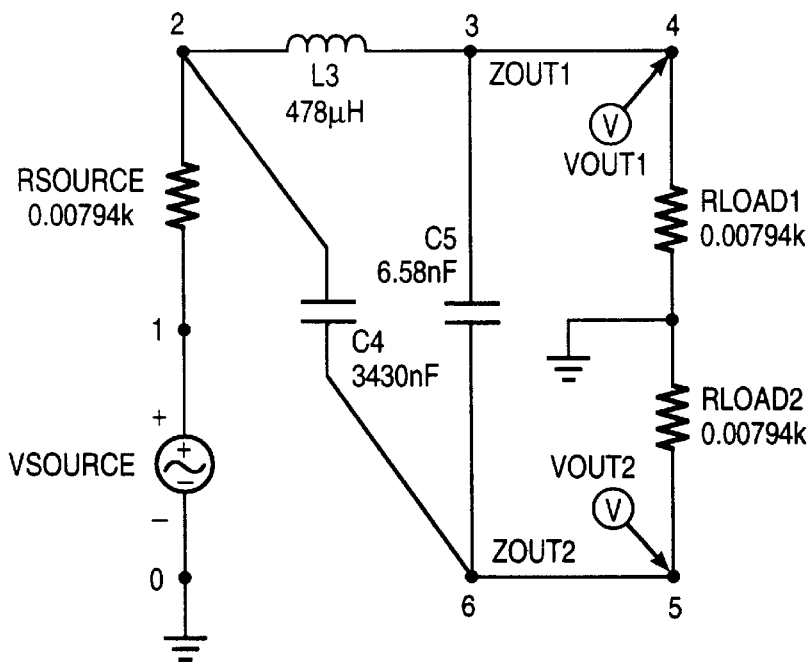
FIG. 78 illustrates the best circuit of generation 0.

FIG. 78 shows the effect on the embryonic circuit of FIG. 76 as a result of the execution of the L function (7602 in FIG. 76) of the first result-producing branch, the C function (7603 in FIG. 76) of the second result-producing branch, and the C function (7604 in FIG. 76) of the third result-producing branch.

The L function acts on the modifiable wire Z0 of FIG. 76 to convert it into inductor L3 of FIG. 78. An arithmetic-performing subtree branching off to the left of node 2 (not shown in FIG. 76) is evaluated as part of the evaluation of this L function and, when interpreted and scaled, establishes 478 micro-Henrys as the component value for inductor L3.

The C function 7603 acts on the modifiable wire Z1 of FIG. 76 and converts it into capacitor C4 of FIG. 78. An arithmetic-performing subtree branching off to the left of node 3 (not shown in FIG. 76) establishes 3,430 nF as the component value for capacitor C4. Similarly, the C function 7604 acts on the modifiable wire Z2 of FIG. 76 and converts it into 6.58 nF capacitor C5 of FIG. 78.

After execution of these L, C, and C functions, there are writing heads pointing to L3, C4, and capacitor C5.

Function and Terminal Sets

The terminal set and function sets are identical for all three result-producing branches. They are identical to those used in the problem of designing the lowpass filter that was previously discussed when no automatically defined functions were used.

Fitness Measure

The user-provided fitness measure directs the evolutionary process.

The evaluation of fitness for each individual program tree in the population begins with its execution. This execution causes the very simple embryonic circuit to be developed into a more complex circuit. Each such circuit is then simulated using a modified version of the SPICE simulator.

The SPICE simulator is requested to perform an AC small signal analysis and to report the circuit's behavior at the two probe points, VOUT1 and VOUT2, for each of 101 frequency values chosen from the range between 10 Hz to 100,000 Hz. Each of these four decades of frequency are divided into 25 parts (using a logarithmic scale), so there are a total of 202 fitness cases for this problem.

Fitness is measured in terms of the sum, over the 101 VOUT1 frequency values, of the absolute weighted deviation between the actual value of voltage in the frequency domain that is produced by the circuit at the first probe point VOUT1 and the target value for voltage for that first probe point plus the sum, over the 101 VOUT1 frequency values, of the absolute weighted deviation between the actual value of voltage that is produced by the circuit at the second probe point VOUT2 and the target value for voltage for that second probe point. The smaller the value of fitness, the better. A fitness of zero represents an ideal filter.

Specifically, the standardized fitness, F(t), is $$F(t) = \sum_{i=0}^{100} [W_1(d_1(f_i), f_i)d_1(f_i) + W_2(d_2(f_i), f_i)d_2(f_i)]$$

where $f(i)$ is the frequency (in Hertz) of fitness case i; $d_1(x)$ is the difference between the target and observed values at frequency x for probe point VOUT1; $d_2(x)$ is the difference between the target and observed values at frequency x for probe point VOUT2; $W_1(y,x)$ is the weighting for difference y at frequency x for probe point VOUT1; and $W(y,x)$ is the weighting for difference y at frequency x for probe point VOUT2.

The fitness measure does not penalize ideal values; it slightly penalizes every acceptable deviation; it heavily penalizes every unacceptable deviation.

Consider the woofer portion and VOUT1 first. The woofer portion of a two-band crossover filter is a lowpass filter.

The procedure for each of the 58 points in the interval from 10 Hz to 1,905 Hz is as follows: if the voltage equals the ideal value of 1.0 volts in this interval, then the deviation is 0.0; if the voltage is between 970 millivolts and 1,000 millivolts, then the absolute value of the deviation from 1,000 millivolts is weighted by a factor of 1.0; if the voltage is less than 970 millivolts, then the absolute value of the deviation from 1,000 millivolts is weighted by a factor of 10.0. This arrangement reflects the fact that the ideal voltage in the passband is 1.0 volt, the fact that a 30 millivolt shortfall satisfies the design requirements of the problem, and the fact that a voltage below 970 millivolts in the passband is not acceptable.

For the 38 fitness cases representing frequencies of 3,311 and higher, the procedure is as follows; if the voltage is between 0 millivolts and 1 millivolt, then the absolute value of the deviation from 0 millivolts is weighted by a factor of 1.0; if the voltage is more than 1 millivolts, then the absolute value of the deviation from 0 millivolts is weighted by a factor of 10.0. This arrangement reflects the fact that the ideal voltage in the stopband is 0.0 volts, the fact that a 1 millivolt ripple above 0 millivolts is acceptable, and the fact that a voltage above 1 millivolt in the stopband is not acceptable.

The number of fitness cases (61 and 35) in these two main bands is sufficiently close. Therefore, no attempt was made to equalize the weight given to the differing numbers of fitness cases in these two main bands. For the next 2 fitness cases (i.e., 2,089 Hz and 2,291 Hz), the absolute value of the deviation from 1,000 millivolts is weighted by a factor of 1.0. For the next fitness case (i.e., a frequency of 2,512 Hz), the absolute value of the deviation from 500 millivolts is weighted by a factor of 1.0. For the next 2 fitness cases (i.e., 2,754 Hz and 3,020 Hz), the absolute value of the deviation from 0 millivolts is weighted by a factor of 1.0.

Now consider the tweeter portion and VOUT2. The tweeter portion of a two-band crossover filter is a highpass filter. The fitness measure for the tweeter portion is a mirror image of the arrangement for the woofer portion.

Circuits that cannot be simulated by SPICE are assigned a high penalty value of fitness ($10^8$).

Hits are defined as the number of fitness cases for which the voltage is acceptable or ideal or which lie in the "don't care" band (not relevant to this particular problem). Thus, the number of hits ranges to a high of 202.

Parameters

The population size, M, is 640,000.

The percentage of genetic operations on each generation was 89% crossovers, 10% reproductions, and 1% mutations. The architecture-altering operations were not used on this illustrative problem.

A maximum size of 200 points was established for each of the three result-producing branches in each overall program.

In randomly choosing functions during the creation of the initial random population, the C, L, SERIES, PSS, FLIP, NOP, and GND functions were each assigned a relative weight of 8, while each of the eight VIA functions were assigned a relative weight of 1.

The other minor parameters for controlling the runs of genetic programming were the default values specified in Koza 1994 (appendix D).

Termination Criterion and Results Designation

Because our design requirements are stringent, it was not known whether it would be possible to evolve an individual scoring 202 hits in any reasonable amount of time. Since this problem runs slowly, the maximum number of generations, G, was set to an arbitrary large number and developments were awaited during each run.

Results for the Two-Band Crossover (Woofer and Tweeter) Filter

Among the population of 640,000 randomly created circuits in generation 0, some individuals are better than others. The worst individual circuit-constructing program tree from generation 0 create circuits which are so pathological that the SPICE simulator is incapable of simulating them. These circuits are assigned a high penalty value of fitness (i.e., $10^8$).

The median circuit of simulatable circuits from generation 0 has a fitness of 964.3 and scores 10 hits. This median circuit from generation 0 does not differentially pass frequencies in any significant way.

The best individual program tree of generation 0 has a fitness of 159.0 and scores 85 hits (out of 202). Its first result-producing branch has 181 points; its second result-producing branch has 181 points; and its third result-producing branch has 18 points. FIG. 78 shows the best-of-generation circuit from generation 0.

The best-of-generation individual from generation 12 has a fitness of 80.3 and scores 116 hits (out of 202). The best-of-generation individual from generation 20 has a fitness of 38.8 and scores 125 hits.

Figure 79:
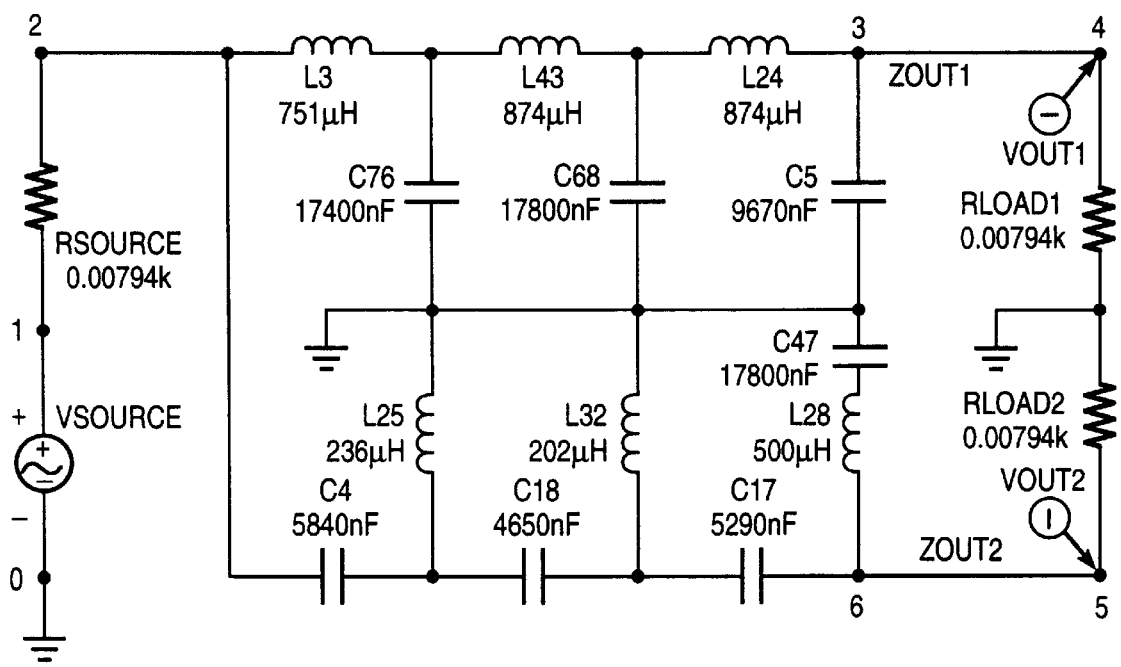
FIG. 79 illustrates the best circuit of generation 79.

A circuit emerges in generation 79 that has the same topology as the best-of-run circuit that later emerges in generation 137. This circuit from generation 79 is shown in FIG. 79, has a fitness of 1.06 (i.e., not as good as the fitness of the best-of-run individual from generation 137), and scores 196 hits. Most of the component values of this circuit are different from the eventual best-of-run circuit; however, these differing component values are all within one order of magnitude of the eventual component values for the not-yet-discovered best-of-run individual that will emerge in generation 137.

The best-of-run individual program tree of generation 137 has a fitness of 0.7807 and scores 192 hits (out of 202). Its three result-producing branches have 187, 198, and 191 points, respectively. Notice the symmetry of this evolved circuit.

Figure 80:
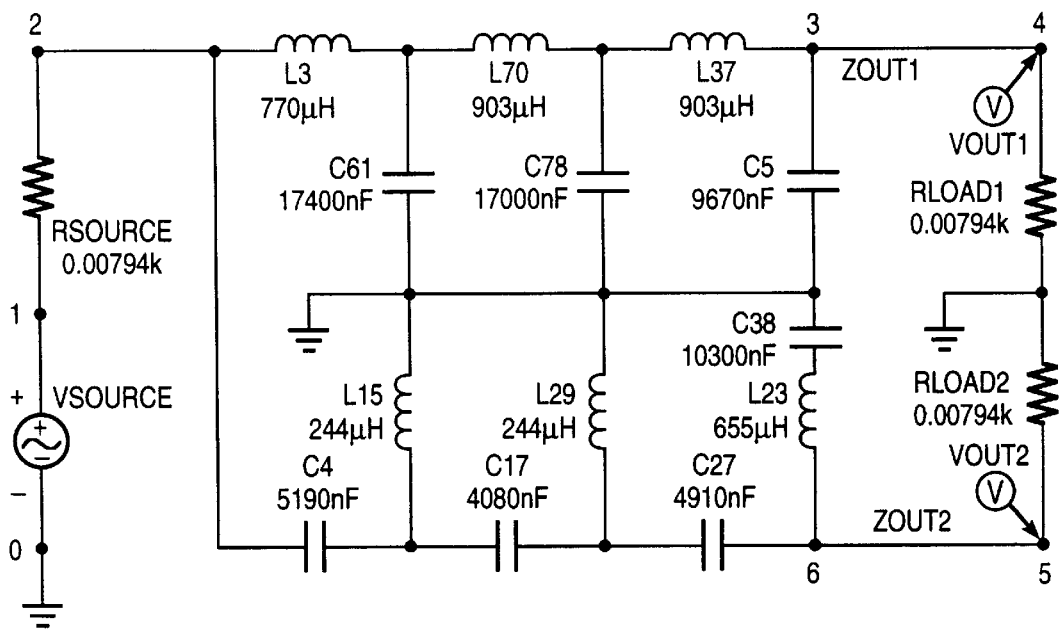
FIG. 80 illustrates best-of-run circuit from generation 137.

FIG. 80 shows the circuit for the best-of-run individual from generation 137. Notice that this best-of-run circuit from generation 137 does not score a full 202 hits. It is not known whether a 100%-compliant circuit can be evolved for this problem in any currently practical amount of time and effort.

The Butterworth circuits are a graded series of "ladder" benchmark filters. A Butterworth response of order 3 is considered sufficient for some practical applications. When we apply our fitness and hits measures to a combination of lowpass and highpass Butterworth 3 filters (with their cutoff frequency appropriately scaled at 2512 Hz), the combined circuit scores 162 hits (out of 202). The frequency domain response of two Butterworth 5 filters corresponds to a score of 184 hits. The frequency domain response of two Butterworth 7 filters corresponds to a score of 190 hits. The best-of-run circuit from generation 137 described above scores 192 hits and thus can be said to deliver a response that is slightly better than the combination of lowpass and highpass Butterworth filters of order 7. The combination of lowpass and highpass Butterworth 7 filters requires seven inductors and seven capacitors, while the genetically evolved best-of-run circuit requires only six inductors and seven capacitors. Thus, the genetically evolved filter circuit has a response that is slightly better than a Butterworth 7 filter and is slightly more parsimonious.

The lowpass part of the best-of-run circuit from generation 137 has the Butterworth topology (but not the Butterworth values for the components). In contrast, the highpass part of the best-of-run circuit has an extra capacitor and therefore does not have a Butterworth topology. There is a sharper boundary around 2,512 Hz for the highpass part (i.e., the part with the extra capacitor) of the frequency response than for the lowpass part.

Designing A One-Input,Three-Output Circuit

A three-band crossover (woofer-midrange-tweeter) filter is a one-input, three-output circuit that passes all frequencies below a certain specified frequency to its first output port (the woofer), that passes all frequencies above a certain different and higher specified frequency to its third output port (the tweeter), and that passes the intermediate frequencies to its second output port (the midrange output).

The embryonic circuit required for this problem reflects the fact that a three-band crossover (woofer-midrange-tweeter) filter has three outputs.

Figure 81:
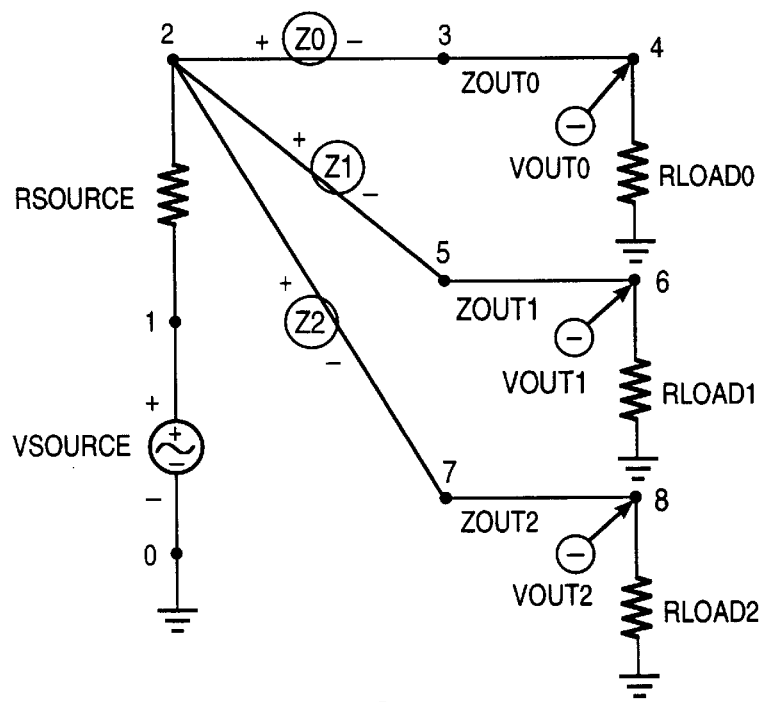
FIG. 81 illustrates one-input, three-output embryo embryonic electrical circuit.

FIG. 81 shows the embryonic circuit for a one-input, three-output circuit for a three-band (woofer-midrange-tweeter) crossover filter. The energy source is a 2 volt sinusoidal voltage source VSOURCE whose negative (−) end is connected to node 0 (ground) and whose positive (+) end is connected to node 1. There is a source resistor RSOURCE between nodes 1 and 2. There is one modifiable wire (i.e., a wire with a writing head) Z0 between nodes 2 and 3, a second modifiable wire Z1 between nodes 2 and 5, and third modifiable wire Z2 between nodes 2 and 7. There are circles around modifiable wires Z0, Z1, and Z2 to indicate that the three writing heads point to them. There is an isolating wire ZOUT0 between nodes 3 and 4, a voltage probe labeled VOUT0 at node 4, and a fixed load resistor RLOAD1 between nodes 4 and ground. Second, there is an isolating wire ZOUT1 between nodes 5 and 6, a voltage probe labeled VOUT1 at node 6, and a load resistor RLOAD1 between nodes 6 and ground. Third, there is an isolating wire ZOUT2 between nodes 7 and 8, a voltage probe labeled VOUT2 at node 8, and a load resistor RLOAD1 between nodes 8 and ground. All three resistors have 0.00794 Kilo Ohms resistance. All of the above elements of this embryonic circuit (except Z0, Z1, and Z2) are fixed forever; they are not subject to modification during the process of developing the circuit. At the beginning of the developmental process, there is a writing head pointing to each of the three modifiable wires Z0, Z1, and Z2. All subsequent development of the circuit originates from writing heads. A circuit is developed by modifying the component to which a writing head is pointing in accordance with the associated function in the circuit-constructing program tree.

Thus, the architecture of the overall program tree consists of three result-producing branches joined by a LIST function. That is, the embryonic circuit initially has three writing heads—one associated with each of the result-producing branches.

As problems become more demanding, runs of genetic programming generally require greater population sizes and greater numbers of generations in order to produce the desired results. For example, when this three-output problem was run, a circuit that closely met the requirements was evolved using the same population size (640,000) that was previously used on problems previously described herein; however, the circuit evolved on this problem using a population of only 640,000 individuals was not in compliance on 100% of the sample points in the frequency domain for all three output ports. In such situations, it is necessary to increase the population size and number of generations (with consequent increase in the resouces engaged in solving the problem).

Multiple-Input, Multiple-Output Embryonic Circuits

Many electrical circuits have multiple inputs as well as multiple outputs. One example is a system that processes multiple channels of signals. Another example is a circuit that controls a robot in which, say, there are two inputs from distance sensors and two outputs that control the velocity of the wheels on the left and right side of the robot.

Figure 82:
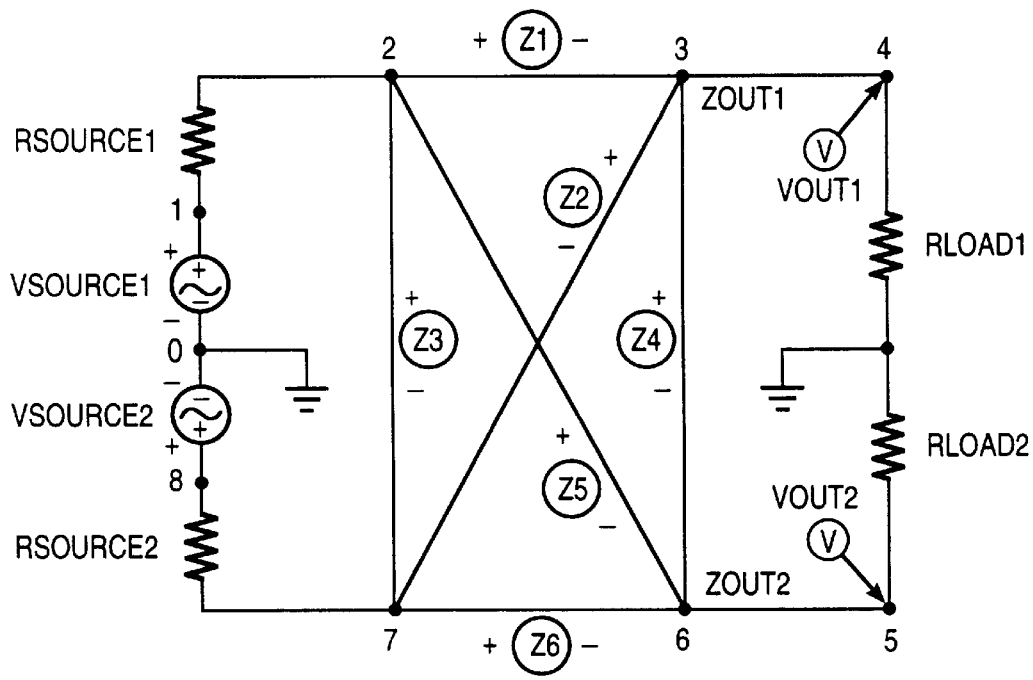
FIG. 82 illustrates embryonic circuit for a two-input, two-output controller for a robot.

FIG. 82 shows an embryonic circuit that might be used as the basis for evolving a two-input, two-output circuit. Voltage source VSOURCE1 is connected to node 0 (ground) and node 1 while VSOURCE2 is connected to node 8 and node 0 (ground). There is one source resistor RSOURCE1 between nodes 1 and 2 and another source resistor RSOURCE1 between nodes 8 and 7. There is an isolating wire ZOUT1 between nodes 3 and 4, a voltage probe labeled VOUT1 at node 4, and a fixed load resistor RLOAD1 between nodes 4 and 0 (ground). Also, there is an isolating wire ZOUT2 between nodes 6 and 5, a voltage probe labeled VOUT2 at node 5, and a load resistor RLOAD2 between nodes 5 and 0 (ground). There are modifiable wires Z1 (between nodes 3 and 2), Z2 (between nodes 7 and 3), Z3 (between nodes 7 and 2), Z4 (between nodes 6 and 3), Z5 (between nodes 6 and 2), and Z6 (between nodes 6 and 7). These six modifiable wires provide full point-to-point connectivity between the two inputs and the two outputs. At the beginning of the developmental process, there are six writing heads (pointing to the modifiable wires Z1, 72, Z3, Z4, Z5 and Z6).

Design of a Multi-Band-Pass Filter Using Subcircuits as Components

The components from which circuits are created need not be as primitive as resistors, capacitors, inductors, and so forth. The subcircuit facility in SPICE permits the definition of subcircuits. Once a subcircuit is defined in SPICE, it can be used repeatedly in any place where a primitive component might be used. That is, references to subcircuits may appear in the netlist for a circuit.

Subcircuits may have one or more leads and may have formal parameters.

Subcircuits are defined in SPICE by using the SUBCKT command. Each SUBCKT definition consists of the name of the subcircuit, the one or more formal parameters for its nodes, the netlist that defines the subcircuit, and the ENDS command (which must include the name of the subcircuit if nested subcircuit definitions are being used). Each SUBCKT definition has its own local numbering of components and nodes in the netlist that defines the subcircuit. A subcircuit is invoked by a line of a netlist that begins with an X, a unique number, one or more node numbers, and the name of a subcircuit. For example, the following is a subcircuit definition for a subcircuit with two leads for an elliptic 5 lowpass filter. The cutoff frequency for this lowpass filter is 34,258 Hertz.

.SUBCKT ELIP5_LP_1 1 2
L1 1 3 5.76e+03 uH
L2 3 4 3.46e+02 uH
C3 4 0 5.90e+00 nF
LA 3 5 8.99e+03 uH
L5 5 6 9.40e+02 uH
C6 6 0 5.26e+00 nF
L7 5 2 5.24e+03 uH
.ENDS ELUP5_LP_1

The name of the subcircuit is ELIP5_LP_1. The subcircuit refers to two nodes, namely nodes 1 and 2 here. The subcircuit has five inductors and two capacitors. The subcircuit definition is terminated by the ENDS line.

Figure 103:
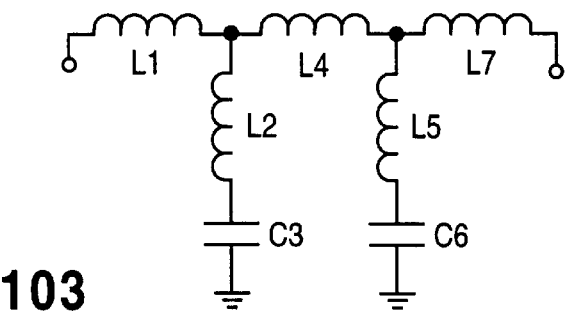
FIG. 103 is an elliptic 5 lowpass filter subcircuit ELIP5_LP_1.

FIG. 103 shows this elliptic 5 lowpass filter subcircuit.

Figure 104:
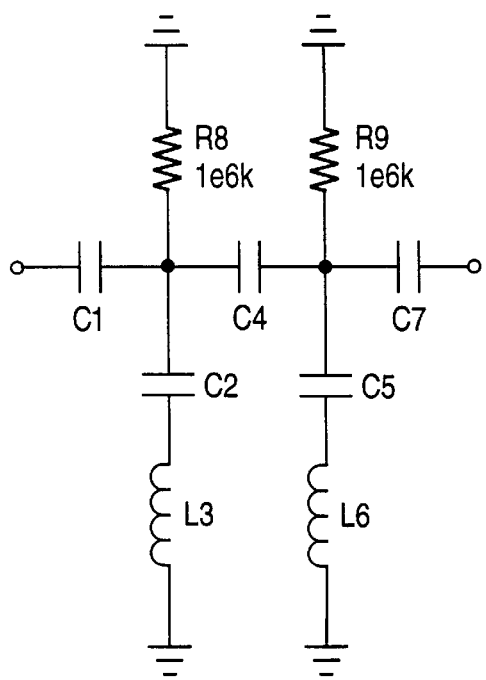
FIG. 104 is an elliptic 5 highpass filter subcircuit ELIP5_HP_1.

FIG. 104 shows an elliptic 5 highpass filter subcircuit. The two resistors, R8 and R9, with high resistance are added to prevent floating nodes which cannot be simulated by SPICE. These resistors do not have to be included in a physical circuit.

Note that the SUBCKT command is used to define a new component and that this command is not the same as an automatically defined function.

The subcircuit facility of SPICE will be illustrated by designing a multi-band-pass filter whose first passband starts at 100 Hz and ends at 200 Hz and the second passband starts at 10 KHz and ends at 20 KHz and whose permissible passband and stopband ripple are that of an elliptic filter of order 5. The goal is to design the multi-pass-band filter using lowpass and highpass filters as components, but without using inductors or capacitors as components.

Preparatory Steps for Multi-Pass-Band Filter

Embryonic Circuit

An embryonic circuit with one writing head will be used for this problem. This embryonic circuit is identical to that of FIG. 3, except that there is no writing head on wire Z0.

Program Architecture

No automatically defined functions are to be used in this illustrative problem.

Since the embryonic circuit initially has one writing head, there is one result-producing branch in each overall program tree.

For this illustrative problem, the function set, $F_{ccs}$, for each construction-continuing subtree is $F_{ccs}$={ELIP5_LP, ELIP5_HP, SERIES, PSS, FLIP, NOP, THGND, THPOS, THVIA0, THVIA1, THVIA2, THVIA3, THVIA4, THVIA5, THVIA6, THVIA7}, Here the ELIP5_LP and ELIP5_HP functions each take one argument that specifies the cutoff frequency of the elliptic filter of order 5. This argument is contained in the arithmetic-performing subtree. The ELIP5_LP (or ELIP5_HP) function then delivers a subcircuit whose model is that of a lowpass (or highpass) elliptic filter of order 5 with the desired cutoff frequency.

The terminal set, $T_{ccb}$, for each construction-continuing subtree consists of $T_{ccs}$={END, CUT}.

The function set, $F_{aps}$ for each arithmetic-performing subtree is, $F_{aps}$=(+,−} each taking two arguments.

The terminal set, $T_{aps}$, for each arithmetic-performing subtree is $T_{aps}$={R} where R represents floating-point random constants between −1.000 and +1.000.

Fitness Measure

For this problem, the voltage VOUT is probed and the circuit is viewed in the frequency domain. The SPICE simulator is requested to perform an AC small signal analysis and to report the circuit's behavior for each of 101 frequency values chosen over four decades of frequency (from 10 Hz to 100,000 Hz). Each decade is divided into 25 parts (using a logarithmic scale).

Fitness is measured in terms of the sum, over these 101 fitness cases, of the absolute weighted deviation between the actual value of the voltage in the frequency domain that is produced by the circuit at the probe point VOUT and the target value for voltage. The smaller the value of fitness, the better. A fitness of zero represents an ideal filter.

The fitness measure does not penalize ideal values; it slightly penalizes every acceptable deviation; and it heavily penalizes every unacceptable deviation.

The frequency range is divided into two passbands, three stopbands, and four "don't care" regions.

The procedure for each of the 8 points in each of the two passbands (a total of 16 points) is as follows: If the voltage equals the ideal value of 1.0 volts in this interval, the deviation is 0.0. If the voltage is between 950 millivolts and 1,000 millivolts, the absolute value of the deviation from 1,000 millivolts is weighted by a factor of 1.0. If the voltage is less than 950 millivolts, the absolute value of the deviation from 1,000 millivolts is weighted by a factor of 10.0. This arrangement reflects the fact that the ideal voltage in the passband is 1.0 volt, the fact that a 50 millivolt shortfall is acceptable, and the fact that a voltage below 950 millivolts in the passband is not acceptable. It is not possible for the voltage to exceed 1.0 volts in an LC circuit of this kind.

The procedure for each of the 53 points in the three stopbands is as follows: If the voltage is between 0 millivolts and 5 millivolts, the absolute value of the deviation from 0 millivolts is weighted by a factor of 1.0. If the voltage is more than millivolts, the absolute value of the deviation from 0 millivolts is weighted by a factor of 10.0. This arrangement reflects the fact that the ideal voltage in the stopband is 0.0 volt, the fact that a 5 millivolt ripple above 0 millivolts is acceptable, and the fact that a voltage above 5 millivolt in the stopband is not acceptable.

There are eight "don't care" points just before each passband and eight "don't care" points just after each passband.

The deviation is considered to be zero for each of the 32 points in the three " don't care" bands.

Hits are defined as the number of fitness cases for which the voltage is acceptable or ideal or which lie in the "don't care" band. Thus, the number of hits ranges from a low of 32 to a high of 101 for this problem.

Control Parameters

The population size, M, was 40,000.

Termination Criterion and Results Designation

The termination criterion and method of results designation are the same as in the previously discussed LC lowpass filter design problem.

Results for the Multi-Band-Pass Filter Using Subcircuits as Components

The best circuit from generation 25 has a fitness of 0.197 and scores 101 hits (out of 101). Thus, this problem can be considered to be solved.

Figure 105:
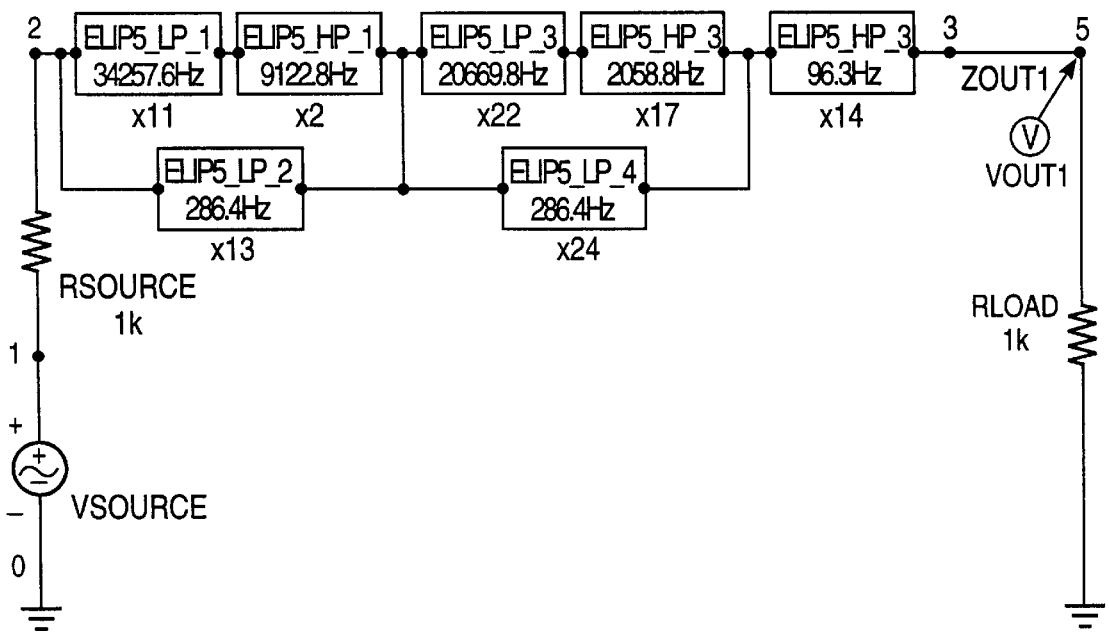
FIG. 105 illustrates the best-of-generation genetically evolved multi-band-pass filter from generation 45.

FIG. 105 shows the best-of-generation individual from generation 25. As can be seen in the figure, the two passbands are defined by a series and parallel composition of the available lowpass and highpass elliptic filter subcircuits. The numerical parameter associated with each subcircuit is the cutoff frequency for that filter. Each of these numerical parameters comes from an arithmetic-performing subtree.

Designing a Circuit with Hard-Wired Components

Many practical design problems start with a requirement that certain specified components be incorporated into the circuit in a particular way. Such requirements may be motivated by various practical electrical, economic, or packaging considerations.

Suppose, for example, it is necessary to design a Class B push-pull amplifier in which the solution is required to incorporate two transistors that are connected in a particular way. A special embryonic circuit can be created to incorporate the required two transistors connected in the required manner. No writing heads are placed on the two transistors, thus guaranteeing that they remain unchanged throughout the developmental and evolutionary process. The evolutionary process then proceeds as previously described.

Design of an Amplifier Using Transistors

An amplifier is a one-input, one-output circuit that multiplies the voltage of its input signal by an amplification factor, A.

The starting point for the design of an amplifier is the specification by the user of the amplification factor, A, and the range of frequencies over which the amplifier is expected to operate. For this problem, an amplification factor of 3.5 over the frequency range of 20 Hz to 20,000 Hz is sought.

Amplifiers are active circuits in the sense that the output voltage can be greater than the input voltage. Active circuits cannot be realized merely with resistors, capacitors, and inductors, but, instead, require the presence of active components, such as transistors and one or more power sources.

Preparatory Steps for the Amplifier
Embryonic Circuit

Since the problem of designing an amplifier calls for a one-input, one-output circuit with a source resistor and a load resistor, the embryonic circuit in FIG. 3 is suitable for this illustrative problem. The source resistor RSOURCE is 1,000 Ohms and the load resistor RLOAD is 8 Ohms. The incoming alternating current signal source VSOURCE is 500 millivolts in amplitude.

Program Architecture

No automatically defined functions are to be used in this illustrative problem.

Since the embryonic circuit initially has two writing heads—one associated with each of the result-producing branches—there are two result-producing branches in each overall program tree.

Thus, the architecture of each overall program tree in the population consists of two result-producing branches joined by a LIST function.

Function and Terminal Sets

The terminal sets and function sets are identical for both result-producing branches of the program trees in the population for this illustrative problem.

Each branch is created in accordance with the constrained syntactic structure.

The functions are divided into three categories for this problem:
(1) connection-creating functions that create the topology of circuit from the embryonic circuit,
(2) component-creating functions that convert wires (and other components) within the circuit into specified components, and
(3) arithmetic-performing functions and numerical terminals that together specify the numerical value (sizing) for each component of the circuit.

For this illustrative problem, the function set, $F_{ccs}$, for each construction-continuing subtree is $F_{ccs}$={R, C, QT0, QT1, QT2, QT3, QT4, QT5, QT6, QT7, QT8, QT9, QT10 QT11, SERIES, PSS, FLIP, NOP, TGND, POS, THVIA0, THIVIA1, THIVIA2, THVIA3, THVIA4, THVIA5, THVIA6, THVIA7}, The terminal set, $T_{ccb}$, for each construction-continuing subtree consists of $T_{ccs}$={END, CUT}.

The function set, $F_{aps}$ for each arithmetic-performing subtree is, $F_{aps}$={+, −} each taking two arguments.

The terminal set, $T_{aps}$, for each arithmetic-performing subtree is $T_{aps}$={R} where R represents floating-point random constants between −1.000 and +1.000.

Fitness Measure

For this problem, the voltage VOUT is probed and the circuit is viewed in the frequency domain.

The SPICE simulator is requested to perform an AC small signal analysis and to report the circuit's behavior for each of 151 frequency values chosen over three decades of frequency (from 20 Hz to 20,000 Hz). Each decade is divided into 50 parts (using a logarithmic scale).

Fitness is measured in terms of the sum, over these 151 fitness cases (i.e., relative to 1 volt) of the absolute weighted deviation between the actual value of the relative voltage in the frequency domain that is produced by the circuit at the probe point VOUT and the target value of decibels of relative voltage. The smaller the value of fitness, the better. A fitness of zero represents an ideal filter.

The fitness measure does not penalize ideal values; it slightly penalizes every acceptable deviation; and it heavily penalizes every unacceptable deviation.

The procedure for each of the 151 points in the interval from 20 Hz to 20,000 Hz is as follows: if the relative voltage is between 4 dB and 6 dB, then the absolute value of the deviation from 5 dB is weighted by a factor of 1.0; if the relative voltage is outside this range, then the absolute value of the deviation from 5 dB is weighted by a factor of 10.0. This arrangement reflects the fact that the ideal relative voltage is 5 dB, the fact that a 1 dB variation is acceptable, and the fact that a deviation in relative voltage of more than 1 dB is not acceptable.

Hits are defined as the number of fitness cases for which the voltage is acceptable or ideal. Thus, the number of hits ranges from a low of 0 to a high of 151 for this problem.

Control Parameters

The percentage of genetic operations on each generation was 89% crossovers, 10% reproductions, and 1% mutations. The architecture-altering operations were not used on this illustrative problem.

A maximum size of 300 points was established for each of the two result-producing branches in each overall program.

In randomly choosing functions during the creation of the initial random population, the R, C, SERIES, PSS, FLIP, NOP, THGND, and THPOS functions were each assigned a relative weight of 24; the eight THVIA functions were assigned a relative weight of 3; the 12 QT functions, QT, . . . , QT11, were assigned a relative weight of 2.

The other parameters for controlling the runs of genetic programming were the default values specified in Koza 1994 (appendix D).

Termination Criterion and Results Designation

The termination criterion and method of results designation are the same as in the previously discussed LC lowpass filter design problem.

Results for the Amplifier

The best circuit from generation 45 (FIG. 97) has a near-zero fitness of 0.00329 and scores 151 hits (out of 151). It has 109 points in its first result-producing branch and 115 points in its second result producing branch. Because the sum of the weighted deviations from the target relative voltage is nearly zero, the desired amplification factor was achieved over the desired frequency range.

Figure 97:
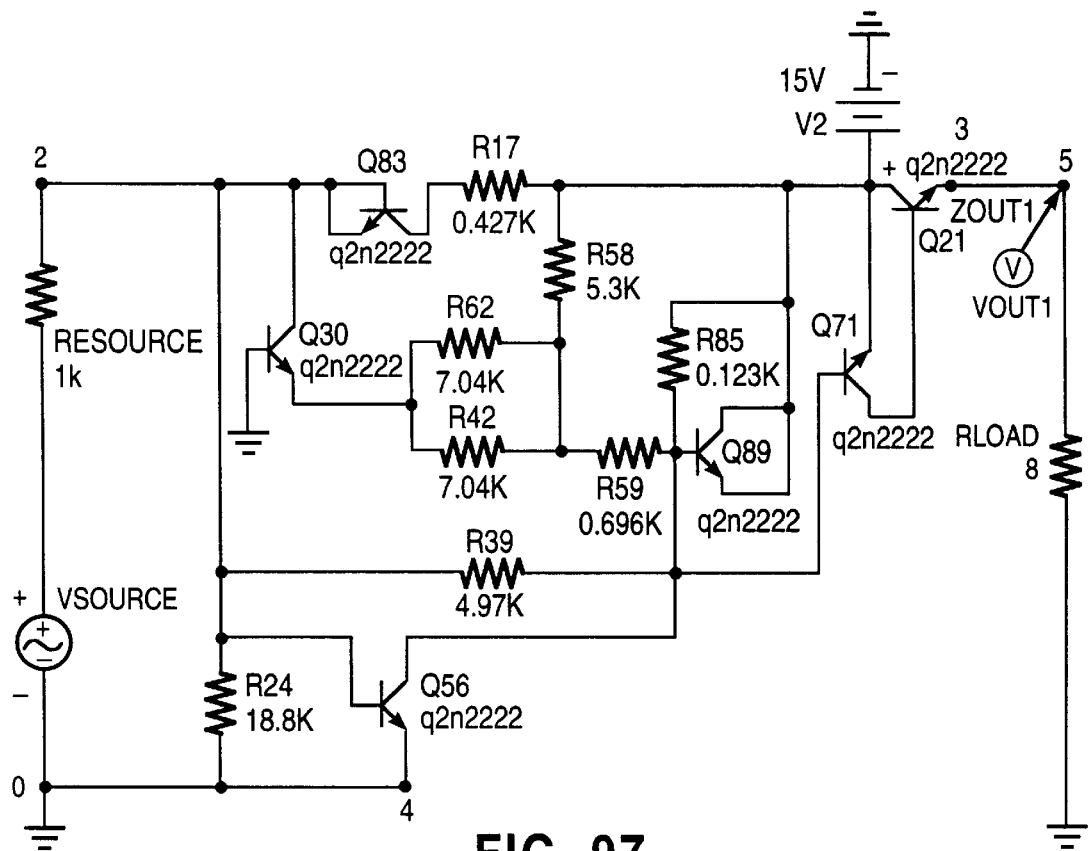
FIG. 97 illustrates the best-of-generation genetically evolved amplifier from generation 45.

FIG. 97 shows best-of-generation genetically evolved amplifier from generation 45.

The best-of-generation genetically evolved amplifier from generation 45 can be viewed as being composed of various stages.

Figure 98:
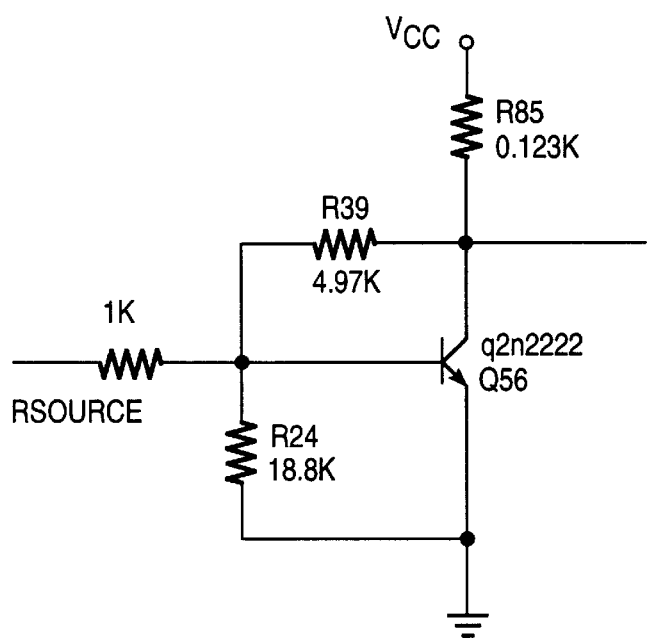
FIG. 98 illustrates the voltage gain stage of the genetically evolved amplifier.

FIG. 98 a section of the best-of-generation genetically evolved amplifier from generation 45 that can be interpreted as a voltage gain stage.

Another section (FIG. 99) of the best-of-generation genetically evolved amplifier from generation 45 can be interpreted as a Darlington emitter follower (although transistor Q71 is used in an inverted fashion from the conventional arrangement).

Figure 99:
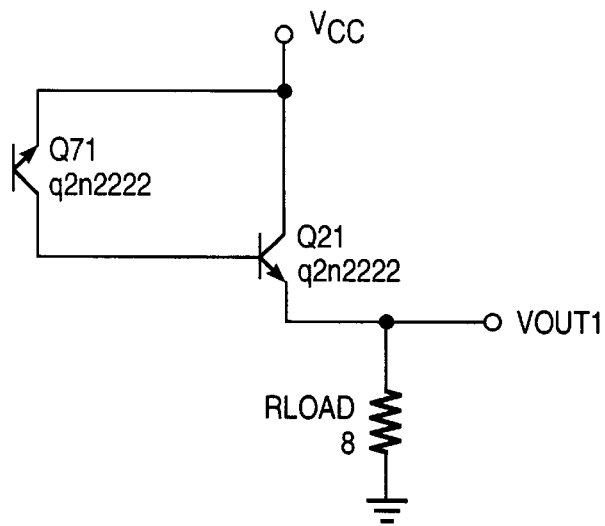
FIG. 99 illustrates Darlington emitter follower section of the genetically evolved amplifier.
Figure 100:
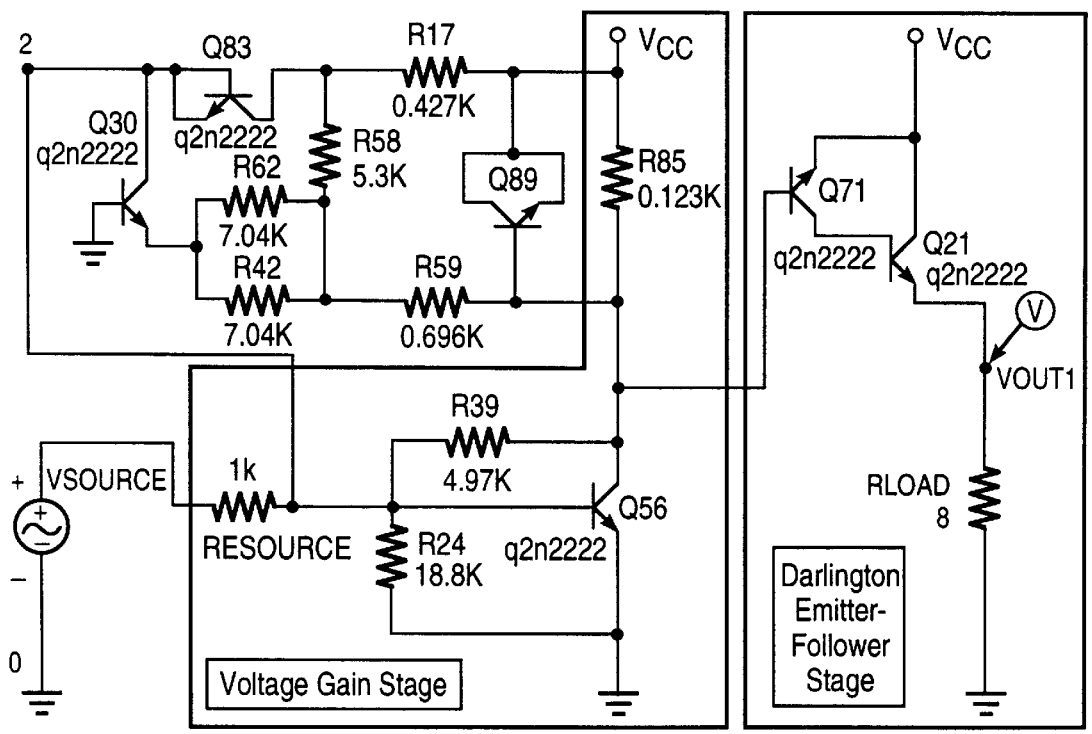
FIG. 100 illustrates another view of the genetically evolved amplifier.

FIG. 99 shows the same circuit with the voltage gain stage and the Darlington emitter follower section highlighted by boxes.

When everything in the genetically evolved amplifier except for the evolved voltage gain stage and the evolved Darlington emitter-follower stage are removed, the remaining circuit is actually an amplifier with a gain very similar to that of the entire genetically evolved circuit. The remainder achieves an output voltage of 1.788, whereas the entire evolved circuit achieves an output voltage of 1.7783, a difference of less than 0.01. The gain in decibels of the entire genetically evolved amplifier from generation 45 is 5.0001 dB over the entire frequency range while the remainder circuit achieves a gain of 5.0464 dB over the range. Thus, the genetically evolved amplifier can be interpreted as being functionally very similar to an amplifier circuit composed of a voltage gain stage and a Darlington emitter-follower stage.

Other Simulators

The SPICE simulator is used in the preferred embodiment for the measurement of fitness of individuals in the populations. Other simulators have different operating characteristics that may be desirable for particular problems or classes of problems. Other simulators may permit the measurement of characteristics of the behavior of circuits that cannot be done by the SPICE simulator.

Use of the SPICE simulator requires implementation of a number of changes to make it useful for the present invention. Use of another simulator would require implementation of similar changes. These changes would include some or all of the following.

(1) interfacing of the simulator to an implementation of genetic programming, including communicating the description of the fully developed circuit so that it is suitable input to the simulator and communicating the behavior of the circuit produced as output by the simulator so that it is suitable input to the implementation of genetic programming, (2) changing (if necessary) the simulator from a batch-oriented system to an invokable and re-entrant sub-module (with necessary initializations), (3) managing available memory resources, (4) managing exits produced by error conditions so that the exit from the simulator permits the overall run to continue for all other individuals in the population and all other generations of the run, and (5) making the simulator sufficiently efficient so that it can handle demes populations of individuals over many generations without exponential performance degradation on parallel machinery.

In an alternate embodiment, simulation of analog circuits may be performed with a programmed digital signal processor (DSP).

Measurement of Fitness Using Actual Eelectrical Components

In FIG. 1B, the step of determining the behavior of the electrical circuit that was created by the developmental process of the present invention was performed by the SPICE simulator (in one embodiment).

One alternative and advantageous method for determining the behavior of the circuit is to use a field-programmable device to physically realize the circuit at hand and then to determine the behavior of the circuit by actually operating the physical realization of the circuit.

For digital circuits, for example, field-programmable gate arrays (FPGAs) are microprocessor chips that contain an array of digital gates that can be configured so as to customize the chip to perform a particular task. For the type of FPGA that is reconfigurable, the customization is achieved by setting a pattern of bits in the SRAM memory of the FPGA that activate certain connections within the FPGA and that specify the particular logical functions to be performed by the FPGA. The Xilinix Corporation is one of the leading suppliers of FPGAs. For analog circuits, Pilkington Micro Electronics Limited has, for example, developed a field-programmable analog array (FPAA) of reconfigurable analog devices based on switched capacitor technology.

Figure 111:
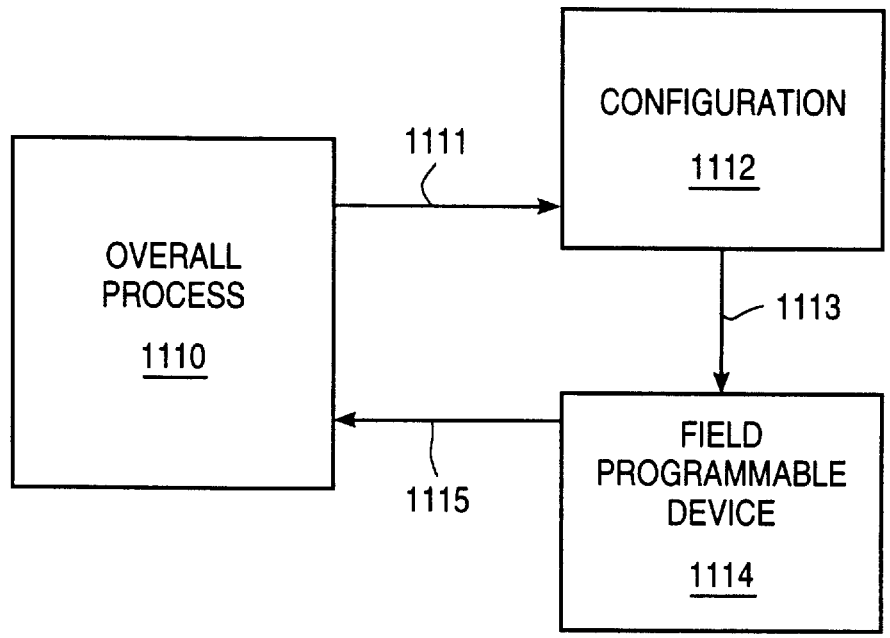
FIG. 111 illustrates the use of a field programmable digital or analog array to physically realize a desired circuit.

FIG. 111 shows how a field-programmable reconfigurable device can be used to determine the behavior of either a digital or analog circuit that may be created during a run of the process of the present invention. The "Overall Process" 1110 represents the overall process of the present invention except for the step of determining the behavior of the electrical circuit. That is, the "Overall Process" 1110 includes the step of creating the description of the fully developed circuit. After the description of the fully developed circuit is created for one individual in the population at a particular generation of the process, it is communicated to the "Configuration" step by communication bus 1111. The "Configuration" step 1112 converts the description of the circuit into the detailed information which, when loaded into the field-programmable device, customizes the field-programmable device to the particular individual circuit. This information is typically a pattern of bits that is loaded into an SRAM memory within the field-programmable device. This information is then communicated from the "Configuration" step 1112 to the field-programmable device 1114 via bus 1113. The field-programmable device 1114 then becomes a physical realization of the desired circuit. The field-programmable device 1114 can then be exposed to a large number of different inputs (i.e., the fitness cases used to measure the fitness of the individual circuit). In a digital field-programmable gate array (FPGA), the different inputs typically consist of a large number of different combinations of the various digital inputs to the circuit. If desired, these combinations of inputs may be conveniently generated by a portion of the FPGA dedicated to this purpose. In analog field-programmable array, the different inputs may consist of various analog test signals that may be generated by an analog signal generator. If desired, these analog test signals be generated by a portion of the analog field-programmable array dedicated to this purpose. After the field-programmable device (whether digital or analog) receives its different inputs (whether generated on-chip or off-chip), the behavior of the individual circuit can then be communicated to the "Overall Process" 1110 by communication bus 1115.

Design of Other Complex Structures

Many other complex structures can be designed in accordance with the methods of the present invention.

Physical structures, like electrical circuits, consist of a plurality of different types of components. These individual components may be arranged in a particular topology to form the overall complex phsycial structure. Various types of components may be situated at each location within the topological arrangement. Each component in the overall structure may be further specified by a set of component values (typically numerical).

Figure 101:
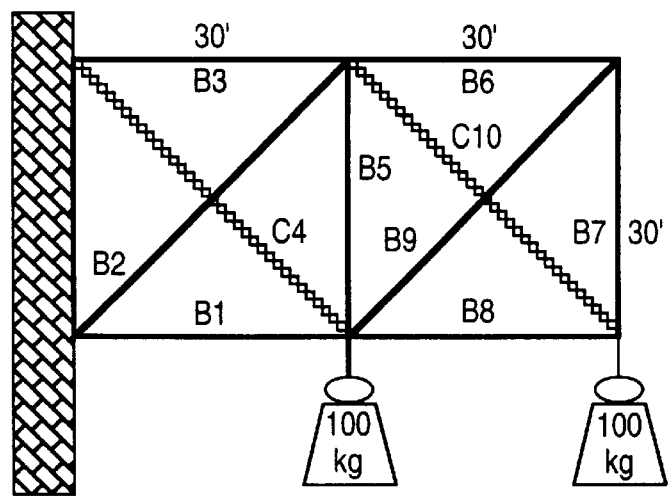
FIG. 101 is a diagram of a truss consisting of eight rigid beams and two flexible cables supporting two loads.

FIG. 101 shows a truss supported from a vertical wall that a mechanical engineer might design consisting of components such a rigid load-supporting metallic beams and load-supporting flexible cables in order to support two 100-kilogram loads. In this illustrative figure, the components that are rigid metallic beams are identified as B1, B2, B3, B5, B6, B7, B8, and B9. The components that are flexible metallic cables are identified as C4 and C10. The figure also has two masses and a wall. In the figure, the number of components in the structure shown is 13, the geometric arrangement of the 10 beam and cables is that four are horizontal, two are vertical, and four are diagonal (arranged in the particular topology as shown).

In designing a truss, there may be design goals of supporting particular loads, of satisfying stress constraints that specify that the stress on each bar or cable is not so great as to cause the rigid bar or flexible cable to break, and of meeting some cost requirement, such as minimizing the total weight of the material contained in the truss. In order to design the desired truss, the designer must create an appropriate topological arrangement of components (i.e., the number of components and how they are joined), choose component types to insert into the topological arrangement (i.e., rigid beams or flexible cables), and choose appropriate numerical values for each of the components (i.e., their thickness). Thus, the problem of designing a truss that meets the design requirements is a matter of finding its topology, the choice of types of components to be situated at each location within its topology, and the sizing (typically numerical) of all its components.

Figure 102:
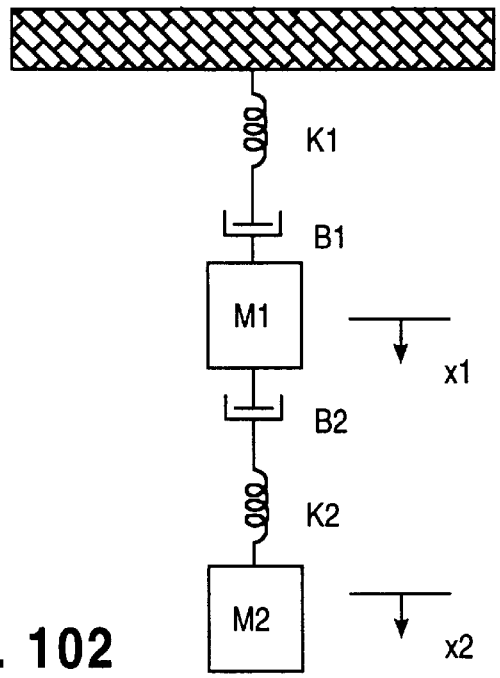
FIG. 102 is a diagram of a mechanical system containing two springs, two dash pots, and two masses.

FIG. 102 shows a mechanical structure consisting of two springs, two dash pots, and two masses. Spring K1 has two interfaces (leads, ends); one interface is connected to the supporting beam shown at the top of the figure; the other interface is connected to dash pot B1. Dash pot B1 is connected in series to spring K1. Dash pot B1 has two interfaces; one is connected to spring K1 and the other is connected to mass M1. Similarly, mass M1, dash pot B2, spring K2, and mass M2 are connected in series.

It can be seen that the developmental methods of the present invention can be applied to the design of a complex structure, such as this mechanical system in a manner similar to that employed for electrical circuits. In a such system, one many associate mass with capacitance, the spring constant corresponds with the inverse of inductance, and the damping constant of a dash pot with the conductance (the inverse of resistance), forces correspond to torque and angular velocity with the voltage.

Similarly, it can be seen that the developmental methods of the present invention can be applied to the design of a complex structure such as a mechanical or rotational system in a manner similar to that employed for electrical circuits. In rotational systems, one may associate the spring constant with the inverse of inductance, the moment of inertia corresponds with capacitance, the damping constant of a dash pot with the conductance (the inverse of resistance), forces correspond to current, and velocity with the voltage.

The similarity between complex structures of different kinds can be seen by considering the nature of components and the overall structures that are built up from components.

As previously mentioned, in one embodiment, a "component" is an object that has a type, some number of component values that further specify the component, and some number of interface points.

The interface points of a component may be operationally indistinguishable (as, for example, the two leads of a resistor) or they may be operationally different (as, for example, the collector, base, and emitter of a transistor).

Thus, for example, in electrical engineering, a resistor is a component because it is an object of the type "resistor;" it has a single numerical component value of 1,000 Ohms; and it has two interface points (leads, ends).

Similarly, in civil engineering, a rigid metallic beam of a certain length is a component because it is an object of the type "30 foot metallic beam"; it has a single numerical component value specifying that its diameter is one inch; and it has two interface points (ends).

Also, in mechanical engineering, a spring is a component because it is an object of the type "spring"; it has a single numerical component value specifying its spring constant; and it has two interface points (ends). A dash pot is a component because it is an object of the type "dash pot"; it has a single numerical component value specifying its damping constant; and it has two interface points. A mass is a component of the type "mass"; it has a single numerical component value specifying its mass; and it has one interface point.

Thus, in one embodiment, a "structure" consists of (1) a set of components and (2) a set of undirected lines (arcs) between the interface points of the components. Each undirected line indicates the existence of a connection between the interface point of one component and another interface point (typically of another component).

Figure 112:
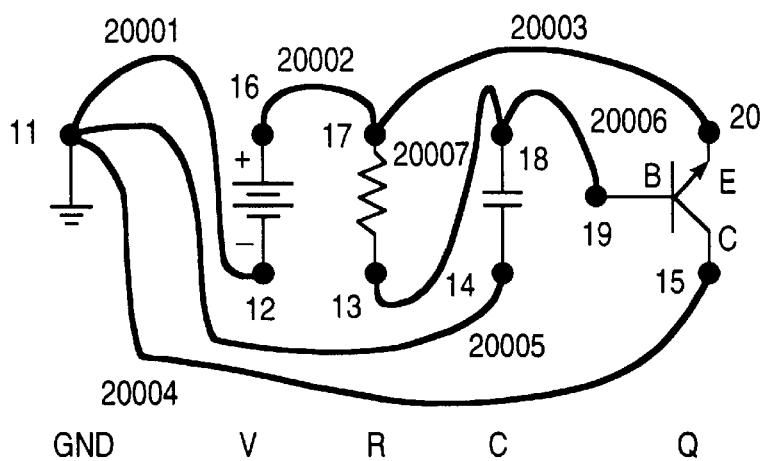
FIG. 112 illustrates an electrical structure consisting of 5 components, 10 interface points, and 7 arcs.

FIG. 112 illustrates this view of "components" and a "structure" that is built up of components from the field of electrical circuits. This structure consists of 5 "components," 10 "interface points," and 7 "arcs." The five components are a ground GND, a voltage source V, a resistor R, a capacitor C, and a transistor Q. The ground has only one interface point; the voltage source, resistor, and capacitors each have two interface points; and the transistor has three interface points.

The two interface points of the voltage source and the three interface points of the transistor are operationally distinguishable, but the interface points of the resistor and capacitor are not. Note that this operational distinguishably is not to be confused with distinguishing labels that may be applied for unrelated purposes (e.g., the convention in the SPICE simulator of assigning a positive and negative polarity to every interface point—even including the otherwise indistinguishable leads of a resistor).

The interface points of the five components are then connected by seven undirected lines (arcs) so as to create an electrical circuit. For example, arc 20001 connects interface point 11 of the ground GND to interface point 12 (the negative lead of the battery V). Arc 20002 connects interface point 16 (the positive lead of the battery V) to interface point 17 (one of the leads of the resistor R). Arc 20003 connects interface point 17 of the resistor R to interface point 20 (the emitter lead of transistor Q).

The arcs are undirected lines. This undirected character is not affected by whether or not the arcs connect to distinguishable or indistinguishable interface points of particular components. Also, this undirected character is not affected by whether or not the interface point to which they connect belongs to a component with one, two, three, or more interface points.

The interface graph for a structure is the graph wherein the points (nodes) represent the interface points of the components of a structure and wherein the lines (arcs, undirected lines) represent the existence of a connection between two interface points.

For the electrical circuit structure consisting of 5 components, 10 interface points, and 7 arcs shown in the figure, the interace graph has 10 points (numbered 11 through 20) and 7 arcs (numbered 20001 through 20007).

Figure 113:
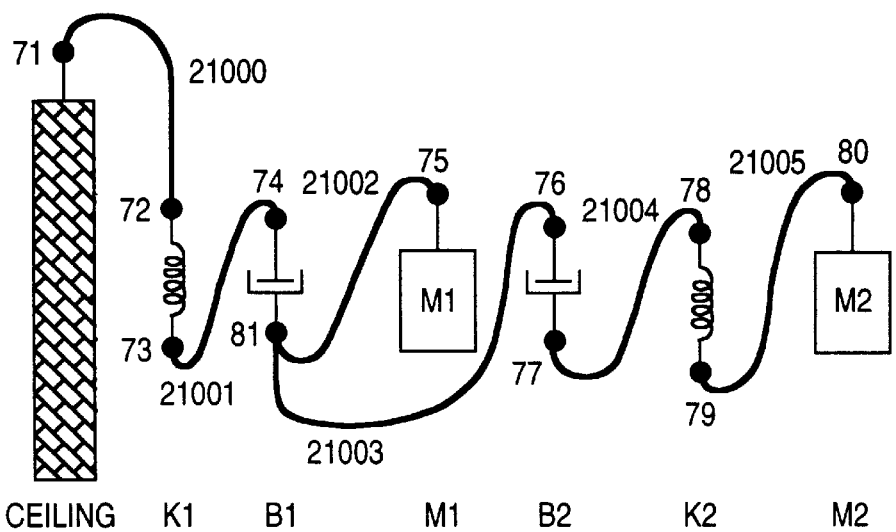
FIG. 113 illustrates a mechanical structure consisting of 7 components, 11 interface points, and 6 arcs.

FIG. 113 shows a structure that is built up of components from the field of mechanical structures. This structure corresponds to the structure in FIG. 102. This structure has 7 components, 11 interface points, and 6 arcs. This structure has seven components: a CEILING, a spring K1, a dash pot B1, a mass M1, a dash pot B2, a spring K2, and a mass M2. The ceiling and the two masses each have only one interface point and the springs and dash pots each have two interface points. The interface points of all of these components are operationally indistinguishable.

The interface points of the seven components are then connected by six undirected lines (arcs) so as to create a mechanical structure. For example, arc 21000 connects interface point 71 of the CEILING to interface point 72 (an end of the spring K1). Arc 21001 connects interface point 73 of spring K1 to interface point 74 (an end of the dash pot B1).

Note arc 21002 connects interface point 81 of dash pot B1 to interface point 75 (an end of the mass M1) and that arc 21003 connects interface point 81 of dash pot B1 to interface point 76 (an end of the dash pot B2). As previously noted, mass M1 has only one interface point. The style of mechanical engineering drawings, such as FIG. 102, shows that dash pot B2 is joined to mass M1 whereas, in fact, there is a three-way junction at the bottom of dash pot B1. FIG. 113 makes clear the fact that mass M1 has only one interface point and that both it and dash pot B2 are connected to the bottom of dash pot B1. Similarly, the other arcs in FIG. 113 show connections between various other interface points of the various other components in the figure.

For the mechanical structure consisting of 7 components, 11 interface points, and 6 arcs shown in the figure, the interace graph has 11 points (numbered 71 through 81) and 6 arcs (numbered 21000 through 20005).

Figure 114:
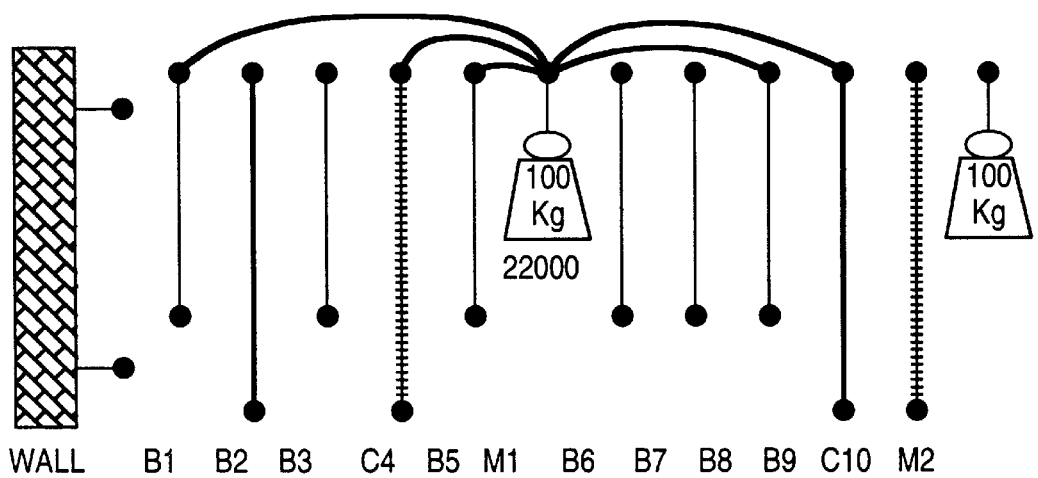
FIG. 114 illustrates mechanical structure consisting of 13 components and 24 interface points.

FIG. 114 shows a portion of another structure (a truss) that is built up of components from the field of mechanical structures. This structure corresponds to the truss shown in FIG. 101. This structure has 13 components and 24 interface points. This components are a WALL; six 30 foot rigid metalic beams B1, B3, B5, B6, B7, and B8; two 42 foot rigid metalic beams B2, and B9 (which are placed diagonally in the truss); two 42 foot flexible cables C4, and C10 (which are placed diagonally); and two 100 kilogram masses M1 and M2. The masses each have only one interface point. Each of the rigid metallic beams, each of the flexible cables, and the wall have two interface points.

For simplicity, the figure shows only the five arcs that connect to the single interface point of mass M1 22000.

One way to view one embodiment of the process of the present invention is that the process begins with a parts bin containing numerous copies of each type of component. At the beginning of the process, the interface graph begins with one point for each interface point of each component in the parts bin. The constructing actions cause the adding of undirected lines (arcs) to this interface graph between the interface points of certain components.

When all the constructing actions have been executed, the interface graph is simplified by deleting all interface points that are associated with components that have no connection to any of their interface points. That is, everything associated with completely unused components are deleted from the interface graph. This corresponds to returning the unused parts to the parts bin.

After this simplification, the points (nodes) of the interface graph represent the interface points of the components of a structure and the undirected lines (arcs) of the interface graph represent the existence of a connection between two interface points. In this view of one embodiment of the process of the present invention, the constructing actions build the topological arrangement of locations within the overall developing structure where components are situated. The constructing actions also replace particular components at particular locations in the overall structure with other components. The constructing actions also specify the component values (sizing) of the components.

This view also provides a way to estimate the vast size of the search space of possible circuits that are implicitly searched by the process of the present invention. An estimate of the number of possible circuits can be made by considering the product of three factors: the number of possible topologies, the number of possible ways of situating components of various types within the topological arrangement, and the number of possible values for each component.

Circuits that provide solutions to even relatively simple problem often have or more components. To illustrate the above three factors, consider a one-input, one-output circuit with exactly 20 two-lead components and wherein the components are limited to only three possibilities: capacitor, inductor, or resistor. Since the circuit has 42 interface points, there are 861 ways of choosing two interface points from 42. Thus, there are $2^{861}$ (approximately $10^{260}$) possible ways of making connections between the interface points. Since there are three types of components, there are $3^{20}$ (approximately $10^9$) possible ways of picking the type of component for the 20 components. A set of 280 values for each component type will provide component values at approximately 5% intervals over a range of six decades (since 1.05280 is approximately $10^6$). Using this granularity for values of the components, there are $280^{20}$ (approximately $10^{49}$) possible ways of picking the values for the 20 components. Combining these three factors produces approximately $10^{317}$ as an estimate of the number of possible circuits. This rough estimate ignores certain factors (such as symmetry); however, it is an underestimate because of the assumption of a particular number of components (whereas, in practice, the number is not fixed in advance), the assumption of only three types of components, and the assumption of only six decades of component values. This estimate nonetheless makes clear the vast size of the search space for the problem of circuit design.

If a population size of 640,000 is used over 100 generations in a single run, only 64 million circuits (ignoring duplicates) are explicitly examined out of this vast search space whose size may be around $10^{317}$. The methods of the present invention implicitly search the very large search space of the problem without using any specific knowledge about electrical circuits or about the electrical nature of characteristics of the components.

It should also be noted that the present invention deals with real physical systems and real physical quantities that obey physical laws. The three structures discussed above (i.e., the electrical structure, the mechanical structure consisting of springs, dash pots, and masses of FIGS. 102 and 113 and the mechanical structure consisting of masses and of rigid metallic beams, flexible cables, and masses of FIGS. 101 and 114) all obey certain physical laws.

Kirchhoff's current law for electrical systems states that the sum of the currents at any node in a circuit is zero. For mechanical systems, the analog of current is force. Thus, the analog of Kirchhoff's current law for a mechanical system is that sum of the force vectors applied at any point is also zero. That is, the sum of the forces at any junction point (node) where components meet in the truss of FIGS. 101 and 114 or the mechanical system of FIGS. 102 and 113 is zero. At each stage of the development of the final structure, the constructing actions of the current invention (e.g., the connection-creating functions and the component-creating functions for electrical circuits) change the current developing structure into a new structure. However, each such changed structure in the developmental process always obeys this conservation law at every node. That is, for each structure (electrical or mechanical), the sum of the values of the quantity corresponding to force at each point where components are connected is conserved at zero.

In electrical systems, Kirchhoff's voltage law states that the sum of the voltages around any closed loop in a circuit is conserved at zero.

Conclusion

Several variations in the implementation of genetic programming that are useful for the automated design of complex structures have been described.

The specific arrangements and methods herein are merely illustrative of the principles of this invention. Numerous modifications in form and detail may be made by those skilled in the art without departing from the true spirit and scope of the invention.

Although this invention has been shown in relation to a particular embodiment, it should not be considered so limited. Rather it is limited only by the appended claims.

What is claimed is:

1. An iterative computer-implemented process for creating a structural design that satisfies prespecified design goals, said process invoking iterations, each iteration comprising the system-implemented operations of:

developing a structure for each entity in a population of entities of various sizes and shapes by executing constructing actions in said each entity, the structure comprising a plurality of types of components in a topological arrangement with at least one component value, and determining behavior of each developed structure.

2. The process defined in claim 1 wherein executing the constructing actions comprises applying the constructing actions to an embryonic structure.

3. The process defined in claim 1 wherein the structure comprises a filter.

4. The process defined in claim 1 wherein the structure comprises an amplifier.

5. The process defined in claim 1 wherein executing constructing actions includes executing at least one constructing action to create a value of at least one component without use of an initially provided value.

6. The process defined in claim 1 further comprising determining the value of a component by executing functions of an arithmetic-performing sub-tree.

7. The process defined in claim 1 wherein executing at least one of the constructing actions produces an intermediate description of the structure in the form of a list of components, a list of connections between interface points of the components, and values of the components.

8. The process defined in claim 1 wherein determining behavior comprises simulating the structure.

9. The process defined in claim 1 wherein determining behavior comprises observing a physical realization representing the structure, the physical realization being constructed in response to execution of the constructing actions.

10. The process defined in claim 1 wherein the entities are program trees.

11. The process defined in claim 1 further comprising:
choosing a genetic programming operation that creates a new entity, and
performing the chosen genetic programming operation.

12. The process defined in claim 11 wherein the genetic programming operation comprises crossover.

13. The process defined in claim 1 wherein executing constructing actions comprises executing at least one of the constructing actions to change the topology of the structure being developed.

14. The process defined in claim 13 wherein executing at least one constructing action comprises duplicating a portion of the topology to create a duplicated portion, coupling the duplicated portion in series with the portion of the topology to form a composition, and replacing the portion with the composition.

15. The process defined in claim 13 wherein executing at least one of the constructing actions comprises duplicating a portion of the topology to create a duplicated portion, coupling the portion of the topology in parallel to the duplicated portion to create a composition, and replacing the portion with the composition.

16. The process defined in claim 13 wherein executing at least one of the constructing actions comprises creating at least two duplicated portions of a portion of the topology, coupling a first end of each of the at least two duplicated portions with one end of the portion of the topology to create a radiating composition, and replacing the portion with the composition.

17. The process defined in claim 13 wherein executing at least one of the constructing actions comprises creating at least two duplicates of a portion of the topology, coupling the at least two duplicates and the portion of the topology in a polygonal loop to create a looping composition comprising at least three portions, and replacing the portion of the topology with the looping composition.

18. The process defined in claim 1 wherein at least one of the entities in the population has a different hierarchical arrangement of constructing actions than that of another of the entities in the population.

19. The process defined in claim 1 further comprising removing an entity from the population based on the degree to which a developed structure associated with the entity fails to satisfy said prespecified design goals.

20. The process defined in claim 1 wherein entities in the population comprises sub-entities, wherein at least one of the sub-entities is externally invokable and at least one of the entities in the population has at least one internally invokable sub-entity, the at least one externally invokable sub-entity capable of including invocations of internally invokable sub-entities.

21. The process defined in claim 1 wherein at least one writing head is associated with a component.

22. The process defined in claim 1 wherein entities conform to a constrained syntactic structure.

23. The process defined in claim 1 wherein one entity of the population of entities comprises a context-sensitive constructing action, and wherein executing constructing actions in the one entity includes executing the context-sensitive constructing action.

24. The process defined in claim 1 wherein the structure comprises a circuit.

25. The process defined in claim 1 wherein the structure comprises a circuit, and wherein executing constructing actions in each entity develops a circuit with a topological arrangement of components with at least one component value in which at least one component is a resistor, capacitor, inductor, diode, transistor, or energy source.

26. The process defined in claim 25 wherein at least one writing head is associated with a component.

27. The process defined in claim 25 wherein the entities conform to a constrained syntactic structure.

28. The process defined in claim 25 wherein determining behavior comprises observing a physical realization of the circuit, the circuit constructed in response to execution of the constructing actions.

29. The process defined in claim 28 wherein the physical realization is a field programmable device.

30. The process defined in claim 29 wherein the field programmable device is a digital field programmable gate array.

31. The process defined in claim 29 wherein the field programmable device is a field programmable analog array.

32. The process defined in claim 29 wherein the field programmable device is a field programmable parts array.

33. The process defined in claim 1 wherein the structure comprises a circuit that obeys the law that the value of currents into each node where components meet sums to zero and obeys the law that values of voltage around each closed loop of components sums to zero.

34. The process defined in claim 1 wherein the structure comprises a non-clocked circuit.

35. The process defined in claim 1 wherein the structure comprises a circuit in which the voltage at each node is dependent on the voltage of all other nodes of said circuit at the same instant in time.

36. The process defined in claim 1 wherein the structure comprises a non-clocked circuit in which the current through a component is dependent on the current through all other components of the circuit at the same instant in time.

37. The process defined in claim 1 wherein the structure comprises a non-clocked circuit whose behavior, without considering any time delays in loops, is fully determined.

38. The process defined in claim 1 wherein the structure comprises a non-clocked circuit in which at least one component provides resistance, provides capacitance, provides inductance, provides bi-directional signal passage, functions like a transistor, or provides energy.

39. The process defined in claim 1 wherein the structure comprises a non-clocked circuit in which a signal present at one node can take on a value lying in a continuous range of real values.

40. An iterative computer-implemented process for creating a structural design that satisfies prespecified design goals, the process invoking iterations, each iteration comprising the system implemented operations of:
   executing constructing actions in each entity of a population of entities of various shapes and sizes to develop a structure for said each entity, the structure comprising a plurality of types of components in a topological arrangement with at least one component value, wherein executing the constructing actions comprises inserting components into a single developing structure for said each entity, and
   determining behavior of each developed structure.

41. A system for creating a structural design that satisfies prespecified design goals, the system comprising:
   means for developing a structure for each entity in a population of entities of various sizes and shapes by executing constructing actions in said each entity, the structure comprising a plurality of types of components in a topological arrangement with at least one component value, and
   means for determining behavior of each developed structure.

42. The system defined in claim 41 wherein the means for developing the structure comprises means for applying the constructing actions to an embryonic structure.

43. The system defined in claim 41 wherein the means for developing the structure comprises means for executing at least one constructing action to create a value of at least one component without use of an initially provided value.

44. The system defined in claim 41 wherein executing at least one of the constructing actions produces an intermediate description of the structure in the form of a list of components, a list of connections between interface points of the components, and values of the components.

45. The system defined in claim 41 wherein the entities are program trees.

46. The system defined in claim 41 further comprising:
   means for choosing a genetic programming operation that creates a new entity, and
   means for performing the chosen genetic programming operation.

47. The system defined in claim 41 further comprising means for executing at least one of the constructing actions to change the topology of the structure being developed.

48. The system defined in claim 47 wherein the means for executing at least one constructing action comprises means for duplicating a portion of the topology to create a duplicated portion, means for coupling the duplicated portion in series with the portion of the topology to form a composition, and means for replacing the portion with the composition.

49. The system defined in claim 47 wherein the means for executing at least one of the constructing actions comprises means for duplicating a portion of the topology to create a duplicated portion, means for coupling the portion of the topology in parallel to the duplicated portion to create a composition, and means for replacing the portion with the composition.

50. The system defined in claim 47 wherein executing at least one of the constructing actions comprises creating at least two duplicated portions of a portion of the topology, means for coupling a first end of each of the at least two duplicated portions with one end of the portion of the topology to create a radiating composition, and means for replacing the portion with the composition.

51. The process defined in claim 47 wherein executing at least one of the constructing actions comprises creating at least two duplicates of a portion of the topology, means for coupling the at least two duplicates and the portion of the topology in a polygonal loop to create a looping composition comprising at least three portions, and means for replacing the portion of the topology with the looping composition.

52. The system defined in claim 47 wherein at least one writing head is associated with a component.

53. The system defined in claim 47 wherein entities conform to a constrained syntactic structure.

54. The system defined in claim 47 wherein the structure comprises a circuit, and wherein executing constructing actions in each entity develops a circuit with a topological arrangement of components with at least one component value in which at least one component is a resistor, capacitor, inductor, diode, transistor, or energy source.

55. The system defined in claim 47 wherein at least one writing head is associated with a component.

56. The system defined in claim 47 wherein the entities conform to a constrained syntactic structure.

57. The system defined in claim 47 wherein the structure comprises a circuit that obeys the law that the value of currents into each node where components meet sums to zero and obeys the law that values of voltage around each closed loop of components sums to zero.

58. The system defined in claim 47 wherein the structure comprises a non-clocked circuit.

59. The system defined in claim 47 wherein the structure comprises a circuit in which the voltage at each node is dependent on the voltage of all other nodes of said circuit at the same instant in time.

60. The system defined in claim 47 wherein the structure comprises a non-clocked circuit in which the current through a component is dependent on the current through all other components of the circuit at the same instant in time.

61. The system defined in claim 47 wherein the structure comprises a non-clocked circuit whose behavior, without considering any time delays in loops, is fully determined.

62. The system defined in claim 47 wherein the structure comprises a non-clocked circuit in which at least one component provides resistance, provides capacitance, provides inductance, provides bi-directional signal passage, functions like a transistor, or provides energy.

63. The system defined in claim 47 wherein the structure comprises a non-clocked circuit in which a signal present at one node can take on a value lying in a continuous range of real values.

64. A computer readable medium storing executable instructions thereon, which, when executed by at least one processing device, cause the at least one processing device to create a structural design that satisfies prespecified design goals by invoking interations that comprise:

developing a structure for each entity in a population of entities of various sizes and shapes by executing constructing actions in each entity, the said structure comprising a plurality of types of components in a topological arrangement with at least one component value, and determining behavior of each developed structure.

65. The medium defined in claim 64 wherein executing the constructing actions comprises applying the constructing actions to an embryonic structure.

66. The medium defined in claim 64 wherein executing constructing actions includes executing at least one constructing action to create a value of at least one component without use of an initially provided value.

67. The medium defined in claim 64 wherein executing at least one of the constructing actions produces an intermediate description of the structure in the form of a list of components, a list of connections between interface points of the components, and values of the components.

68. The medium defined in claim 64 wherein the entities are program trees.

69. The medium defined in claim 64 further comprising:

choosing a genetic programming operation that creates a new entity, and performing the chosen genetic programming operation.

70. The medium defined in claim 64 wherein executing constructing actions comprises executing at least one of the constructing actions to change the topology of the structure being developed.

71. The medium defined in claim 64 wherein executing at least one constructing action comprises duplicating a portion of the topology to create a duplicated portion, coupling the duplicated portion in series with the portion of the topology to form a composition, and replacing the portion with the composition.

72. The process defined in claim 64 wherein executing at least one of the constructing actions comprises duplicating a portion of the topology to create a duplicated portion, coupling the portion of the topology in parallel to the duplicated portion to create a composition, and replacing the portion with the composition.

73. The process defined in claim 64 wherein executing at least one of the constructing actions comprises creating at least two duplicated portions of a portion of the topology, coupling a first end of each of the at least two duplicated portions with one end of the portion of the topology to create a radiating composition, and replacing the portion with the composition.

74. The process defined in claim 64 wherein executing at least one of the constructing actions comprises creating at least two duplicates of a portion of the topology, coupling the at least two duplicates and the portion of the topology in a polygonal loop to create a looping composition comprising at least three portions, and replacing the portion of the topology with the looping composition.

* * * * *